United States Patent
Shaw et al.

(10) Patent No.: US 12,047,258 B2
(45) Date of Patent: *Jul. 23, 2024

(54) CLOCK SKEW DETERMINATION IN A NETWORK

(71) Applicant: Neoatomic LLC, Las Vegas, NV (US)

(72) Inventors: Steve Shaw, Glenn Mills, PA (US); Jordan Whited, San Mateo, CA (US); David Swafford, Castro Valley, CA (US); Ben Marx, Venice, CA (US)

(73) Assignee: Neoatomic LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,478

(22) Filed: Aug. 17, 2022

(65) Prior Publication Data

US 2023/0076025 A1    Mar. 9, 2023

Related U.S. Application Data

(60) Provisional application No. 63/234,659, filed on Aug. 18, 2021.

(51) Int. Cl.
| | |
|---|---|
| H04L 43/02 | (2022.01) |
| H04J 3/06 | (2006.01) |
| H04L 43/0829 | (2022.01) |
| H04L 43/0852 | (2022.01) |
| H04L 43/087 | (2022.01) |
| H04L 45/02 | (2022.01) |
| H04L 45/12 | (2022.01) |
| H04L 45/121 | (2022.01) |
| H04L 45/64 | (2022.01) |
| H04L 45/745 | (2022.01) |

(Continued)

(52) U.S. Cl.
CPC ............ *H04L 43/02* (2013.01); *H04J 3/0644* (2013.01); *H04J 3/0667* (2013.01); *H04J 3/0697* (2013.01); *H04L 43/0829* (2013.01); *H04L 43/0858* (2013.01); *H04L 43/087* (2013.01); *H04L 45/02* (2013.01); *H04L 45/04* (2013.01); *H04L 45/121* (2013.01); *H04L 45/123* (2013.01); *H04L 45/124* (2013.01); *H04L 45/126* (2013.01); *H04L 45/64* (2013.01); *H04L 45/745* (2013.01); *H04L 47/122* (2013.01); *H04L 47/283* (2013.01); *H04L 47/43* (2022.05)

(58) Field of Classification Search
CPC ...... H04J 3/0638; H04J 3/0644; H04J 3/0667; H04J 3/0697
See application file for complete search history.

(56) References Cited

U.S. PATENT DOCUMENTS

| | | | |
|---|---|---|---|
| 11,197,075 B1 * | 12/2021 | Kamen | ............... H04L 43/0817 |
| 2009/0231191 A1 * | 9/2009 | Wu | ....................... H04J 3/0635 |
| | | | 342/357.395 |

(Continued)

*Primary Examiner* — Pao Sinkantarakorn
(74) *Attorney, Agent, or Firm* — Rowan TELS LLC

(57) ABSTRACT

Network devices that (a) test that GPS-clock enabled network devices have synchronized clocks, (b) identify non-GPS-clock enabled network devices with symmetric latencies as likely to be synchronized to GPS-clock enabled neighbor devices, (c) determine clock skews of remaining network devices not identified in (a) or (b) against the network devices identified in (a) and (b), and re-evaluate latencies of the GPS-clock enabled network devices, the non-GPS-clock enabled network devices, and the remaining devices based on the results of (a)-(c).

21 Claims, 25 Drawing Sheets

(51) Int. Cl.
*H04L 47/122* (2022.01)
*H04L 47/283* (2022.01)
*H04L 47/43* (2022.01)

(56) References Cited

U.S. PATENT DOCUMENTS

2010/0091760 A1* 4/2010 Yoon .................. H04J 3/0658
370/350
2020/0021378 A1* 1/2020 Aweya ................. H04J 3/0673
2021/0320854 A1* 10/2021 King, V ............. H04L 43/0817

* cited by examiner

CLOCK SKEW DETERMINATION IN A NETWORK

CROSS REFERENCE TO RELATED APPLICATIONS

This application claims priority and benefit under 35 USC 119(e) to U.S. Application No. 63/234,659, titled "NETWORK CONTROL SYSTEMS AND COMPONENTS", filed on Aug. 18, 2021, the contents of which are incorporated herein by reference in their entirety.

BACKGROUND

Games or other online applications may interact across large geographic regions, routing network traffic from wherever the end user (e.g., gaming) machines are located to wherever the application (e.g., game) server is located. Such applications may have different logic architectures and may generate different traffic behavior.

Prior approaches to improving the performance of such diverse online applications include virtual private networks (VPNs), custom application program interfaces (APIs), and content delivery networks (CDNs). These prior approaches may not provide the necessary performance for modern applications at large scale or may require modification of the application architecture.

Internet Protocol (IP) Anycast is becoming more popular for delivering media content over wide area networks due to its adaptability and resistance to certain types of denial of service attacks. One drawback of using IP Anycast becomes evident during longer communication sessions or for communication applications that are intolerant of disruptions, such as the communication of real-time media content.

The longer a communication session goes on, the more probable it becomes that the network routing topology will change during the session, for example disrupting the routing connection to an IP Anycast-enabled point-of-presence (POP) acting as a relay server. A relay server is an example of a media content routing endpoint that is not a final target of the media content. If the routing to a certain point-of-presence is disrupted, IP Anycast should route packets directed to the disrupted point-of-presence to the next closest and available point-of-presence in the IP Anycast network.

An upstream media source providing media content to a target media destination through an IP Anycast relay network may not be informed that the media content has been rerouted through a different point-of-presence, unless/until the new destination address is propagated through the network, which may take considerable time. The communication of real-time media content using IP Anycast may thus suffer from techniques that respond to routing changes by propagating new relay server addresses throughout the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
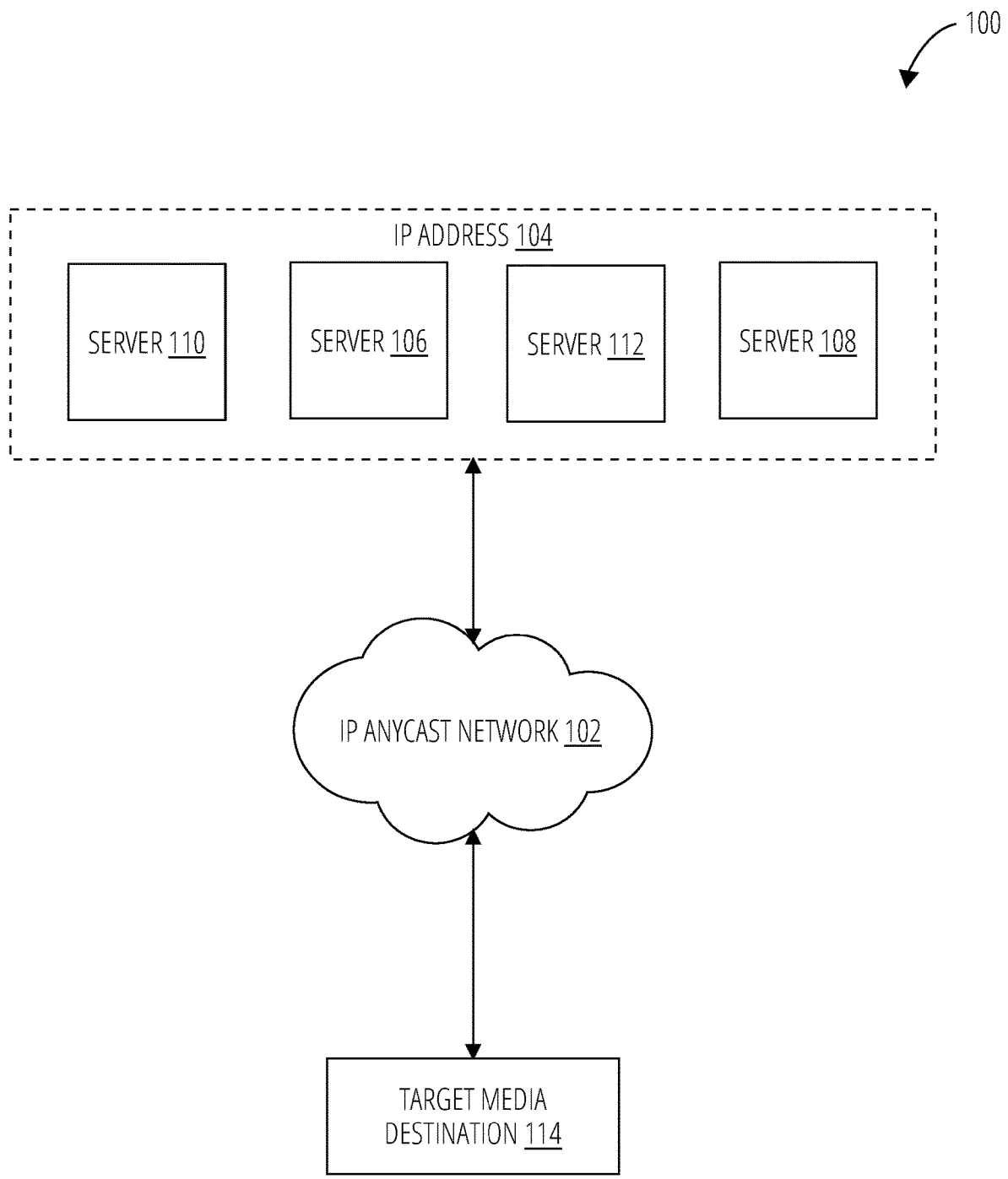
FIG. 1 depicts a server system 100 in accordance with one embodiment.

Certain terms used in this disclosure should be understood as follows.

"ACK" refers to a general 'acknowledgement of receipt' message passed between components in or over a communication network.

"Alert" refers to a signal generated in response to a preconfigured triggering event to notify machine components to initiate an action in response to the triggering event.

"Algorithm" refers to any set of instructions configured to cause a machine to carry out a particular function or process.

"App" refers to a type of application with limited functionality, most commonly associated with applications executed on mobile devices. Apps tend to have a more limited feature set and simpler user interface than applications as those terms are commonly understood in the art.

"Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Application layer" refers to logic in a networking application that performs user interactions and high-level communication functions. These can include identifying communication partners, determining resource availability, and synchronizing communication with other networking applications.

"Application program interface" refers to instructions implementing entry points and return values to a module.

"Border gateway protocol" refers to communication protocols to exchange routing and reachability information among systems on networks such as the Internet. The border gateway protocol (BGP) makes routing decisions based on paths, network policies, and/or rule-sets. In BGP, the autonomous system boundary routers (ASBR) send path vector messages to advertise the reachability of networks. Each router that receives a path vector message verifies the advertised path according to its policy. If the message complies with its policy, the router modifies its routing table and the message before sending the message to the next neighbor.

"Computer program" refers to another term for 'application' or 'app'.

"Daemon" refers to a computer program that runs as a background process, rather than being under the direct control of an interactive user.

"Data pipeline" refers to data processing elements coupled in series, where the output of one element is the input of the next one. The elements of a pipeline are often executed in parallel or in time-sliced fashion; in that case, some amount of buffer storage is often inserted between elements. Data queues are a common example of a data pipeline.

"Datagram" refers to a basic transfer unit in a packet-switched network. Each datagram has two components, a header and a data payload. The header contains information for routing the datagram from the originator device to the endpoint device. Headers may include originator and endpoint addresses as well as a type field. The payload is the data to be transported.

"Driver" refers to low-level logic, typically software, that controls components of a device. Drivers often control the interface between an operating system or application and input/output components or peripherals of a device, for example.

"Endpoint" refers to a receiver device referenced by the destination address in a data packet. An endpoint is not necessarily the final destination of a packet. For example an endpoint may be the target media destination of the packet or an intermediate network component such as a network router, relay server, switch, or other device that alters the destination address in the packet to a next hop address or to the target media destination address.

"First derivative graph" refers to graphs in which the edge weights characterize a rate of change of an edge characteristic. First derivative graphs are thus derived from two or more time snapshots of the edge characteristic. For example, a first derivative graph may comprise edges weighted by the rate of change of latency and/or traffic and/or congestion on the path segments of the graph.

"Geographic proximity", relative to a network node, refers to location within a configured geographical boundary (geoboundary) comprising the network node.

"Hub" refers to a common connection point at junctions in a network. For example hubs connect different segments of a network at multiple ports so that when a packet arrives at one port, it is copied to the other ports so that all segments of the network carry all packets. In contrast, a switch copies the packet only to the specific egress port which it is intended for.

"Identifying information" refers to IP addresses, MAC addresses, ports, and so on that may be utilized to determine a specific media source, media destination, or intermediate device or application in a communication network.

"Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Internal mapping" refers to a memory table or other associative structure to correlate one thing to another.

"IP Anycast" refers to a network addressing and routing technology in which a single destination address has multiple routing paths to two or more endpoints. Network routers select the routing path on the basis of factors such as number of hops. IP Anycast addressing is a one-to-one-of-many association whereby datagrams are routed to any single endpoint of a group of potential endpoints that are all identified by the same destination address. The IP Anycast routing algorithm selects the single endpoint from the group based on least-expensive routing metrics.

"IP Unicast" refers to a network addressing and routing technology in which a single destination address is uniquely associated with an endpoint. IP Unicast addressing uses a one-to-one association between an originator and an endpoint: each destination address uniquely identifies a single endpoint.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Lower-latency path" refers to paths or path segments comprising a latency meeting or below a configured threshold level.

"Media content" refers to any digital data.

"Media signals" refers to electronic or optical signals that communicate media content.

"Module" refers to a computer code section having defined entry and exit points. Examples of modules are any software comprising an application program interface, drivers, libraries, functions, and subroutines.

"Multilateration" refers to any algorithm of the family of well-known algorithms for determining a network device's physical location to a configured accuracy based on measurement of the times of arrival (TOAs) of packets having a known range of propagation values from and to (typically) multiple known locations. The known locations may utilize synchronized clocks.

"Network mapping functionality" refers to logic implementing a model of network behavior based on network communication and connectivity information. The network mapping functionality may comprise algorithms such as packet and traffic profiling, ICMP Echo/Echo-Reply testing and timing, and other techniques known in the art.

"Network path" refers to a path between two nodes in a directed acyclic graph. A network path comprises one or more path segments.

"Network routing application" refers to a network routing control implemented as application logic.

"Network routing control" refers to logic disposed in a network to provide monitoring and control of routing behavior in the network overall or a subset of the nodes in the network.

"Network system controller" refers to a device or set of devices that provides overall control over security, routing, quality, and other configured behaviors of the network. The network system controller may comprise or have control over the network routing control.

"Networking layer" refers to logic utilized in networked devices providing the functional and procedural mechanisms to communicate packets from one network device to another, wherein each network device is typically associated with a network address, although not necessarily uniquely so. The networking layer may implement message delivery by splitting large messages into many packets or datagrams at one node, sending the fragments independently, and reassembling the fragments at another node. It may, but does not need to, report delivery errors. The networking layer is referred to as "Layer 3" (of the OSI model) in some implementations.

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Originator" refers to a device originating a datagram or packet on a network.

"Overlay network" refers to a 'network within a network', i.e. devices, software, configuration settings, and protocols that implement an enhanced data and control plane built on top of more basic and standard network infrastructure.

"Packet" refers to a unit of communication over packet-switched networks, comprising control information and data known as the payload. Control information controls delivery of the payload. Examples include originator and endpoint network addresses, error detection codes, and sequencing information. Typically, control information is found in packet headers and trailers. Large packets may comprise multiple datagrams.

"Path segment" refers to a subset (one or more) edges that make up a network path in a directed acyclic graph.

"Point-of-presence" refers to an interface point between endpoint and originator devices and a network such as the Internet. An Internet point-of-presence (POP) provides a local access point through an Internet Service Provider (ISP). A POP typically comprises servers, routers, network switches, multiplexers, and other network interface equipment, and is often located in a data center. ISPs typically provide multiple POPs to their customers.

"Process" refers to software that is in the process of being executed on a device.

"Programmable device" refers to any logic (including hardware and software logic) who's operational behavior is configurable with instructions.

"Real-time media content" refers to audio, video, interactive teleconference data, interactive online gaming, and other digital content communicated over a network between an upstream media source and a target media destination and which requires accurate delivery to the target media destination in accordance with a timebase such that the experience or interactivity of the content is not compromised at the target media destination.

"Relay server" refers to an endpoint device in a network that receives packets and forwards the packets to a next hop (node, e.g., another server) in the network or to a target device. A relay server may in some cases alter the destination address in the packet header. The term 'relay server' is not used here in the narrow sense of a mail relay.

"Request" refers to a signal requesting that the receiver respond in some way.

"Ripple effect" refers to network traffic effects induced by a change in network traffic on a target path or path segment, such that the change induces traffic and/or latency changes in other paths or segments, which may in turn induce changes back into the target path or segment, and so on.

"Router" refers to a device utilized to forward packets between at least two networks, for example between a private network and the Internet or the Internet and a telecom network.

Routers are located at gateways, the devices where two or more networks connect. Routers use headers and forwarding tables to determine the best path for forwarding the packets between networks, and they use protocols to communicate with each other and configure the best route between endpoint devices on the networks.

"Routing logic" refers to logic to perform packet routing in a network. Each router or switch in a network may include some routing logic, as does the network routing control.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

"Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code.

"SSSP pathfinding" refers to any algorithm in the well-known family of Single Source Shortest Path algorithms for locating a shortest path through a graph based on one or more selected criteria. Typically, a graph is provided to the SSSP pathfinding algorithm comprising a set of vertices (nodes) and edges, where the edges are assigned weights representing a physical characteristic of the connection between vertices (e.g., latency). The SSSP pathfinding algorithm then determines a path between two selected vertices that minimizes the overall weight, for example.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'.

"Switch" refers to a device that filters and forwards packets between network segments. Switches operate at the data link layer (layer 2) and sometimes the networking layer (layer 3) of the OSI Reference Model and therefore support any packet protocol. Networks that use switches to join segments are called switched networks.

"SYN" refers to a request message from an originator to a network server or other endpoint requesting a communication session, also called a connection. SYN, ACK, and SYN-ACK are commonly used to establish connections in TCP communications.

"SYN-ACK" refers to a response to a SYN acknowledging receipt of the SYN.

"Synthetic network traffic" refers to packets, datagrams, or other network signals injected into the network by devices (synthetic POPs and synthetic servers) configured to simulate or mimic the behavior of endpoints or servers, or to simply provide network traffic for purposes of latency measurements.

"Target" refers to the intended final recipient/consumer of a packet from an originator.

The target is distinguished from an endpoint generally in that an endpoint may be an intermediate destination through which a packet is routed in a network, vs being the target or final intended destination of the packet.

"Target media destination" refers to the target specified by an upstream media source for receipt of media content.

"TCP" refers to a main component of the Internet protocol suite. TCP provides reliable, ordered, and error-checked delivery of packets over Internet Protocol (IP) networks.

"Threshold latency derivative" refers to configured setting(s) for a derivative value that determines whether or not a corresponding graph edge is pruned.

"Trace route" (also "traceroute") refers to logic (e.g., the TCP/IP Traceroute utility, the Mac OS X Network Utility) that traces an overall network connection from one location to another, recording hops along the way. For example in some systems a trace route may be executed by typing tracert [domain name], where [domain name] is either the domain name or the IP address of the system to reach. When a trace route is executed, it returns a list of network hops (e.g., host name and IP address) for each network location to location connection. It also typically returns the amount of time (latency measurement) it took for each connection to take place (usually in milliseconds). This shows if there were any delays in establishing the overall connection. Therefore, if the overall network connection is slow or unresponsive, a trace route provides details on where and to what extent the latencies exist.

"Triggering event" refers to a signal, datagram, packet, or state that generates an alert.

"Upstream media source" refers to a supplier of network traffic in a directed acyclic graph. An upstream media source may originate the network traffic or may be an intermediate node in the graph that forwards traffic from a prior node (prior in the direction of the network traffic).

Embodiments of network architectures and network routing algorithms are herein disclosed for improving the performance of real-time online applications such as multiplayer competitive gaming and teleconferencing. The disclosed mechanisms are independent of the application architecture and may operate independently of, or supplement, conventional approaches. Examples are provided and described herein primarily in the context of online gaming. However it should be understood that the disclosed mechanisms are not limited to use with online games.

Online gaming (for example multiplayer real-time video games), teleconferencing, and other real-time communication (RTC) networks may be conceptually divided into middle, last, and long mile. In such networks the gaming machines/applications may be located far from game servers, such that the latency of network packets becomes impactful on game performance and experience. For example, gainers in Seattle, Tacoma, Olympia, WA, and Vancouver, BC, may all be participating in an online game hosted on a server in Portland, OR. The network route for game traffic for those gainers, who are all approximately in a linear physical path with one another, may not be linear at all. For example 50% to 80% of their game machine traffic may take a circuitous route through Yakima, WA or Boise, Idaho or Salt Lake City, Utah to or from the game server in Portland.

Latency measurements on the network paths between the game machines and game server(s) are made using real-time telemetry. The latency measurements may be for actual application traffic or for synthetic network traffic generated using synthetic POPs or synthetic servers. The latency measurements may be made for multiple (e.g., hundreds, thousands, possibly millions) active gainers at once, at regular intervals (e.g., every few seconds to few minutes). The network performance is analyzed from game machine locations to the game servers they utilize, and vice versa. Directed acyclic graphs are generated in a low latency manner from each active gamer (or simulated gamer) location to each game server location, and vice versa. Optimal performance paths are identified from a time derivative (called the first derivative graph) of these directed acyclic graphs, for each individual active gamer.

Conventional content distribution networks (CDNs) utilize last mile performance as a primary network performance optimization factor. CDNs work to push/cache content to within the last mile of the game machines. This approach has proven insufficient for some types of network traffic generated by some online games and other online applications (including voice and video conferencing).

To reduce latency, measurements are utilized from the entire routing graph for each gamer including their actual network traffic routing and potential paths not currently utilized by their network traffic. Additional data transformations are generated to determine best path routing for a particular gamer or to optimize latency across a set of gainers. Telemetry systems may be utilized to geolocate user machines, routers etc. to within a defined area (e.g., 100 kilometers) or latency limit (e.g., 80 milliseconds). With this geographic information and latency knowledge, it may be determined if a particular route for network traffic is operating efficiently. For example, if two servers or routers are indicated with a separation of 1000 kilometers, which correlates to about 10 milliseconds of latency between one another, the route may be inefficient if the actual measured latency between those machines is 20 milliseconds. Without disruption of application traffic in progress, the routing may be changed between those machines, for example to a physically longer (but latency shorter) route.

In some cases the geolocation of devices on the network, within a geoboundary, may be determined (inferred) from the known geolocations of other devices, and latency measurements and packet analysis (e.g., packet profiling or IP trace route analysis). This may be referred to as multilateration.

An example online scenario is one in which a person is taking part in a videoconference call. The person is utilizing a Comcast point-of-presence from an office network. The person's laptop and office network doesn't respond to a ping, so it's not known geographically where they are. But the Comcast router that's one hop into the Comcast network from the office network responds to a ping. The system can determine that the caller is, for example, two milliseconds away from that router using a trace route from other network components. The system can thus determine that the person is within 200 kilometers of the Comcast router. The system can multilaterate the Comcast router and verify the location using a network operation request to identify where that router is. This constrains the Internet geography of where the person is located based on the known location of the router.

Telemetry information including geolocations and path latencies may be collected from a large set of active networks, users, or simulations of network users, to many different network locations, such as to game servers. This data may be used to generate one or more directed acyclic graphs embodying network performance for each user specifically, with scored edges between nodes of the graph(s) representing network devices. The time evolution of these directed acyclic graphs may be analyzed to make network routing changes to reduce latency for specific users or groups of users.

Figure 9:
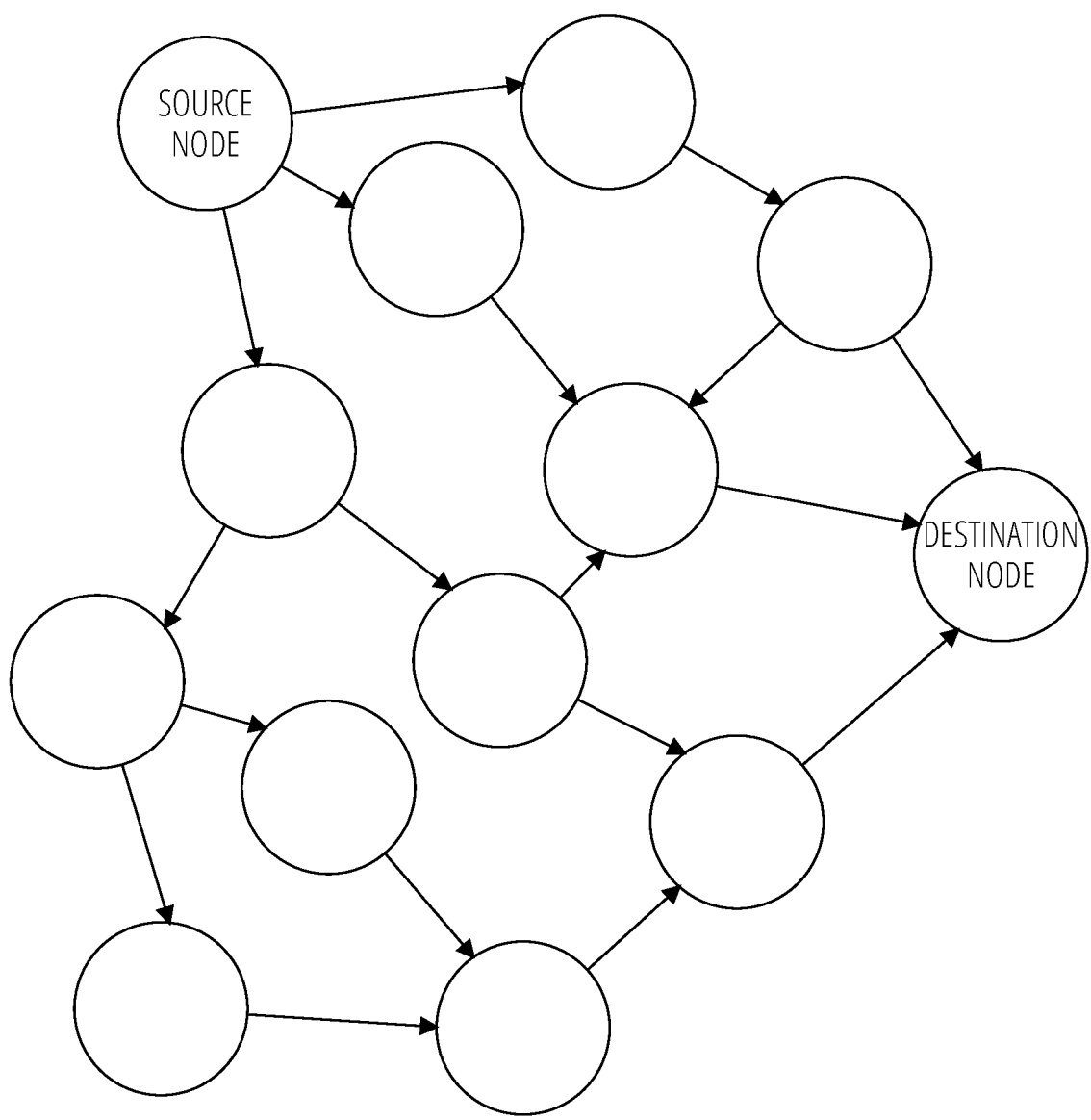
FIG. 9 depicts an exemplary directed acyclic graph.

Directed acyclic graphs (e.g., see FIG. 9) may be generated for each gamer and/or game server with edges directed from gamer to game server and from game server to gamer. First derivative graphs of the directed acyclic graphs may be input as training sets to a machine learning system to enable predictive analytics of network and application behavior. These inputs have an inherent temporal nature. For example a training set may comprise a set of first derivative graphs for users of an online game over a period of days, where the graphs are updated in second or minute increments.

In one embodiment, the directed acyclic graph for each gamer comprises two edges between each device node: one edge for traffic flows to the gamer from the game server, and one for traffic flows from the gamer to the game server. In some embodiments separate directed acyclic graphs are generated for traffic in each direction.

The evolution of first derivative graphs is evaluated. For example, the directed acyclic graphs for actual active (and/or synthetic) gainers may be regenerated (bidirectionally as explained above) and periodically. Most of the directed acyclic graphs may not change much from interval to interval, but a subset of the directed acyclic graphs may change significantly between the intervals. Clustering around the subset of substantially changing graphs may yield information about how to adapt game traffic for improved performance over time, providing a feedback mechanism for network routing changes that is both reactive and reinforcing.

In addition to real-time actual or synthetic traffic readings, the system may utilize historical directed acyclic graph evolution data to predictively improve routing of application traffic. For example the system can learn and predict ripple effects from routing changes by analyzing historical directed acyclic graphs (or first derivative graphs) for particular users and/or servers at particular times, days, etc.

Internet Service Provider and BGP (Border Gateway Protocol) level interconnects and pathfinding behave as a complex adaptive system. Therefore, there may not be a practical formulaic relationship between network changes and the traffic effects they cause. For example, bringing a data center of game servers online that's closer to a batch of users than the one they are using currently may actually increase the latency experienced by users of the game in some cases.

Instantaneous telemetry readings (those readings associated with a discrete timestamp) may be insufficient in some cases. For example, the instantaneous telemetry readings may indicate that at a given moment, re-routing a user's network traffic from path A to path B will result in improved instantaneous performance for a user playing a game on a particular server. However, at the time of day in the geographic region and for a particular game, the historical data may indicate that in a few minutes, path B is no longer going to be the fastest one for that user because there's a likely large change in the user base imminent in that area for that game.

As another example, switching the user at that time to path B has historically shown to negatively impact a different set of users in another region or on another server in the same region, after a period of time. To prevent a double-switch (switching to path B then back to path A), the system may suppress the route switch for the user to path B even though the instantaneous data indicates it is the best one at the moment. In this manner the system also provides rerouting cascade avoidance.

Synthetic network traffic may be generated for example by injecting network traffic for a non-actual (simulated) point of presence—POP—on network behavior in order to collect data about latencies when natural traffic is insufficient for this purpose. For example, the traffic on a particular network path to or from a user machine and a particular game server or teleconferencing server may be insufficient to accurately profile latency on that path. By generating synthetic traffic on the path to or from the user machines and the servers, the pace, region, time of day, time interval, configuration, and other aspects of the network traffic may be controlled.

By generating synthetic network traffic directed acyclic graphs may be constructed not only for active users and servers but also for servers the users aren't currently actively using, and for users that aren't active at the moment. These directed acyclic graphs are constructed using synthetic network traffic generated both to and from the other servers for the particular or potential users. For example, a first set of all game servers in a geographic region being actively used by a particular set of gamers, and a second set of game servers outside that region that are also being used for a specific multiplayer gaming session, may be combined into a combined set of devices that is profiled with natural and synthetic network traffic to generate directed acyclic graphs for each gamer machine in the specific multiplayer gaming session.

In one embodiment, game servers outside a defined geoboundary, or having a latency above a defined threshold from a gamer's machine, are profiled less frequently or over a longer interval than those within the geoboundary or latency threshold. For example, the system might profile game servers within a 5 millisecond latency over ten second intervals every thirty seconds, but apply a one minute profiling window every five minutes to game servers within 5+ to 10 milliseconds, and a ten minute profiling window once per day to game servers with 10+ to 50 millisecond latency. The directed acyclic graphs generated at longer intervals may include all of the lower-latency paths sampled and updated at the more frequent intervals.

Clustering and cluster reduction may be performed on the directed acyclic graphs, or the first derivative graphs, to identify areas of the network for optimization of latency. Clustering/reduction may be focused on gamers in a particular gaming session, on a particular gaming server, or in a particular geoboundary, for example. Clustering and reduction reduce the graph set to a more computationally manageable subset of gainers and game servers for optimization analysis.

Different types of directed acyclic graphs may be generated. One type of directed acyclic graph may be generated for traffic between synthetic servers (round trip or unidirectional). A second type of directed acyclic graph may be generated for traffic between gaming machines and game servers (round trip or unidirectional). A third type of directed acyclic graph may be generated for traffic between gaming machines and synthetic servers (round trip or unidirectional). A fourth type of directed acyclic graph may be generated for traffic between synthetic servers and game servers (round trip or unidirectional).

Edges in the directed acyclic graphs may be added based on IPV4 and IPV6 connectivity. Edges in the directed acyclic graphs may then be characterized by a source and destination address. A node in the directed acyclic graph may represent one device, or a set of co-located physical devices. For example, a node in the directed acyclic graph may be a data center with many servers. An edge in the directed acyclic graph then represents a data traffic path from one IP range to another IP range, where an IP range is associated with a specific physical network link at a point in time.

For example, there may be a data center located in Seattle, WA using five physical links on the Internet to communicate with a data center in Portland, OR. Each edge of the directed acyclic graph with that data center as a node is assigned with a source link and a destination link. The directed acyclic graph therefore comprises 25 edges (or 50 edges, if the directed acyclic graph is bidirectional between the locations) between those two data centers, one edge from each source link in Seattle to each destination link in Portland.

A new node is added to the ongoing directed acyclic graph generation for a gamer or game server when a new network device (gaming machine, server, data center, router etc.) is detected as coming online. Multilateration and metadata generation/collection for the new node may be initiated upon detecting it.

Bidirectional directed acyclic graphs for each gamer and game server may be regenerated periodically over fixed time intervals, and their time evolution analyzed to learn and implement routing changes that improve latency. The directed acyclic graphs are clustered and reduced using techniques known in the art.

Clustering is useful to identify different types of network behaviors with different effects over different time intervals. For example, when a router is brought online, it usually has a measurable effect on network traffic latency in a short (e.g., two or three minute) time interval after coming online. After that, the router continues to have an effect over a longer period (e.g., the next half hour to an hour), but it's a more subtle effect than the initial one. There are transient effects to new nodes coming online, and there's also long term effects, and clustering may help reveal them.

There are also ripple effects to network device changes. For example, when one Internet Service Provider reconfigures one of their routers, that impacts the behavior of other Internet Service Providers that they interact with. When those other Internet Service Providers detect their traffic profile shift, their routers react. The result is a cascading adaptive system effect. By forming, reducing, clustering, and analyzing the directed acyclic graphs over a fixed interval for a configured number of intervals, these cascades may be detected and mitigated or otherwise accounted for to improve or predict effects on latency.

Latency metrics to associate with each edge of the graph may include minimum latency, maximum latency, average latency, loss factor, and jitter. Any or all of these parameters may also be classified according to their percentile in the distribution of edges in the graph. For example, any of these metrics may be classified as being in the $10^{th}$ percentile, $25^{th}$ percentile, $50^{th}$ percentile, or $90^{th}$ percentile for a given path or path segment in the graphs. Some metro areas may have a tight cluster of garners where everybody is within a certain communication latency of one another. Cities that are more rural may have a broader range of latency. The geoboundaries of the graphs may be adjusted based on the statistical percentiles of their edges.

Nodes of the directed acyclic graphs may be labeled with a location and/or a multilaterization metric of geographic proximity. The metric may indicate a geographic distance x from a node to neighbor nodes.

"Single source shortest path" (SSSP) analysis may be performed to generate a sorted set of candidates for data traffic paths with a weight applied to each of the paths based on the path latency. Latency and other potentially other scoring metrics are thus factored into the weight for the paths. Attributes of the edges and nodes between nodes may be aggregated to generate aggregate metrics for the paths through the directed acyclic graphs, with SSSP pathfinding and ordering applied to produce a sorted set of edges or paths.

Applying the ordered set of edges and/or paths in the clustered set of directed acyclic graphs (where the ordering is based on first-derivative scoring), the system may perform a regional optimization on the latency of garners in a defined geoboundary utilizing a particular game server. For example, all gamers playing on a particular game server in Frankfurt, Germany, may have their traffic patterns to and from the game server balanced to approximately (within a configurable tolerance) the same latency (compensating for geographic distances).

The directed acyclic graphs are periodically regenerated over a fixed empirical sampling window. Over a certain number of such sampling windows, a differential (first derivative graph) is computed between the graphs, representing a change of performance over time for the region, user, or server that is the subject of the graph. Clustering and reduction of paths and nodes is performed on the first derivative graphs generated in this manner. Aggregate graph parameters may then be determined across clusters of users, servers, etc. for time intervals of interest. Examples of an aggregate parameters are aggregate latency for a particular game server, data center, geographic region, etc. across clusters of players over a particular time interval.

For reduction/pruning of the graphs, a threshold latency derivative may be applied to graph edges. On condition that the latency derivative (a metric of performance stability) of an edge falls within an assigned range, the edge may be removed from the graph or otherwise ignored for analysis purposes. This provides a mechanism for coarse-graining the graphs to improve the analytical bandwidth (e.g., refresh rate of the graphs in time).

The system may map IP ranges to cities, states, countries, or other geographic regions. The IP ranges are mapped to gainers, POPs, game servers, routers, and data centers. The location of some network devices may be known from installation records whereas the location of others may be inferred using trace routes and multilateration of traffic between devices of known location.

Network configuration, network device hardware status (e.g., working or not, congested or not), network routing (to and from traffic patterns for network devices) and IP configuration may in this manner be measured repeatedly at points in time to generate a sequence of graphs.

When using IP Anycast, a data center or other device may configure and announce an IP block. A data center or device that announces an IP block, even if that data center or device is not receiving traffic, can influence traffic patterns of other data centers or devices that are also announcing the same block.

For example, if a data center in Seattle is using a particular IP block range for proxy services, and if a data center in Sydney Australia starts announcing that same IP block range, even if no device is currently sending any traffic to Sydney, that Sydney announcement may still influence the Seattle traffic patterns.

By analyzing the sequence of graphs thus generated the network performance evolution, both to and from devices, network performance may be evaluated and used for machine learning and network routing improvement. The time derivative of the graphs provides a quantified error function for the learning and improvement. The error function may embodiment an amount of latency improvement that can be achieved by routing changes at points in time, and at what time to make those changes. The graph evolution thus provides a form of competitive analysis for different paths in the network for each gamer at each point in time.

In one embodiment path segments of the first derivative graphs may each be assigned an associated performance metric P based on one or more telemetric readings each taken in different sampling intervals, as follows:

Here $\alpha V_{lo}$ and $\alpha V_{la}$ are instantaneous rates of change in the loss and latency of the path segment, respectively. The weighting factors $\alpha$ and $\beta$ may be adjusted based on the emphasis to place on loss and latency for the type of application that is communicating data over the path segment. For example, some types of applications may be highly sensitive to loss but may tolerate latency to some extent, and vice versa.

In one variation, the rates for loss and/or latency may be taken as absolute values in the determination of P. The sampling interval may, in one embodiment, be set to meet or exceed the Nyquist frequency of a configured rate at which to potentially make routing changes for data on the network. For example, if routing changes are to be (if needed) made every 60 seconds, then real-time telemetry for loss, latency, etc. on the path segments may be performed every 30 seconds, or more frequently than that.

The stability of the loss and/or latency may also be tracked. In one embodiment the stability of a particular path segment characteristic is determined by assigning a signed value to the characteristic, and accumulating the signed value over time. For example given three sampling intervals, if the instantaneous loss on a path segment is positive (increasing loss trend) over the first two intervals but negative over the second two intervals, then the two trends may cancel out and the loss on the path segment may be stable. Stability may be determined over any number of sampling intervals as appropriate for the application. Stability factors may thus be introduced into the algorithm for determining performance of a path segment, for example:

Here S is a path segment (also called "link stability") algorithm, many of which are known in the art, and which may be different for loss ($S_{lo}$) and latency ($S_{la}$). The parameters $\gamma$, $\delta$, $\alpha$, and $\beta$ are weights. The stability function S may also vary based on the nature of the path link or network topology, again as known in the art.

Figure 10:
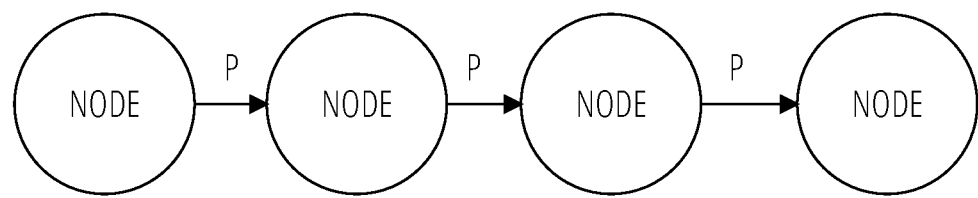
FIG. 10 depicts an exemplary graph reduction.

In some embodiments, the performance metrics for path segments may be determined based on a rate of change of the link stability, for example:

In each case, a lower value of P for a path segment indicates higher performance, and typically makes the path more desirable for routing. Thus the first derivative graphs may each be reduced to a single path over which the overall (accumulated path segment values of) P are lowest. For an example of a reduced graph, see FIG. 10.

The directed acyclic graphs (and thus the first derivative graphs) may be generated based on geographic regions (geoboundaries) configured specifically and differently for different applications (gaming, teleconferencing, etc.). The geoboundaries may be configured to overlap at areas of high extant traffic for particular applications, and/or areas known from historical data to be opportunities for routing particular types of application traffic on certain dates, time of day, etc.

Content delivery networks (CDNs) provide an example use case for IP Anycast. CDNs use short-lived and/or stateless communication connections to deliver large volumes of small, static content (e.g., web pages). In this scenario it is a reasonable assumption that the network routing will remain static for at least the length of a session. If the network routing changes during a session there is minimal impact on the user experience, such as the need to reload a webpage if a session fails in the middle of loading it with a browser application. The assumption of short communication sessions does not extend to network applications involving extended experience of real-time media content such as interactive gaming or video and audio conferencing.

Network routing changes may result in potentially long disruptions in communication sessions that can degrade or destroy a user's experience of real-time media content. The systems and techniques disclosed herein detect anomalies in the routing of packets and respond by rerouting the packet and subsequent packets between an originator and a target in a manner that eliminates or mitigates disruptions of the user experience. This is especially useful during real-time media content communication over data networks.

Telecommunication service providers ("telecoms") typically provide multiple point-of-presence locations to users of their network. These point-of-presence locations are typically implemented in different geographic locations. At any given time a telecom may not have complete or accurate information regarding the network route to a target media destination to which to route communications from an originator. The disclosed techniques and systems provide improvements to the user experience of media content communicated over telecom networks in such scenarios.

IP Anycast implementations include an inherent synchronization limitation. The synchronization limitation arises, for example, when a network server in an IP Anycast environment communicates a packet to an endpoint (e.g., a target), the endpoint responds with a response packet, and the response packet is routed (via IP Anycast) to any of multiple servers that share the same IP Anycast destination address. The server sending the packet isn't configured with advance settings as to which of the multiple servers the response packet will be routed via IP Anycast. This can cause two problems: the server sending the packet may time out the communication session because it doesn't receive a response, and the server receiving the response packet may interpret the packet as unauthorized (e.g., spam or an intrusion).

For example if server A in an IP Anycast network sends a packet to a target device indicating that the device needs to start ringing, and the target device responds with an acknowledgement packet, a server B in the IP Anycast network may receive the acknowledgement packet instead of server A. Server B may generally not have sufficient information about the network state to properly interpret and handle the response packet. This is due to the fact that it has traditionally been challenging to synchronize servers across different locations that are geographically dispersed, e.g., different point-of-presence locations, because of the potentially massive amounts of data, and hence bandwidth, that are required.

In order to form a single "virtual" server from many geographically separate physical servers (e.g., in an IP Anycast network), each of the individual servers needs information about the workload and other activities of all of the others, to share network state, network routing application state, etc. Network latency issues may make it impractical to share network state and network routing application state across all of the servers in a timely and efficient manner. Additionally, traditional networks utilize proprietary applications and control the routing of transmissions over private networks, while operating to minimize the amount of traffic sent over the public Internet.

Network latency may impact the user's experience of communicated real-time media content. As an example, the desired response time for updating items like network or server state is typically less than about 80 milliseconds. A round trip time globally on a fiber network half way around the world is typically 200 milliseconds or more. A delay of this magnitude may be noticed by an end user, such as one making a call using session initiation protocol (SIP), due to a degradation in call quality.

The techniques disclosed herein enable multiple servers that are geographically dispersed to coordinate so as to present as a single "virtual" server to originator and target devices. These devices need not alter their existing (legacy) networking logic to use the virtual server thus presented. A change of configuration settings may suffice. For example, an originator or target device may utilize conventional SIP or Web Real-Time Communication (WebRTC) applications for sending and receiving real-time media content over the virtual server formed by the multiple geographically dispersed individual servers.

The techniques disclosed herein do not rely on consistency of state across the network. A level of network consistency may be tuned based on geography. For example, servers in California, USA, may require notification of changes in network state or network routing application state in a timely manner, but a server in Paris, France, may not require such notifications. The server in Paris may be too far away to be effectively utilized in a real-time media content communication path between originator and target devices in the vicinity of California. If there is incomplete consistency across the network, there is a possibility that a packet may be received by a server that is not configured to respond to it. As a default, many servers will drop that type of packet as Internet spam. The disclosed techniques address this scenario.

In one embodiment the disclosed techniques respond to anomalous network traffic to route communications at the application layer. Upon detecting anomalous traffic being directed to a server, the system may initiate a determination of the state of the anomalous traffic from other machines of the network. For example, the server may react in two different ways. First, the server may retrieve state information from other, geographically nearby servers and take over the task of relaying the media content associated with the anomalous packet. The geographically nearby servers may be determined in manners known in the art, such as by using proximity maps, routing tables, latency pings, and so on.

This may be enabled by syncing the network state, at least locally, and reconfiguring the server receiving the anomalous packet to take over as the relay of the associated media content. A second type of response may be to instruct the requesting server that the receiving server incorrectly received the response or request packet for the media content. The incorrect server may request the original media content and may issue a request to a network routing control to be configured as the relay server of record for the media content. Thus, for a defined IP address domain on the Internet, the server that was previously an incorrect recipient of an unexpected packet is made the default intermediary for routing the associated media content.

The disclosed techniques improve and make more efficient the routing and flow of network traffic. For example, if there are 256 IP addresses that are being advertised from discrete server locations of a virtual server simultaneously in an IP Anycast network, and a session is initiated from location A, then location A by default may initiate with 0.1 IP addresses, location B may initiate with 0.2 IP addresses, and location C may initiate with 0.3 IP addresses, even though all of them may receive all of the IP addresses. If location B receives a packet directed to the 0.1 IP address, it identifies that address with a location A transmission to handle by default, and the packet may be routed to location A by the location B server. This may eliminate the need to do a broadcast lookup request to all of the closest server neighbors to determine the correct server for the received packet. The last octet of the IP address may be applied to uniquely identify which location should be the master of this data. For example, given the IP address block 192.168.1.0/24, which contains the range of addresses 192.168.1.0-192.168.1.255, the last digit in the absolute sense (0-9) does not uniquely identity the address. The final portion 0-255, after the last dot, is referred to as an octet.

Referring to FIG. 1, a content delivery server system 100 comprises an IP Anycast network 102 that is used to deliver media content to a target media destination 114. When the target media destination 114 requests media content from the IP Anycast network 102, the IP Anycast network 102 may request the media content from a group of servers (as depicted, server 110, server 106, server 112, and server 108) sharing a same Anycast IP address 104. One or more of these servers may be initially assigned as a relay server to receive and forward the media content from an upstream media source. The servers may utilize protocols such as Transmission Control Protocol (TCP), Stream Control Transmission Protocol (SCTP), or User datagram Protocol (UDP), for example, to forward the media content downstream to the target media destination 114.

In like fashion, the target media destination 114 may transmit media content to one or more of the servers by directing the media content to the common IP address 104 via the IP Anycast network 102.

A handshake process (e.g., TCP) may be utilized to establish a data connection between the target media destination 114 and the particular one of the servers assigned to relay the media content to the target media destination 114. When the target media destination 114 initiates the connection, the handshake begins with a SYN message from the target media destination 114 to the IP address 104. The SYN is directed by the IP Anycast network 102 to one of the servers and that server acknowledges the SYN by sending a SYN-ACK back to the target media destination 114 via the IP Anycast network 102. The target media destination 114 may then respond to the server with an ACK message, thereby establishing the connection. For purposes of explanation, assume server 110 is the server that is assigned the connection with the target media destination 114 by the IP Anycast network 102.

In some scenarios, e.g., when the server 110 becomes unavailable, the IP Anycast network 102 may route the ACK message from the target media destination 114 to a server other than the server 110 that provided the SYN-ACK. For purposes of explanation, assume this other server is server 106. An upstream media source may continue to direct the media content to the original server 110. If the other server 106 does not properly deal with the unexpected ACK message, the target media destination 114 may experience substantial delays in the experience of the media content, particular real-time media content.

Figure 4:
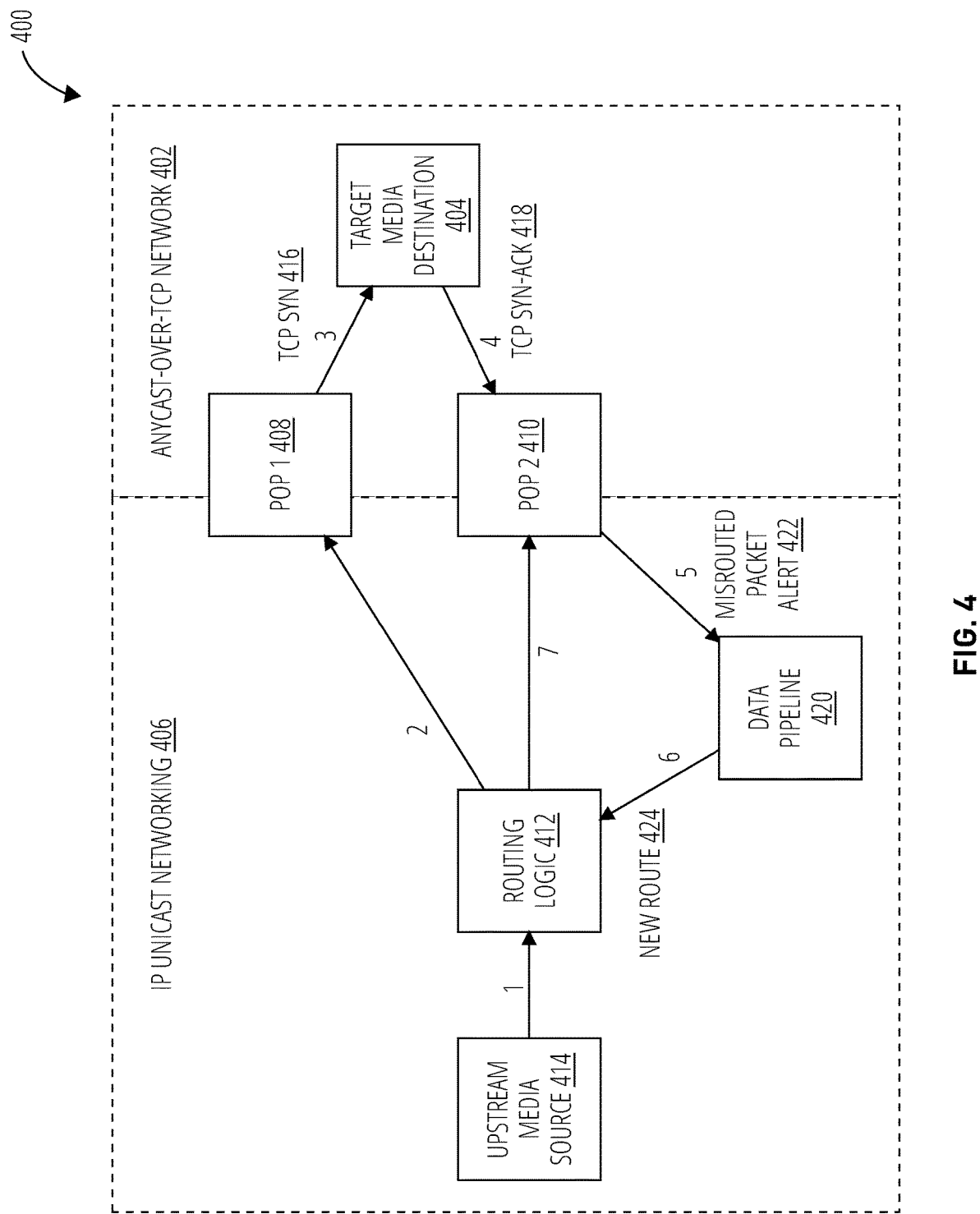
FIG. 4 depicts a point-of-presence system 400 in accordance with one embodiment.

In some cases the server may initiate the connection request with the target media destination 114. In these cases the unexpected event may be the SYN-ACK returned by the target media destination to a different server than the one that initiated the connection with a SYN message. This scenario is depicted in FIG. 4.

In either event, there are several ways to address the problem. First, the other server 106 may take over responsibility for relaying the media content to and/or from the target media destination 114 after receiving routing instructions from the original server 110. Second, a network system controller may update the network state to indicate that the other server 106 is to be the new relay server for the media content to and from the target media destination 114. This may be less desirable because the new state may take some time to take effect in the IP Anycast network 102. Third, if the media content is being provided under the control of a network routing application 1306, the network routing application 1306 may be informed by the server 106 or a network system controller of the triggering event (e.g., wrong destination server for ACK or SYN-ACK) and operate to make the server 106 the endpoint for the media content in the IP Anycast network 102.

Figure 2:
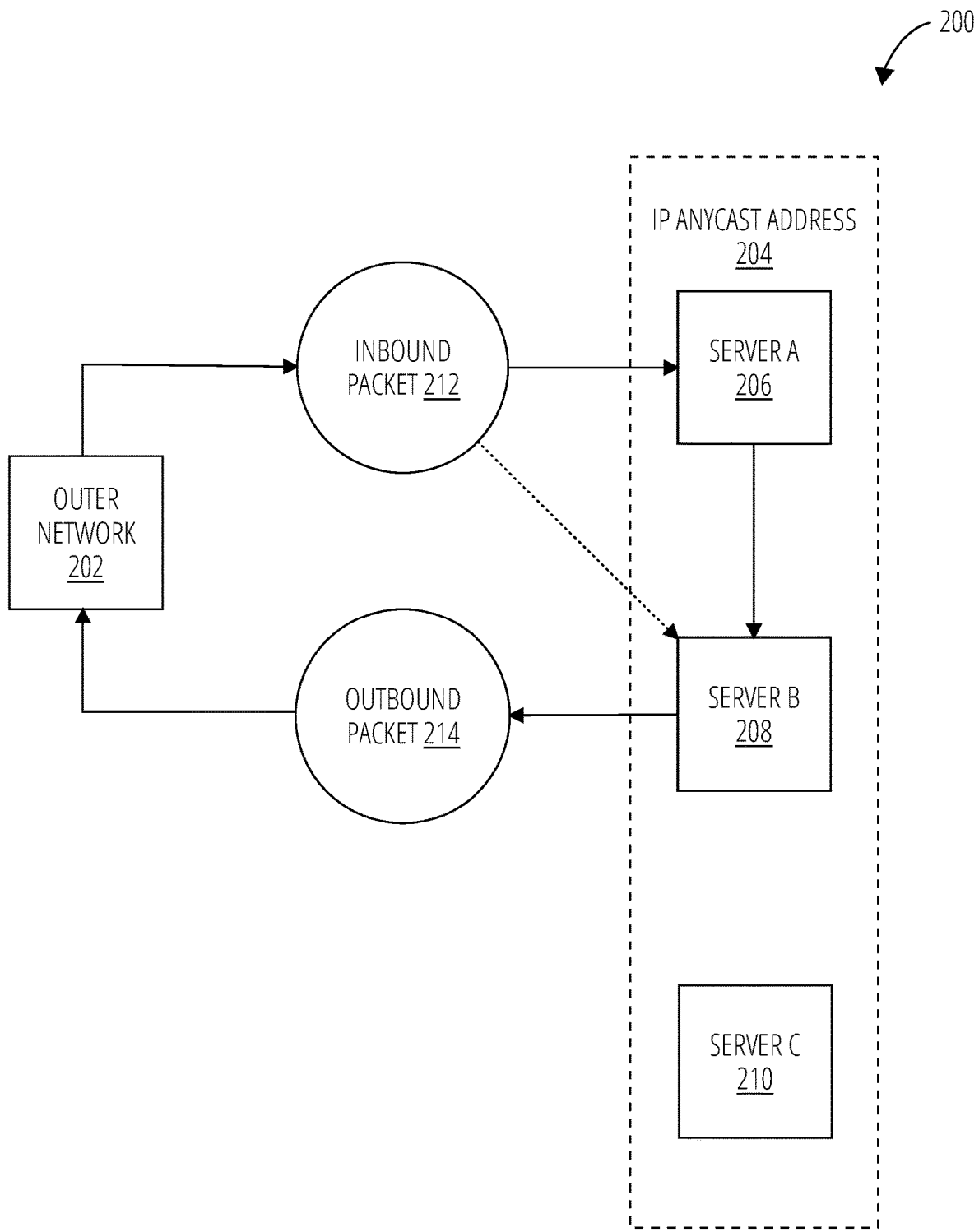
FIG. 2 depicts a server system 200 in accordance with one embodiment.

Referring to FIG. 2, a server system 200 comprises an outer network 202 and an IP Anycast address 204 that maps to a server A 206, a server B 208, and a server C 210. The outer network 202 may request media content from the IP Anycast address 204 by sending an inbound packet 212 to server B 208. Server A 206 may receive the inbound packet 212 instead of server B 208 and may route the request to server B 208. Server B 208 may send an outbound packet 214 to the outer network 202.

The outer network 202 may not be aware that server A 206 received the inbound packet 212 instead of server B 208. If the outer network 202 is not informed of the routing change of the inbound packet 212 from server B 208 to server A 206 then the outer network 202 may continue to inefficiently route requests (e.g., connection requests) for the media content to server B 208.

Figure 3:
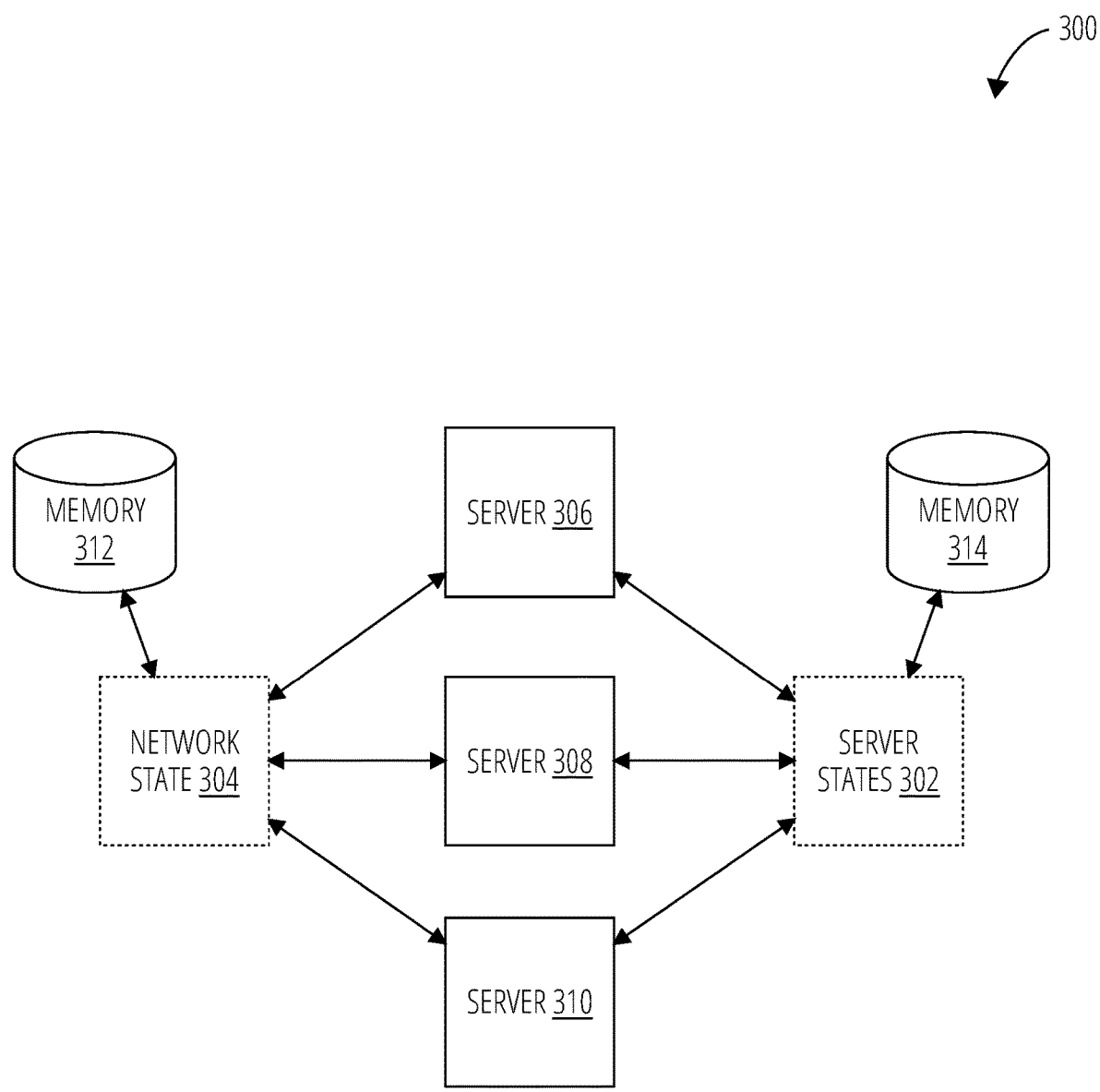
FIG. 3 depicts a server system 300 in accordance with one embodiment.

Referring to FIG. 3, a server system 300 comprises server states 302 in a memory storage 314, a network state 304 in a memory storage 312, and various servers (e.g., server 306, a server 308, and a server 310). Each server updates the memory storage 312 with the any changes to the server states 302. The server states 302 may include the amount of utilization of the capacity of each server, the data bandwidth into and out of each server, etc. Any changes to the resource utilization or availability within, into, or out of a server may result in a change in server state. For example, a state change may occur if the server 306 receives a response (e.g., ACK) from a target media destination that it was not expecting because, for instance, the response should have been sent to server 308.

If the server 306 writes a change to the server states 302 memory, then the server 308 and the server 310 may be informed of this update. Likewise, if the server 310 writes a change to the network state 304, the server 306 and the server 308 will also be informed of this update. A change in the network state 304 may be due to a change in network congestion or links experiencing high packet losses, for example. As long as each of the server 306, the server 308, and the server 310 is able to access the latest server states 302 and network state 304, the server system 300 may adapt to routing or topological changes in the network and continue to operate in an efficient manner.

Referring to FIG. 4, a point-of-presence system 400 comprises an upstream media source 414 exchanging content with a target media destination 404. The upstream media source 414 (e.g., a teleconferencing or gaming server or participant) transmits media content to routing logic 412. The routing logic 412 is disposed in an IP Unicast networking 406 environment and routes the media content to a point-of-presence 408. Upon receipt of the media content the point-of-presence 408 transmits a TCP SYN 416 message to the target media destination 404 located in an Anycast-over-TCP network 402 network environment. Each POP acts as a gateway between the IP Unicast networking 406 and the Anycast-over-TCP network 402, for example by implementing border gateway protocol.

According to the TCP protocol, the target media destination 404 should respond to the TCP SYN 416 message from the point-of-presence 408 by returning a TCP SYN-ACK 418 message to the point-of-presence 408. Due to equipment failures, congestion, or other factors, the Anycast-over-TCP network 402 may direct the TCP SYN-ACK 418 to the point-of-presence 410 instead of the point-of-presence 408. Because the point-of-presence 410 was not the source of the TCP SYN 416 to the target media destination 404, the TCP SYN-ACK 418 received by the point-of-presence 410 from the target media destination 404 is treated as an unprompted SYN-ACK by the point-of-presence 410. The point-of-presence 410 responds to this triggering event by generating a misrouted packet alert 422 to the data pipeline 420. The data pipeline 420 may also be referred to as an 'event handler'. The data pipeline 420 computes and pushes a new route 424 for the media content from the upstream media source 414 to the routing logic 412, which may be a network routing application. The new route 424 from the upstream media source 414 to the target media destination 404 traverses the point-of-presence 410, not the original point-of-presence 408 that was used to route the media content to the target media destination 404.

A network system controller may comprise or interact with the routing logic 412 which may be disposed in an IP Unicast network environment (e.g., on the Internet or on a private network). The media content may be routed using the routing logic 412 through a first media endpoint (e.g., a point-of-presence) to the target media destination 404. The first media endpoint may send a SYN to the target media destination 404 to request a connection, where the first media endpoint is in or a gateway to an Anycast-over-TCP network 402 network environment that includes or intermediates between the first media endpoint and the target media destination 404. The SYN is received by the target media destination 404 which acknowledges receipt of the SYN by sending a SYN-ACK to an IP Anycast address that includes the first media endpoint and the second media endpoint (e.g., a different point-of-presence than the one that sent the SYN). This results in a triggering event. In response to the triggering event, an alert is sent from the second media endpoint to a data pipeline 420, wherein the alert is for the misrouting of the SYN-ACK. A new route of the media content is pushed from the data pipeline 420 to the routing logic 412, where the new route includes the second media endpoint. Next the media content is routed from the upstream media source 414 using the new route to the second media endpoint, followed by routing the media content from the second media endpoint to the target media destination 404.

Figure 5:
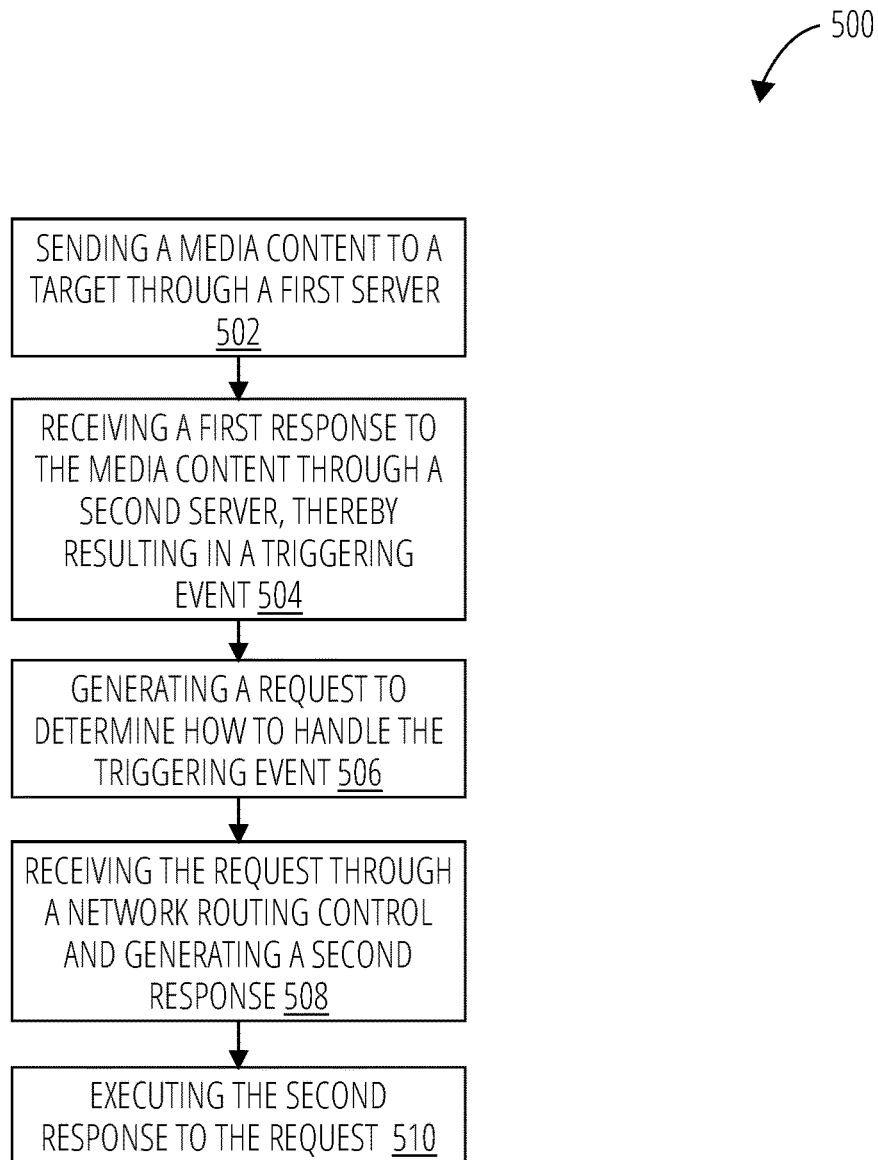
FIG. 5 depicts a media content rerouting process 500 in accordance with one embodiment.

Referring to FIG. 5, a media content rerouting process 500 comprises sending media content to a target through an IP Unicast network to a first server (block 502) that acts as a gateway to an IP Anycast network. In an embodiment, the media signal is sent through a network routing application that resides in (is comprised by) the IP Unicast network.

A first response to the media content is received at a second media server, other than the first media server, thereby initiating a triggering event (block 504). The second media server may also be a gateway between the IP Anycast network and the IP Unicast network. The first response (e.g., a SYN-ACK in response to a SYN from the first media server) is provided by the target but is directed by the IP Anycast network to the second media server instead of the first media server. The first media server and the second media server may share a common IP address in the IP Anycast network.

A request is generated by the second media server to determine how to handle the triggering event (block 506). In an embodiment, the request may be received through a network routing control in the IP Unicast environment. The network routing control may include network mapping functionality. A second response to the request may be generated (block 508). If the media content is sent via a network routing application to the target media destination, the second response may be at least one of changing the internal mapping of a networking layer between the location of the first media server and the second media server, changing a network routing application that is assigned to route the media content, instructing the network routing application to reroute the media content through a different server, and combinations thereof. The media content rerouting process 500 further comprises executing the second response to the request (block 510).

Figure 6:
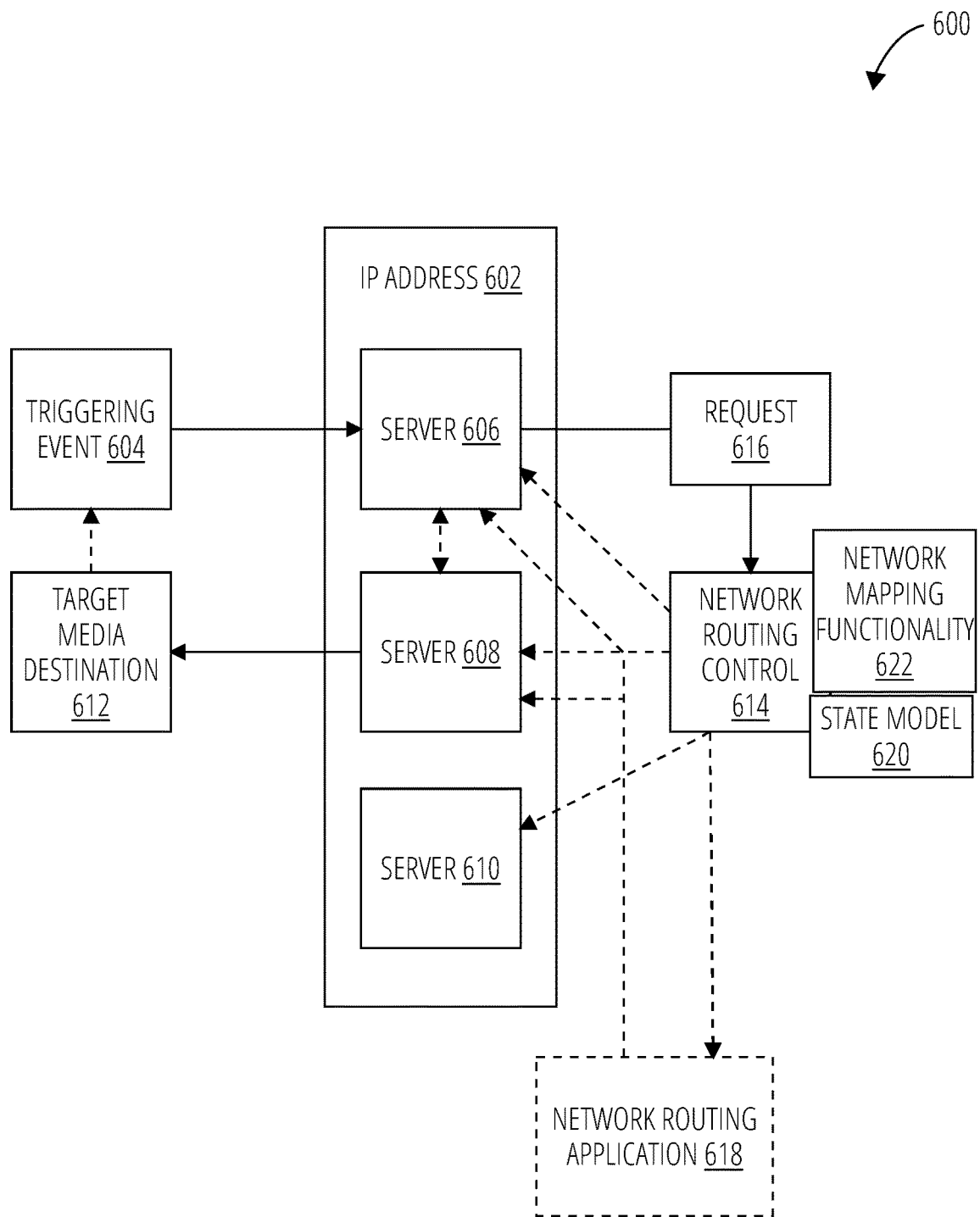
FIG. 6 depicts a server system 600 in accordance with one embodiment.

Referring to the server system 600 of FIG. 6, a triggering event 604 that may or may not originate from a target media destination 612 reaches a server 606 at an IP address 602. The dashed lines with directional arrows represent signals that may or may not occur (i.e., optional signals or routes) in response to this triggering event 604, depending on the implementation. The triggering event 604 may be any number of things, such as an incorrect packet being routed to the server 606 or a communication session that is unexpectedly interrupted at the server 606. A state request 616 is initiated by the server 606 at the IP address 602. The IP address 602 may map to all three of server 606, server 608, and server 610.

In response to the request 616, the network routing control 614 may issue instructions to each of server 606, server 608, and server 610, or to a network routing application 618. Upon receiving routing instructions, at least one of server 606, server 608, and server 610, or the network routing application 618, may route media content to a target media destination 612. One or both of network routing control 614 and network routing application 618 may be external to the IP Anycast network that comprises the IP address 602, or they may both be part of the IP Anycast network. In one embodiment each of these components resides in an IP Unicast network.

The network routing control 614 may respond to the request 616 by reading differential and spatial information from a state model 620 at a machine learning/artificial intelligence server. This server may be part of the network routing control 614 or a separate component. The network routing control 614 may utilize the retrieved information to generate and output rerouting information to at least one of server 606, server 608, and server 610.

Generally, an upstream media source may send a message (e.g., a media content packet) to a target media destination 612 over a data network. That message may initially be routed through one of the servers (e.g., server 608) to the target media destination 612. The target media destination 612 may respond to the server 606 instead of the server 608, especially if both of the server 606 and the server 608 are assigned to a common IP Anycast address. There are several ways to handle such a triggering event 604.

First, server 606 may cooperate with server 608 to ensure that the target media destination 612 receives the message. To determine that the message originated through the server 608, the server 606 may perform a lookup via network mapping functionality 622 which may be implemented in the network routing control 614. In some embodiments the network routing control 614 is a centralized or distributed network routing application 618.

If the server 608 was a relay server for the message then the server 606 may instruct the network routing control 614 to relay messages to the target media destination 612 through the server 606 instead of through the server 608. The network mapping functionality 622 may be updated with the new routing information.

There are a number of ways the server 606 may handle the triggering event 604, for example: (1) cooperating with the other servers (server 610, server 608) to handle the media content, (2) accepting responsibility for handling the media content, (3) rejecting the media content, or (4) instructing the network routing control 614 to perform a rerouting of the media content. Thus, reactions by the server 606 to the triggering event 604 may include changing the network mapping functionality 622 at the networking layer in the network mapping functionality 622, switching responsibility for routing the media content to a different network routing application 618, instructing the network routing control 614 to reroute the media content through a different relay server, and combinations thereof. The triggering event 604 and/or the reconfiguration initiated in response to the triggering event 604 may occur at the networking layer or the application layer, or both.

Packet activity and events at the networking layer may be monitored throughout the IP Anycast network and recorded to assist with decisions on how to handle anomalous packets. Monitoring may include detecting and recording the nature of anomalies, the time of such anomalies and the servers where they occur, and details from anomalous packets (e.g., addresses, settings, data payload . . . ). The network routing control 614 may utilize the network mapping functionality 622 for this purpose. The network routing control 614 may be implemented by a dedicated server or servers, or by one or more of the servers that relay media content (e.g., server 606, server 608, or server 610). As previously noted, the network routing control 614 may in some embodiments utilize or be implemented with one or more network routing application 618.

In one embodiment, the server 608 may initially receive the media content to provide to the target media destination 612. When the network routing application 618 (e.g., anomalous ACK or SYN-ACK) is received by the server 606, the server 606 may engage the network routing control 614 to instruct the server 608 to respond to the network routing application 618 event, in effect re-synchronizing the server 608 and the target media destination 612. In another embodiment, when the server 608 fails to receive the SYN-ACK or ACK, it may engage the network routing control 614 to determine if another server anomalously received the SYN-ACK or ACK and reported it to the network routing control 614.

After the triggering event 604 at the server 606 a decision may be determined to either reconfigure the network routing at the networking layer or at the application layer of a network routing application. The reconfiguration may comprise a packet route, a packet reroute, or use of a proxy. The decision may be made available to each of server 606, server 608, and server 610.

In an embodiment, a profiling process may be undertaken in advance of the communication of real-time media content to particular target media destinations or other (e.g., intermediate) endpoints. Profiling packets may be communicated to endpoints that are suspect, or to a subset of the endpoints on the network, to determine if backscatter (i.e., bounced or incorrectly routed packets) occurs. Any server of the IP Anycast network, or the network mapping functionality 622 of the network routing control 614, may initiate this process by pinging nodes that it expects to communicate with, and if it does not receive a correct ping response from a particular node, the routing for packets of the upcoming real-time media content may be adjusted accordingly.

Figure 7:
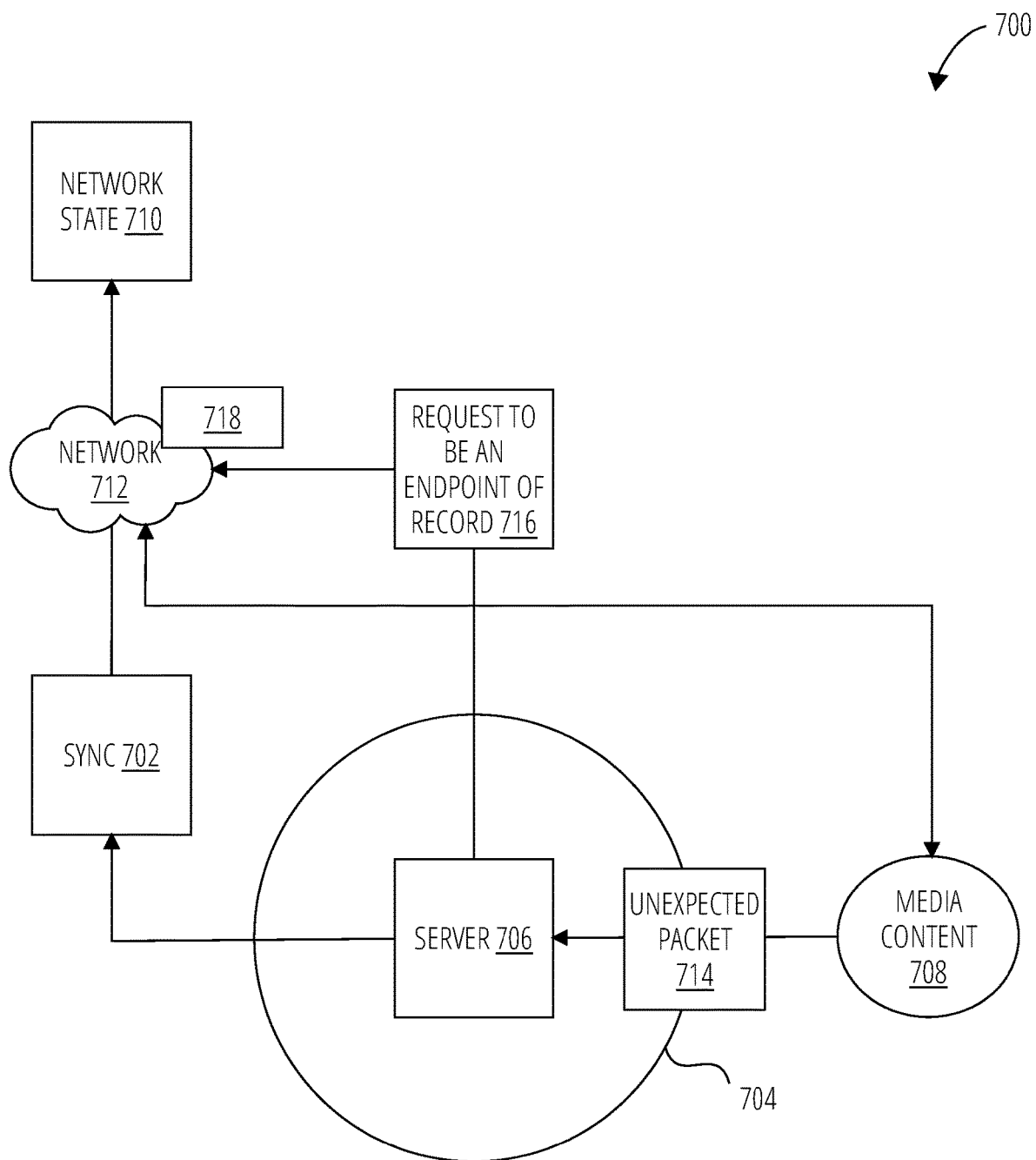
FIG. 7 depicts a server system 700 in accordance with one embodiment.

Referring to FIG. 7, a server system 700 comprises a point-of-presence 704 including a server 706 that receives an unexpected packet 714 associated with media content 708 directed to another server. The server 706 may issue a request to be an endpoint of record 716 to a network routing control 718 of the network 712, and may optionally sync 702 with other servers of the network 712. The network routing control 718 may update the network state 710 upon granting the request to be an endpoint of record 716 to the server 706.

On a conceptual level, the server system 700 may splice into the TCP stack and/or into other communication protocol stacks such that when an unexpected packet 714 is received, a triggering event to the network routing control 718 is generated. An event logging system may record the triggering event and an artificial intelligence system implementing network mapping functionality may utilize and learn from the log. Denial of service protection may be implemented by applying the network mapping functionality to the network routing control 718 to filter unexpected packets that fit the profile of attacks from ever reaching point-of-presence servers such as server 706.

Figure 8:
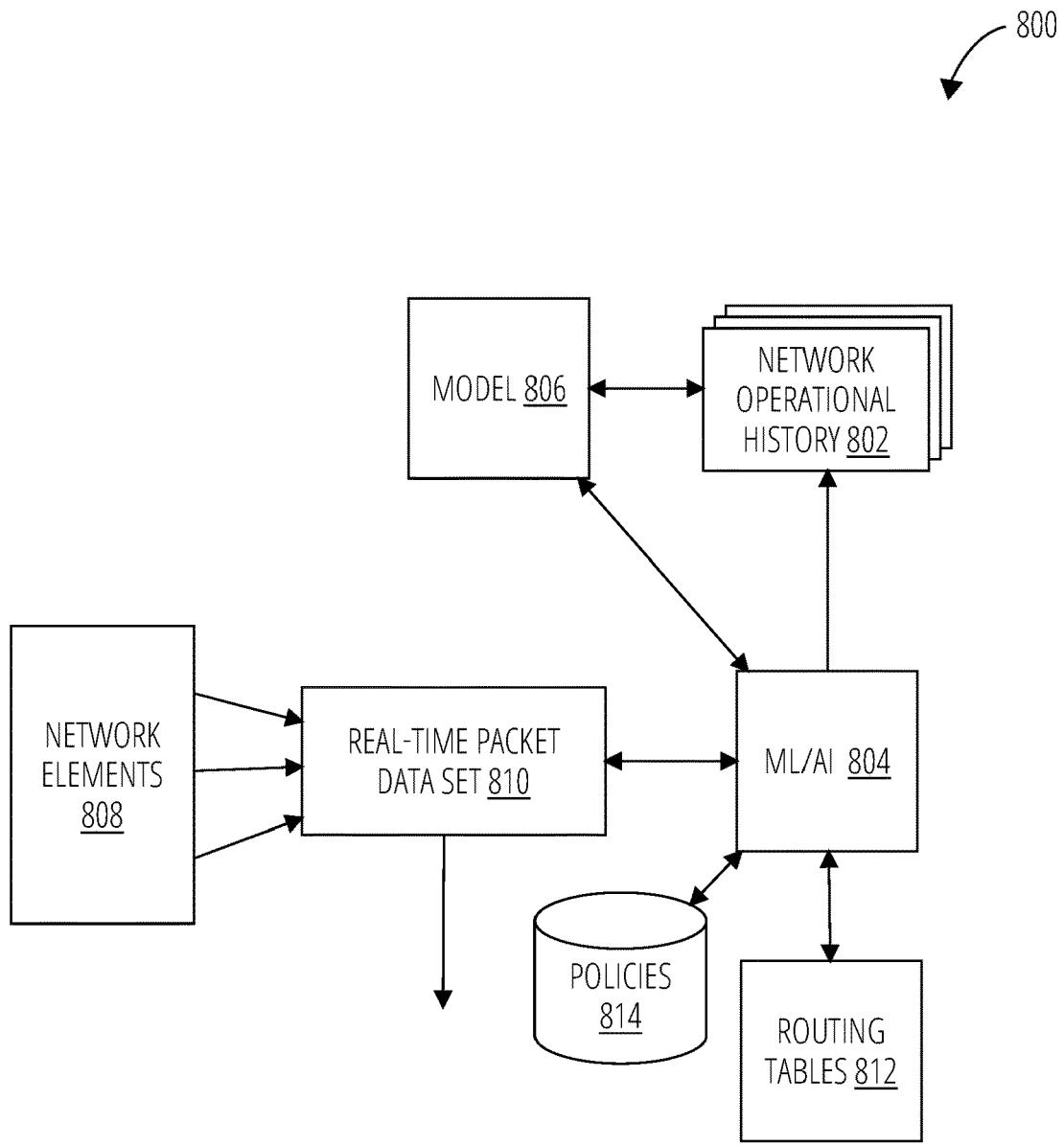
FIG. 8 depicts network mapping functionality 800 in accordance with one embodiment.

Referring to FIG. 8, network mapping functionality 800 operates, in this example, on a real-time packet data set 810 from network elements 808 (servers, routers, switches etc.) during network operation. The network mapping functionality 800 may also or alternatively operate on recorded network operational history 802.

The real-time packet data set 810 is applied to a machine learning/artificial intelligence algorithm 804 (ML/AI data stream), possibly along with the network operational history 802, to generate a model 806 of the network, including connectivity, routing, and performance dimensions. The machine learning/artificial intelligence algorithm 804 uses the model 806 to identify features of the network, such as routing weaknesses, congestion, or other patterns such as those indicating a denial of service attack. The machine learning/artificial intelligence algorithm 804, which may be part of the network mapping functionality implemented by a network routing control, may then modify the network's routing tables 812, and/or modify the real-time packet data set 810 according to configured network policies 814.

Logs of the real-time packet data set 810 may be provided to applications such as Apache Kafka™, a distributed streaming platform, or Elasticsearch™, a distributed, Representational State Transfer (RESTful) search and analytics engine. In some embodiments, the machine learning/artificial intelligence algorithm 804 is a subscription service. The machine learning/artificial intelligence algorithm 804 may write raw data from the real-time packet data set 810 to the network operational history 802 and/or may write information about the model 806.

The model 806 (which may be one or more models) may be provided, at least in an initial version, by a third party, with access purchased through a subscription. The real-time packet data set 810 may be received from one source (IP address, port, gateway, aggregating network component etc.) or many different sources. The real-time packet data set 810 may be applied to the model 806 to determine appropriate actions in response to triggering events. The machine learning/artificial intelligence algorithm 804 may perform batch processing computations on the real-time packet data set 810 for improved performance and/or simultaneous generation or updating of multiple models.

The monitoring and modeling by the machine learning/artificial intelligence algorithm 804 may be implemented on a single (e.g., dedicated) server or in a single data center. The logic for the machine learning/artificial intelligence algorithm 804 may be distributed across the network. This real-time packet data set 810 may be recorded continuously to the network operational history 802 and then processed at regular time intervals. In an embodiment, after receiving the data for a certain interval of time, such as 7 days, 14 days, 21 days, etc., the real-time packet data set 810 is processed by the machine learning/artificial intelligence algorithm 804 using batch computations to determine how or if to update the model 806.

The network operational history 802 may be structured in such a manner as to implement the model 806 or a substantial portion of the model 806. Potential updates to the model 806 may be tested to determine their effectiveness before being deployed broadly. The data sets used by the machine learning/artificial intelligence algorithm 804 may represent a small interval, such as one hour, of data received at a single data center. The data sets may also be larger, such as one day across the entire platform (all data centers). A portion of the network operational history 802 may be applied (e.g., simulated operation) to the network to compare the results to desired performance metrics and determine if an update to the model 806 will work properly and/or will improve operations.

The model 806 may detect whether incoming data streams meet expectations, and determined what can be validated elsewhere in the system. This use case may be implemented in an intrusion detection service used to validate real time traffic state. In conventional network operations, latency becomes an issue because network routing may require reviewing several minutes to several hours of past data to determine a previous network state. The present disclosure describes techniques for performing this analysis in real time. Intrusion detection systems may be used as an example because they are conventional services performing a similar real time evaluation.

Figure 11:
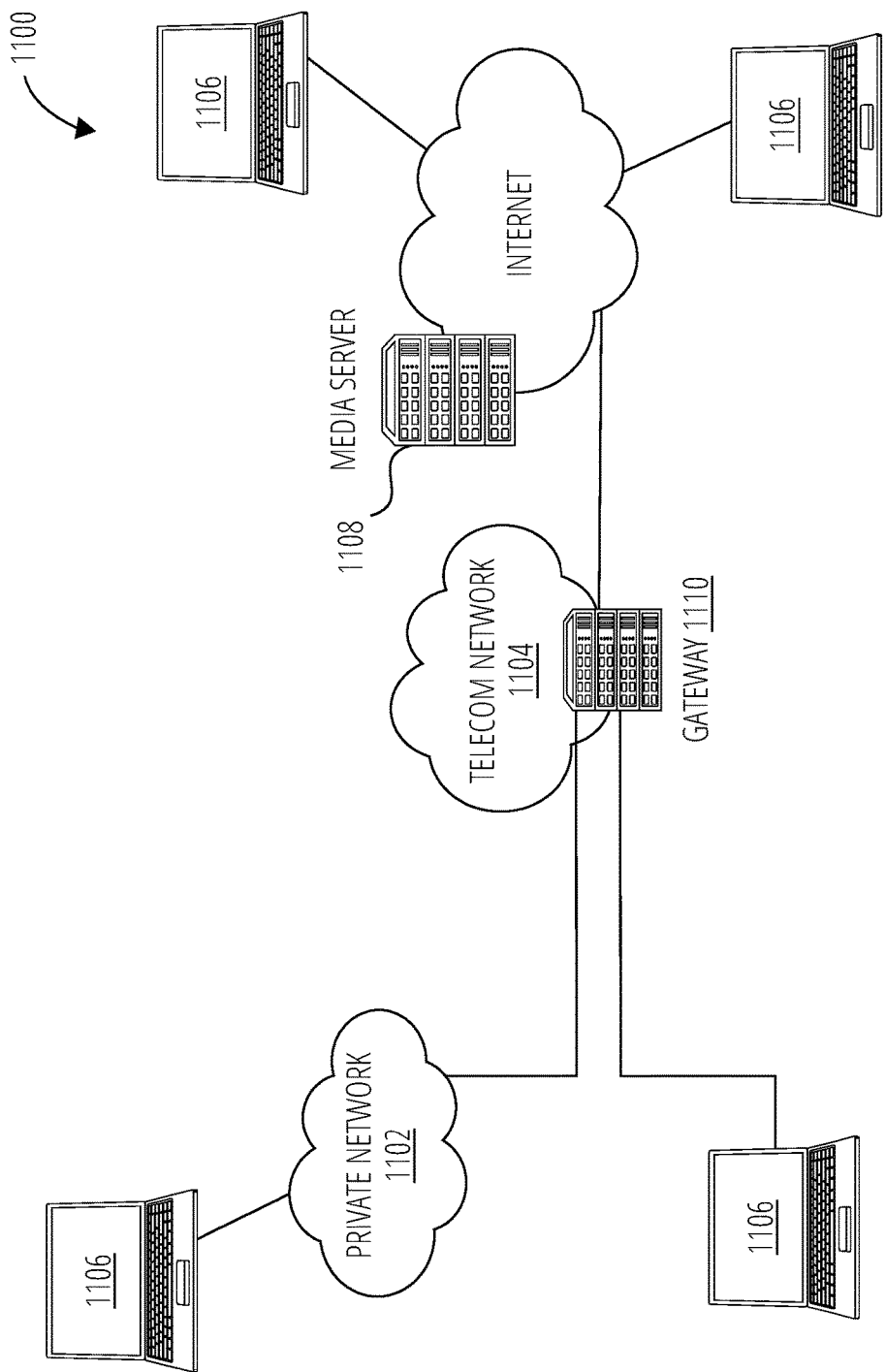
FIG. 11 depicts a network architecture 1100 in accordance with one embodiment.

FIG. 11 depicts a network architecture 1100 in accordance with one embodiment. The network architecture 1100 in this example includes sub-networks comprising a private network 1102, telecom network 1104, and the Internet. A number of user devices 1106 communicate with one another using the network architecture 1100, for example to engage in interactive online gaming or voice/video conferencing. Any of the user devices 1106 may act as an originator and/or target of media content. In a typical scenario one of the sub-networks within the overall network architecture 1100 comprises a media server 1108 (usually more than one) to coordinate the distribution of the media content among the user devices 1106. Each of the sub-networks typically includes many other well known components that are not depicted for simplicity of illustration. These components include routers, hubs, switches, storage systems, and the like. The sub-networks may be interfaced to one another using components such as a gateway 1110.

In the depicted example the telecom network 1104 will typically utilize many gateways each providing a point-of-presence to the Internet or another network. The gateway 1110 typically functions as a router, which directs packets that arrive at the gateway 1110, and as a switch, furnishing the actual path in and out of the gateway 1110 for packets.

The private network 1102 and the Internet in this example may operate as IP Unicast networks, whereas the telecom network 1104 may operate as an IP Anycast network.

Figure 12:
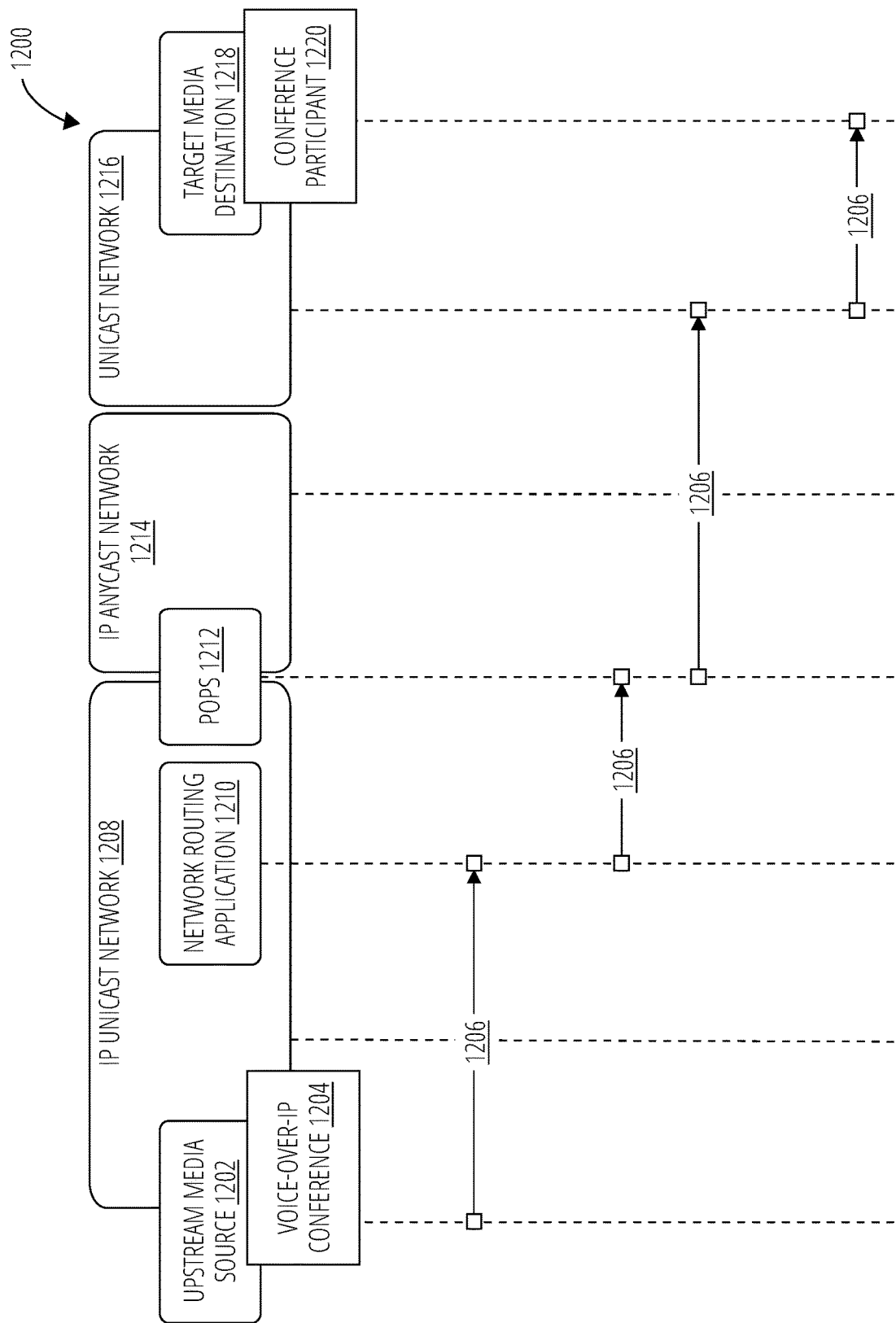
FIG. 12 depicts a media content transmission process 1200 in accordance with one embodiment.

FIG. 12 depicts media content transmission process 1200 in accordance with one embodiment. An upstream media source 1202, such as a voice-over-IP conference server or gaming server, acts as an originator of time-sensitive real-time media content, such as a combined audio and video stream from multiple participants of a teleconference (the server originates the combined stream, not individual streams from user devices). In this scenario the upstream media source 1202 intermediates between user devices in an audio/video teleconference or interactive game, for example.

The real-time media content in audio/video teleconferences is time-sensitive in the sense that should a portion of the data be lost due to a failure in the network, recovery cannot be made, as the delayed data is significantly reduced in usefulness; for example, media content comprising a voice-over-IP conference 1204 stream will, if lost from the meeting, not be recoverable as useful data once that portion of the meeting is past. Furthermore, real-time media content is highly sensitive to network traffic latency.

Media content 1206 may be communicated from the upstream media source 1202 over an IP Unicast network 1208 via a network routing application 1210. This network routing application 1210 may route the media content 1206 to one of the points-of-presence 1212 to the IP Anycast network 1214. The network routing application 1210 may comprise logic to implement aspects of the techniques described herein, as will be discussed further below.

The points-of-presence 1212 act as a gateway for the media content traffic between the IP Unicast network 1208 and an IP Anycast network 1214. The IP Anycast network 1214 makes the points-of-presence 1212 appear as a single virtual server with a common IP address to devices communicating over the unicast network 1216. If a specific POP experiences a failure or outage media content can continue to flow between the upstream media source 1202 and the target media destination 1218 (e.g., a conference participant 1220) using the same IP address without reconfiguration of the applications (e.g., games, conferencing applications) on these devices.

This may be accomplished by maintaining server states and networks states such that each of the points-of-presence 1212 can be assigned to any of the address translations the IP Anycast network 1214 will be expected to handle, in addition to an assigned set of translations a specific POP will be expected to perform. Thus each of the points-of-presence 1212 may take over translation typically handled by any other POP that happens to fail, and may be able to notify the network routing application 1210 of unexpected translation requests.

The media content 1206 received by a POP may be communicated over the IP Anycast network 1214 to a unicast network 1216. From there the media content 1206 may flow to the target media destination 1218, such as the conference participant 1220. The target media destination 1218 may return an acknowledgement (ACK) to the particular one of the points-of-presence 1212 that was the originator endpoint of the media content 1206.

Figure 13:
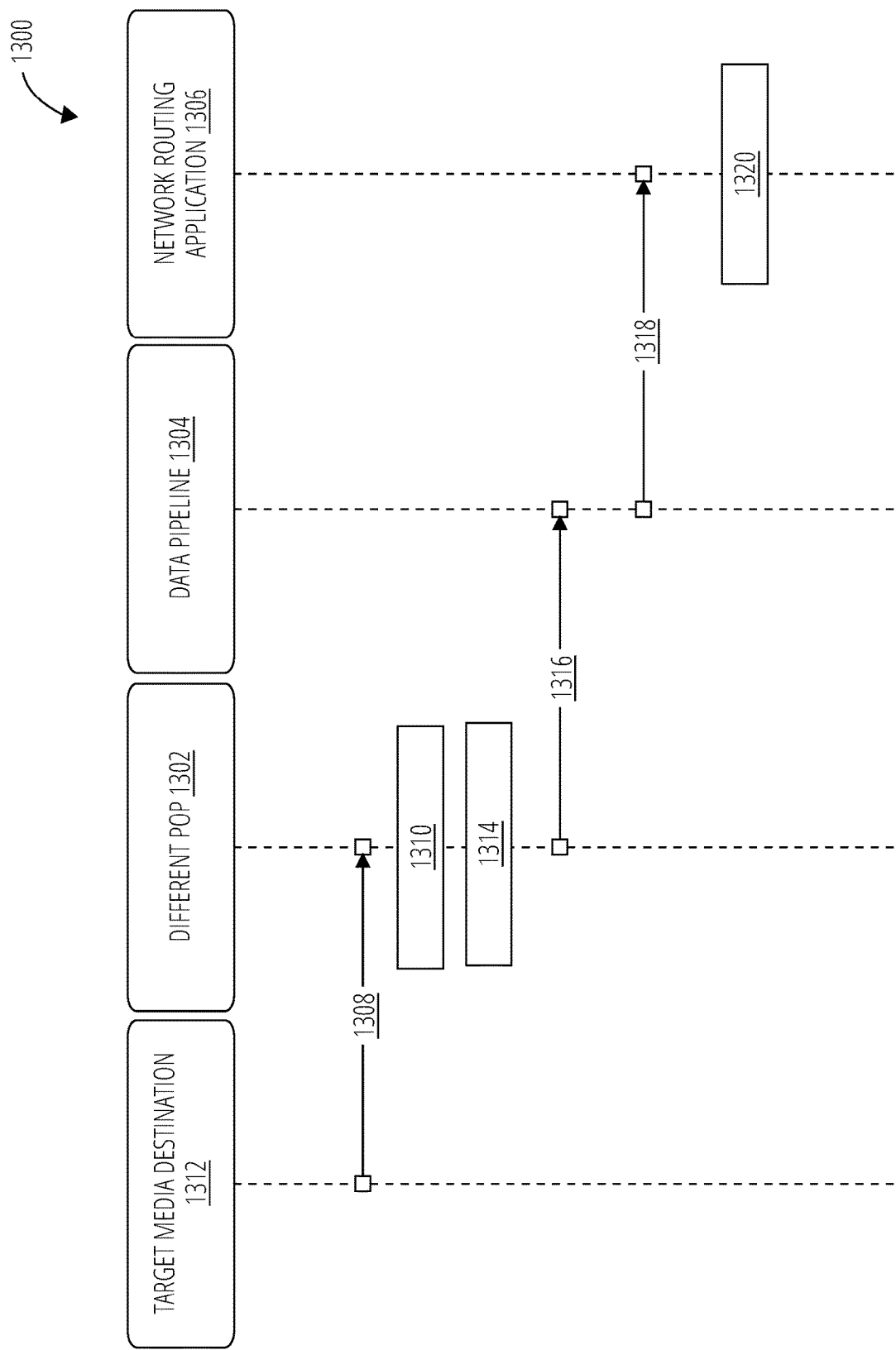
FIG. 13 depicts an alert response process 1300 in accordance with one embodiment.

FIG. 13 illustrates an alert response process 1300 in accordance with one embodiment. A target media destination 1312, such as the conference participant 1220, may transmit an ACK message 1308 upon receipt of the media content 1206. From the perspective of the application on the target media destination 1312 device, the virtual server formed by all of the points-of-presence 1212 is the endpoint device for the ACK message 1308. This ACK message 1308 may thus be transmitted back through the unicast network 1216 to the IP address shared by all of the points-of-presence 1212 on the IP Anycast network 1214. The point-of-presence that receives the ACK message 1308 may not be the same POP that sent the media content. FIG. 13 depicts a scenario in which a different point-of-presence 1302 from the one that sent the media content 1206 receives the ACK message 1308 from the conference participant 1220 that received the media content 1206.

The different point-of-presence 1302 may be programmed to handle translation for and accept acknowledgement from a target media destination 1312 that was previously serviced by another POP. This might be necessary due to a failure of the original POP. In conventional systems, only one POP may be assigned to and capable of handling address translation to and from a particular target media destination. Other POPs on the same system may reject traffic from devices they aren't familiar with. Should the assigned POP experience a failure, data transmission to and acknowledgement from that target may be disrupted until or unless POP functionality is restored or until the network or target media destination performs a reconfiguration.

With regard to the system disclosed herein, however, each of the points-of-presence 1212 is enabled with the capability of performing translation for all expected target media destinations. In the case that an unfamiliar ACK message is received 1310 the different point-of-presence 1302 continues the address translations and transmissions performed by the POP that originally provided the media content 1206 thus preserving an uninterrupted real-time media content experience by the conference participant 1220.

When the unfamiliar ACK message is received 1310 it is a triggering event that initiates address translation 1314 by the different point-of-presence 1302. The different point-of-presence 1302 communicates a translated address and notification 1316 to a data pipeline 1304. The translated address and notification 1316 may include various identifying information about the unexpected packet.

The data pipeline 1304 may be a server or other network equipment providing a corrective feedback mechanism implemented locally or globally. Multiple data pipelines may be configured to manage local events on one time scale while regional and/or global data pipelines operate on a broader timescale.

When the data pipeline 1304 receives the translated address and notification 1316 from the different point-of-presence 1302 it communicates the translated address and notification 1318 to the network routing application 1306.

The network routing application 1306 may perform an internal reconfiguration 1320 such as updating routing tables or mapping the IP address of the POP that provided the media content 1206 to the target media destination 1312 originally to the IP address of the different point-of-presence 1302.

In some environments the network routing application 1306 may communicate with the upstream media source 1202 to alter the endpoint IP address used by upstream media source 1202 to send media content to the target media destination 1312. For example a voice and video conference server with this capability may be provided with the IP address of the different point-of-presence 1302 by the network routing application 1306 and may switch to communicating the media content to this IP address instead of the original POP that serviced the target media destination 1312. Otherwise the network routing application 1306 may perform this rerouting on behalf of the upstream media source 1202.

Thus the network routing application 1306 may reassign the upstream media source 1202 to a new POP, or the network routing application 1306 may update its routing tables such that the upstream media source 1202 sees no change in the POP it is communicating with. In either case media content from the upstream media source 1202 is streamed through the different point-of-presence 1302 to the target media destination 1312, and vice versa.

Figure 14:
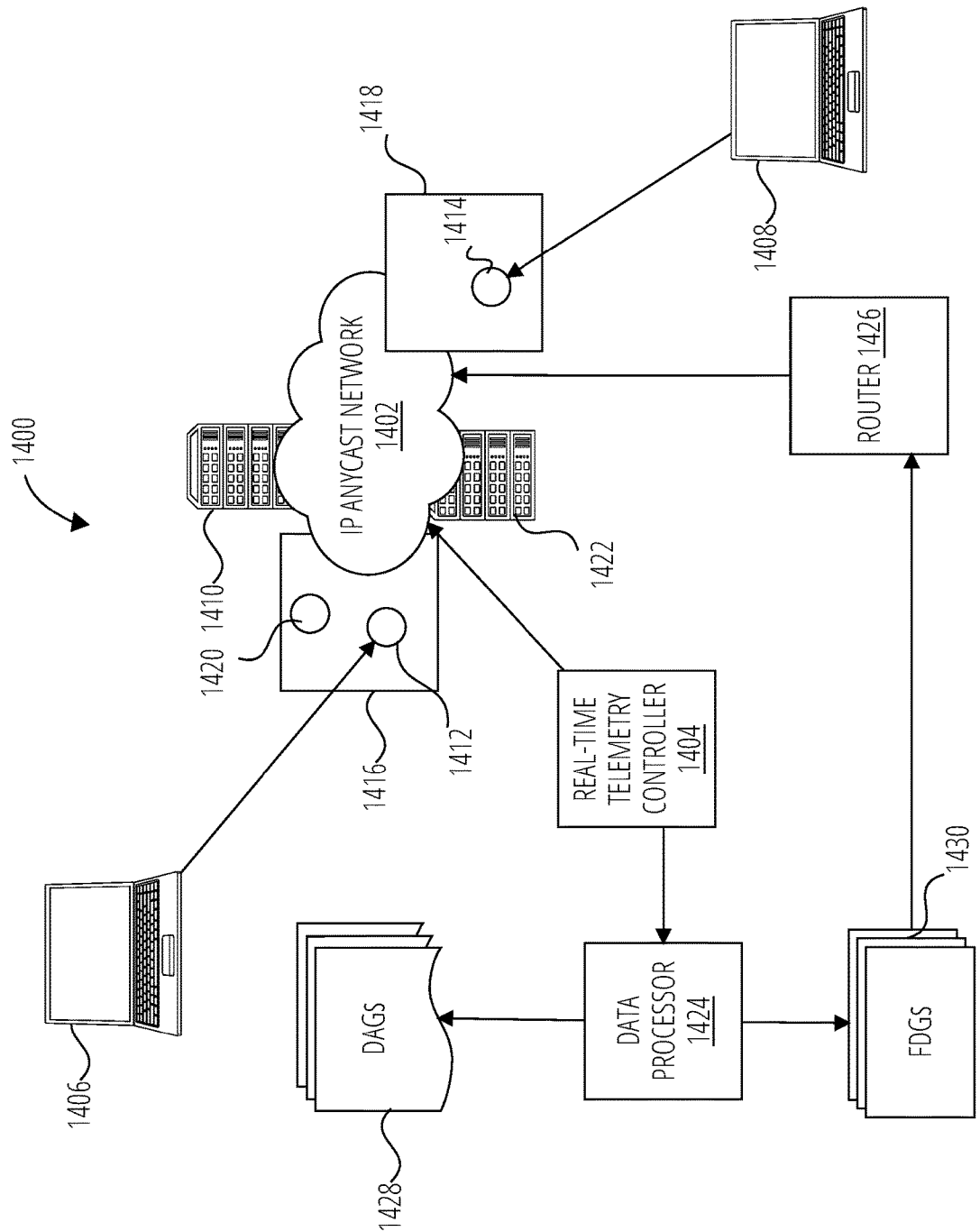
FIG. 14 depicts a network analyzer system 1400 in accordance with one embodiment.

FIG. 14 depicts a network analyzer system 1400 in one embodiment. The network analyzer system 1400 comprises an IP Anycast network 1402, a real-time telemetry controller 1404, and various gaming machines (gaming machine 1406, gaming machine 1408) engaged in real-time online activity via a game server 1410. The gaming machines access the IP Anycast network 1402 via points-of-presence (point-of-presence 1412, a point-of-presence 1414) provided by Internet Service Providers (Internet Service Provider 1416, Internet Service Provider 1418). The real-time telemetry controller 1404 measures natural network traffic generated by the real-time online activity generated by the gaming machines. Synthetic network traffic is also generated by a synthetic POP 1420 and a synthetic server 1422. The natural network traffic and the synthetic network traffic measured by the real-time telemetry controller 1404 are provided to a data processor 1424 (e.g., utilizing the network routing application 1210 for application layer routing, or by one or more router 1426 or switches for network layer routing) that utilizes generated directed acyclic graphs 1428 and first derivative graphs 1430 for the network traffic to and from the game server 1410 and each of the gaming machines.

The "router 1426" depicted in FIG. 14 may typically represent the configured destination node to route the network traffic to at each node in the selected path from source to destination gaming machines (for example), and more generally the configured routing destinations between endpoints of any path segment in the IP Anycast network 1402.

There would typically be many game servers, many more gaming machines, points-of-presence etc. in the network analyzer system 1400. More than one real-time telemetry controller 1404 may typically be utilized. There may typically be unicast networks involved in the network traffic in addition to one or more IP Anycast networks 1402.

Figure 15:
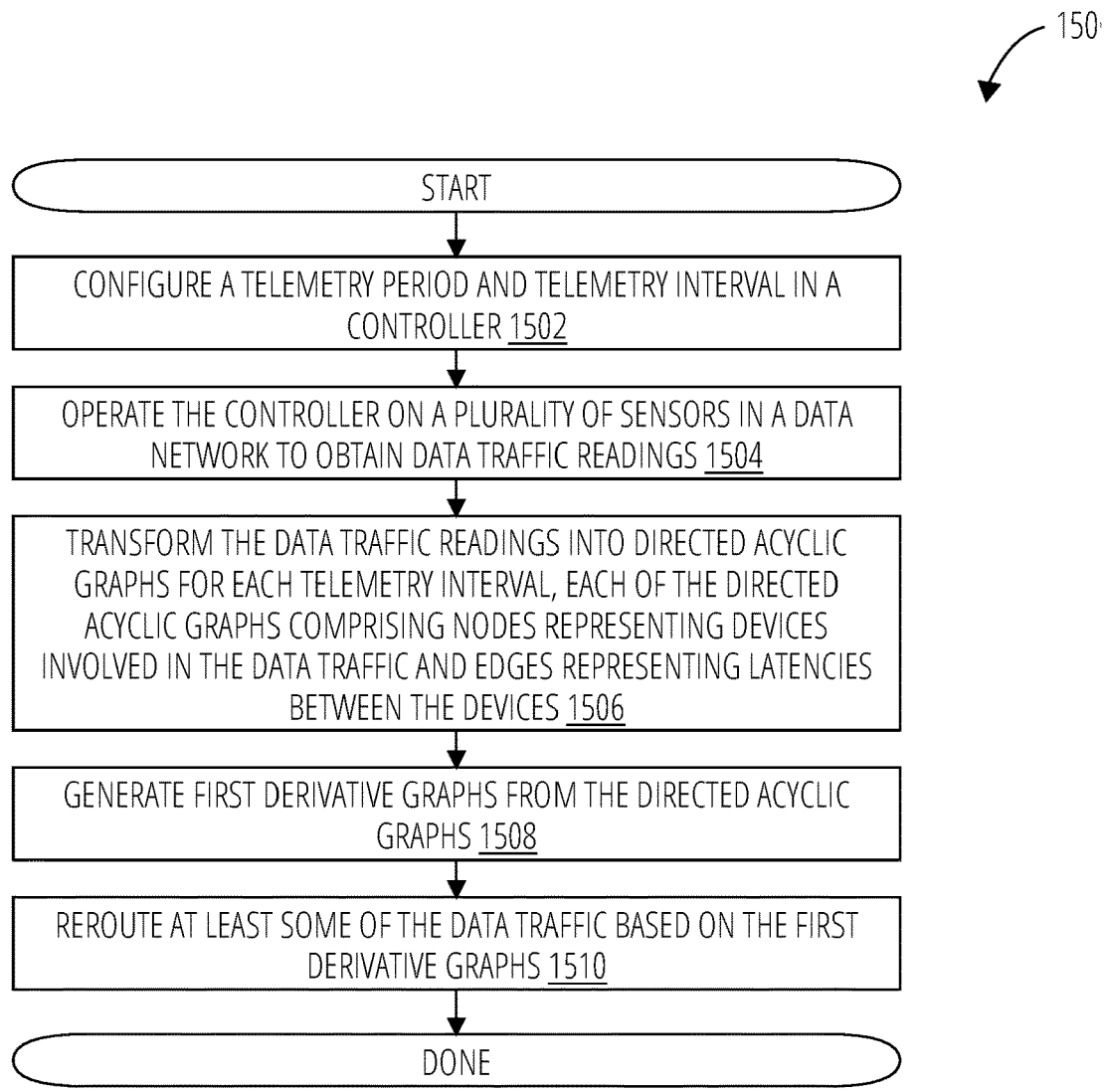
FIG. 15 depicts a network traffic routing process 1500 in accordance with one embodiment.

FIG. 15 depicts a network traffic routing process 1500 in one embodiment. At block 1502, a telemetry period and telemetry interval are configured in a controller. At block 1504, the controller is operated on a plurality of sensors in a data network to obtain data traffic readings. At block 1506, the data traffic readings are transformed into directed acyclic graphs for each telemetry interval, each of the directed acyclic graphs including nodes representing devices involved in the data traffic and edges representing latencies between the devices. At block 1508, first derivative graphs are generated from the directed acyclic graphs. At block 1510, at least some of the data traffic is rerouted based on the first derivative graphs.

Figure 16:
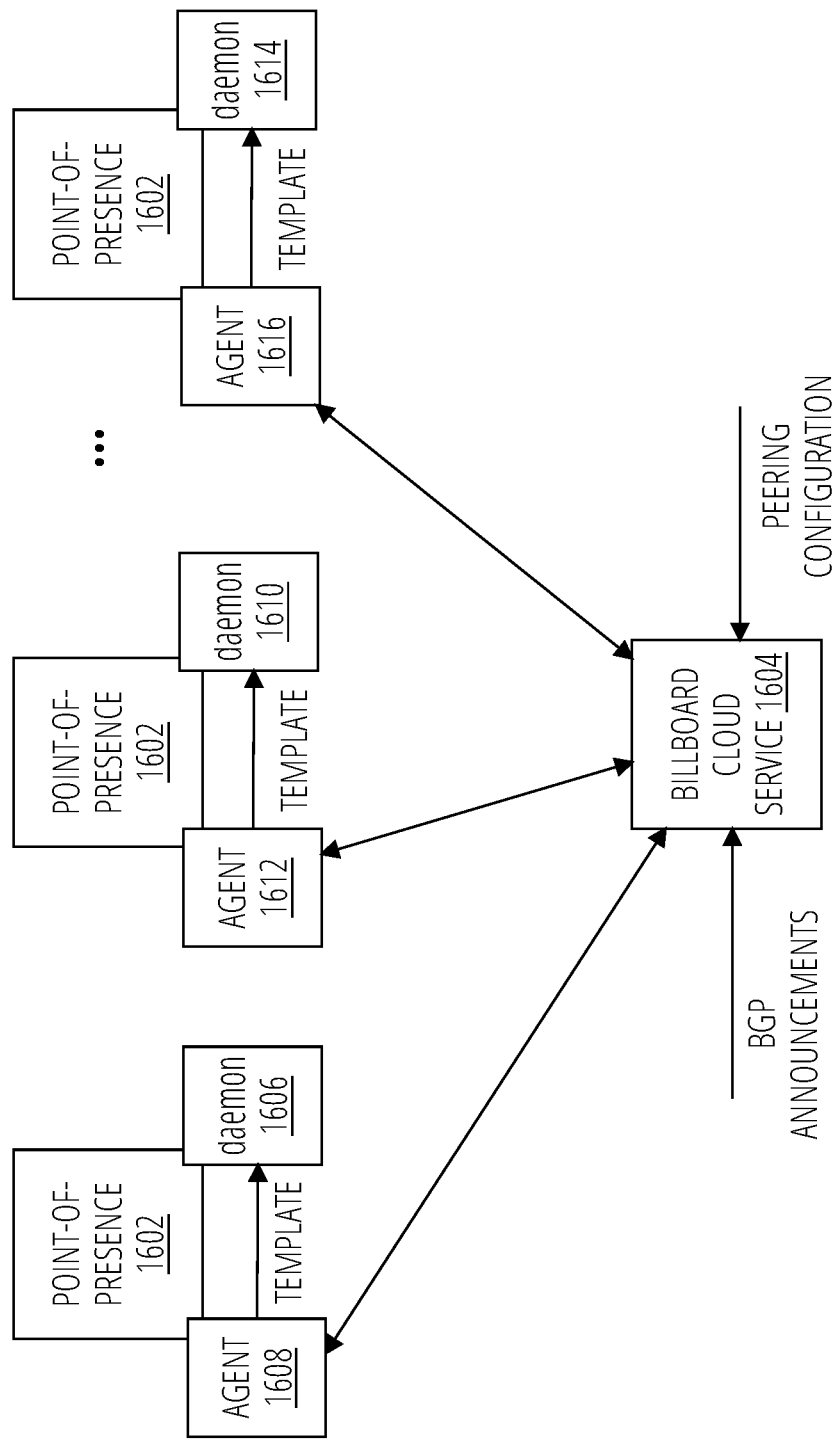
FIG. 16 depicts an embodiment of a system to manage Border Gateway Protocol (BGP) announcements.

FIG. 16 depicts an embodiment of a system to manage Border Gateway Protocol (BGP) announcements. It comprises three components referred to herein as billboard, agent, and daemon. The exemplary system depicted in FIG. 16 comprises a billboard cloud service 1604 coupled to multiple point-of-presences 1602, across which are distributed a daemon 1606 and agent 1608, a daemon 1610 and agent 1612, and a daemon 1614 and agent 1616. This depiction shows three POP systems with corresponding local agent and daemon components, but generally the system can have any number of such POPs.

The billboard cloud service 1604 operates globally (for many network devices and paths) to collect and maintain intended BGP announcements and peering data for the network. Peering objects comprise information about a peer (routing-adjacent network device) to exchange routes with. The various agents may in one embodiment be implemented using Golang as a service that executes on the network points-of-presence (POPs). The agents poll the billboard cloud service 1604 for peering and BGP state information at (e.g., regular) intervals, generate a daemon control template based on that state information, and apply the template to the local (local to the point-of-presence comprising the agent) daemon logic executing on the POP.

The template may be applied to a daemon in one embodiment by performing a configuration reset on the executing daemon. More generally any command to cause the daemon to apply the updated template may be applied. In the event that the billboard cloud service 1604 is unreachable or unresponsive, the agent and the daemon continue to execute as routers in the POP utilizing their last state updates from the billboard cloud service 1604. Exemplary logic for a daemon is provided in Listing 1.

As network devices interact with each other, they need a way to communicate. This may be accomplished through peering via BGP. Border Gateway Protocol (BGP) sessions, and more specifically, BGP announcements, influence routing decisions taken on the Internet. Routers from various organizations communicate via BGP to inform one another of availability to a particular communication address prefix.

When a network router connects to other networks, it utilizes information about which adjacent router (peer) to send its data to based on particular attributes. BGP's route selection algorithm takes into consideration a number of factors when selecting the best path for a prefix (or network). One of the first attributes considered is the number of BGP Autonomous Systems (AS) traversed. Routers under a common control are typically represented as a single AS. Several other attributes are considered but as a general rule, the selection process may not be readily determined from an outside entity (the adjacent peer even) because each AS can configure their own BGP policies which influence the best path selection process. Each potential peer communicates its routing information to be stored within a routing information base (RIB). BGP accesses this information and uses it to choose the best peering option for the router based on the selection algorithm.

In traditional networks, BGP sessions and intended announcements are configured directly on network devices (e.g., the POPs in FIG. 16). This distributed approach of deploying individual router configurations does not lend itself to a scalable, robust, or even moderately straightforward approach to manage BGP configuration at scale. Often, the approach taken to automate BGP configuration in large networks is by utilizing software that mimics an operator typing on a keyboard over the devices' native configuration interface. This approach is error prone and the resulting logic may be difficult to maintain. It has proven highly challenging to implement solutions compatible with BGP that overcome these deficiencies.

The system embodiment depicted in FIG. 16 couples intended state configured by network operators with network elements themselves, through chains of independent and distributed components. "Network elements" refers to routers, switches, and servers configured as routers, for example.

The billboard cloud service 1604 comprises a cloud-based server that centrally stores desired BGP configuration configured by network operators. Desired BGP configuration includes BGP neighbor (peer) configuration, intended state, and BGP announcements. Network operators interact with the billboard cloud service 1604 programmatically via an API or through a specific app or application to provide these settings.

The billboard cloud service 1604 is engaged by network operators to configure BGP peers and intended announcements before a POP is provisioned. Pre-configuring these settings in the billboard cloud service 1604 in advance of provisioning means the host POP initializes with its intended BGP configuration at the start of operation.

In one embodiment, the agent components are implemented as services executing locally on network devices. The agent components input configuration data from the billboard cloud service 1604 and apply that information to communicate intended configurations to the local BGP routing logic implemented in the daemon components, and from there to routing components of the operating system kernels. This serialized BGP decoupling chain enables the fast and dynamic application of intended BGP announcements across a heterogeneous network device environment. In one embodiment the BGP local routers are implemented as Bird daemons.

Bird is an open-source implementation for routing Internet Protocol packets. Currently available versions of Bird support Internet Protocol version 4 and version 6 by executing separate daemons for each. A Bird daemon establishes multiple routing tables and uses BGP, RIP, and OSPF routing protocols, as well as statically defined routes. Bird implements one or more internal routing table to which the supported protocols connect. The protocols may import network routes into the internal routing table and also export network routes from the internal routing table to a protocol. This way information about network routes is exchanged among different routing protocols.

The daemons and the POP operating system kernels (e.g., Linux kernels) communicate bidirectionally to update the separate routing tables that each maintains. Each daemon may maintain several independent routing tables that it synchronizes with the kernel's routing tables by sending routes to the kernel and periodically comparing its tables against the kernel's tables.

Using a kernel protocol the daemon routing table may be coupled to a kernel routing table in a routing device. This enables the daemon to export network routes from its internal routing table(s) to the kernel routing table(s) and optionally also learn about network routes from the kernel routing table(s) (created by a network operator/administrator or by other means) and import these routes into its internal routing table(s).

Filters may be used to control what network routes are imported into the internal routing table or exported to a particular protocol. Network routes may be accepted, rejected or modified using filters.

As the desired network state evolves in the billboard cloud service 1604, each agent component may detect a state change during one of its periodic state information polls of the billboard cloud service 1604, and thus reconfigure the daemon component executing co-locally on the POP with the agent, e.g., by generating an updated configuration file. The agent may signal the demon that there is a change to the previous configuration and to apply the change.

Through this tight feedback loop, changes made through the billboard cloud service 1604 are applied to distributed, heterogeneous network devices with low hysteresis via the combination of high frequency polling by the agent components, and tight coupling between the agents and locally-executing BGP daemon components and between the BGP daemons and the kernel routers in the network devices. In the event that the billboard cloud service 1604 becomes unreachable or unresponsive, the agents and the daemons continue to function autonomously utilizing the last configured state information.

The system thus centralizes BGP announcements and peering at one network source for access, distribution, and management. Conventional systems employ a disjoint collection of software composed of a database (such as NetBox), a configuration generation tool (such as Ansible), and a configuration push tool (such as Ansible, Facebook's Command Runner, or Napalm). These tools are insufficiently robust and scalable for large-scale network management tasks.

The billboard cloud service 1604 may in some embodiments comprise a 'drain' feature to enable the rapid shifting of network traffic away from a particular Point of Presence (POP), e.g., with a single command. This feature enables an operator to shift traffic on multiple levels of granularity:

Shift all inbound traffic away from the POP;
Shift all inbound traffic away from a specific peer device;
Shift specific inbound traffic away from a POP by specifying what BGP announcement type(s) to shift;
Shift specific inbound traffic away from a specific peer by specifying what BGP announcement types to shift.

The system may employ a low-latency feedback loop through the billboard cloud service 1604 to react to telemetry changes, such as changes in measured network traffic, routing, and/or performance, at the path, link, or multi-link level. The feedback loop may modify BGP announcements and peering to adapt to these changing network conditions. By coupling telemetry to desired BGP configuration, the system may detect and automatically withdraw BGP announcements in direct response to changing network state detected via telemetry for a given link, path route, or peer.

An example configuration of peers and state managed via the billboard cloud service 1604 is provided by the tables below.

| | |
|---|---|
| agent_name | mnl01-data01 |
| as | 65536 |
| filter_as_regex | ** |
| ip | 192.0.2.11 |
| max_prefix | 0 |
| name | ixchng1 |
| paths | ** |
| state | ENABLED |
| type | PRT_IXP |

Peer Created on Mn101-Data01

Peers have internal states when represented in the billboard cloud service 1604. This table describes their meaning:

| | |
|---|---|
| ENABLED | The BGP session should be configured and enabled on the downstream BGP daemon. |
| DISABLED | The BGP session should be configured and set to "disabled" on the downstream BGP daemon. |
| DRAINED | The BGP session should be configured and enabled on the downstream BGP daemon. BGP announcements are removed from the downstream BGP daemon (withdrawn) but remain in Billboard's database. This value is internally set by the 'drain' feature. |

Peer States

| | |
|---|---|
| hostname | ams01-data01 |
| peer_id | 1 |
| prefix | 129.203.8.0 |
| prefix_len | 22 |
| type | SITE_LOCAL |
| state | ENABLED |

BGP Announcement Advertised from Ams01-Data01

BGP Announcements also have internal states when represented in the billboard cloud service 1604. This table describes their meaning:

| | |
|---|---|
| ENABLED | The BGP announcement should be advertised by the downstream daemon. |
| DISABLED | The BGP announcement should NOT be advertised by the downstream daemon. This value is internally set by the 'drain' feature. |

BGP Announcements Internal States

Figure 17:
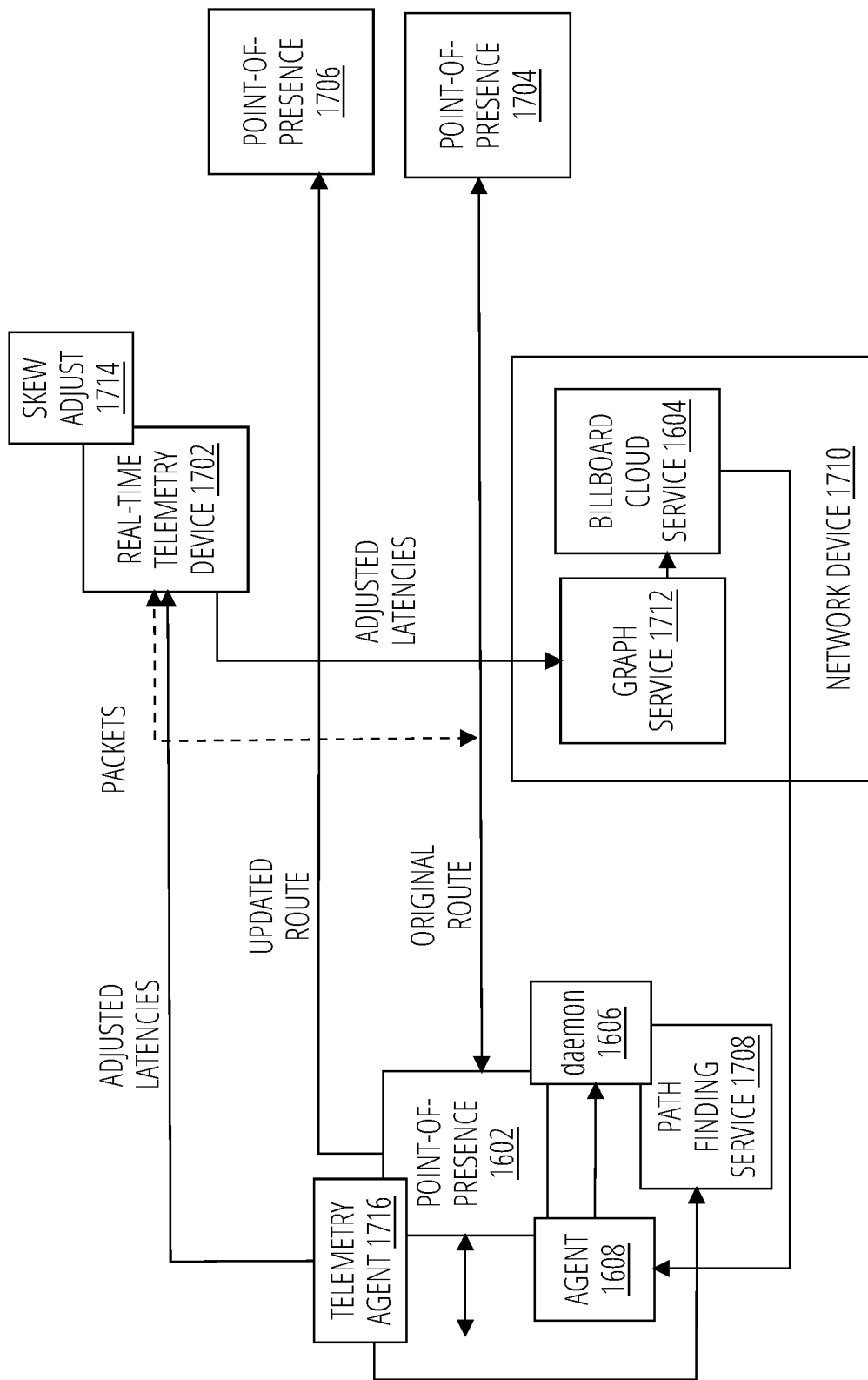
FIG. 17 depicts a system for dynamic best route and best egress link determination in an overlay network.

Referring now to FIG. 17, a graph service 1712 determines best (for one or more metrics such as loss or latency) path routes through POPs of the overlay network. The graph service 1712 inputs telemetry measurements for POPs of the overlay network, e.g., using Kafka (a message bus). Telemetry measurements are taken over a number of dimensions. Telemetry measurements may be obtained from a centralized real-time telemetry device 1702 that receives telemetry from telemetry agents 1716 executing locally on the routing POPs, or the graph service 1712 and/or billboard cloud service 1604 may obtain telemetry directly from the individual telemetry agents 1716.

"Dimensions" here refers to combinations of, for example, one or more of source POP, destination POP, source IP address, destination IP address, source port, destination port, and IP version, and protocol. The system may perform many simultaneous measurements between two POPs. For example, two POPs may simultaneously measure to each other over IPv4 and IPv6. The protocol variation between IPv4 vs IPv6 is thus a telemetric dimension. Between two POPs, telemetry may be performed between combinations of available interfaces. For example, between two POPs, each with four interfaces, the system may execute 4×4 simultaneous measurements at first, and then expand to additional dimensions such as variations of protocol (e.g., TCP vs UDP), IP version, and destination ports. These combinations of communication options between two particular POPs or nodes are what "dimensions" refers to here and in other references to the graph service 1712 or path finding services 1708.

FIG. 17 depicts a system for dynamic best route and best egress link determination in an overlay network. A point-of-presence 1602 in the overlay network, which may be an ingress POP or an intermedial POP of the overlay network, comprises a path finding service 1708, a routing daemon 1606, a telemetry agent 1716, and an agent 1608 that communicates with the billboard cloud service 1604. In some embodiments one or more of the local (to the POP) path finding service 1708 and local telemetry agent 1716 may be implemented by the local routing daemon 1606.

The system further includes a graph service 1712 and a centralized real-time telemetry device 1702 that aggregates telemetry from the telemetry agents 1716 on the POPs. The billboard cloud service 1604 and the graph service 1712 are depicted as being implemented by the same network device 1710, but may also be implemented by different and distinct network devices.

High-level path route decisions may be made at the billboard cloud service 1604 based on BGP notifications and inputs from the graph service 1712 based on global telemetry measurements. These route decisions may be propagated to the local routing agents and utilized by the daemons to route packets at the individual POPs from ingress ports to egress ports. Selection of egress ports at each POP may be determined by the local path finding service 1708 based on input from the local telemetry agent 1716.

For instance, consider a path from Frankfurt to Mumbai. The graph service 1712 may input telemetry for various routes between these locations and compare and analyze different paths between these locations in a manner that is protocol (UDP/TCP) and IP version (IPv4/IPv6) agnostic. There could be many possible paths but the graph service 1712 will find the ones with the lowest latency, lowest percent of packets lost, and lowest jitter (or a lowest aggregate metric of combinations of these characteristics). Because Frankfurt and Mumbai do not directly connect, any path between them will traverse one or more intermedial POPs.

The path finding service 1708 executing on the point-of-presence 1602 considers the end-to-end path and selects the best link (ingress and egress ports) between the point-of-presence 1602 and a next-hop point-of-presence in the selected path. There may be a path finding service 1708 executing on each POP or a selected subset of POPs in the overlay network. The best end-to-end path may exist over the User Datagram Protocol (UDP), Transmission Control Protocol (TCP), or a mixture of both; the same is true for the Internet Protocol (IP) version. The system may determine that an end-to-end path combining IPv4 and IPv6 links offers better performance vs IPv4 or IPv6 alone. When selecting a link the path finding service 1708 supports this mixed dimension approach across attributes of a path.

The system is enabled to determine best paths across or agnostic of protocol and IP version because the telemetry between every POP pair measures combinations of IP version and protocol. The telemetry is generated at a deeper level than the protocol and IP version, and includes source and destination ports as well.

For example, if a particular port performs better between two given POPs, the path finding service 1708 may select the best source IP and port combination for egress of packets from the upstream POP. Likewise, if an alternate destination port performs better, the path finding service 1708 may select a specific destination port for the path at the downstream POP.

Equal Cost Multi Pathing (ECMP) and Link Aggregation Control Protocol (LACP) are common strategies employed on network devices across the Internet to select a specific outbound link (network circuit) when multiple links are equal. These algorithms utilize a hash value calculated by the combination of protocol, source IP address, destination IP address, source port, and destination port. Earlier versions of these algorithms have been deployed in datacenters where all links are nearly identical in fiber length, loss, and latency characteristics. However in the modern Internet, the use of ECMP or LACP results in widely different links being selected across various provider networks. What appears to a router as equal may actually be a completely different fiber route with different latency characteristics.

Pathfinding on individual Internet protocol version, IP address, port, and protocol dimensions not only enables the identification of performance variations hidden by the use of ECMP and LACP, it enables direct influence over the remote ECMP or LACP path taken on network devices in remote provider networks—devices outside the control of the overlay network. This enables selection of the best path when traversing provider networks. The path finding services 1708 identify better-performing combinations of link characteristics for a given POP pair determined by the graph service 1712 to be in an optimal path.

One use-case seeks the lowest latency link but is less concerned about jitter. Another use-case treats jitter and loss as the primary factors, while latency is less important. These two cases are in opposition from a pathfinding perspective. The path finding services 1708 may thus utilize a profile with settings for how the raw telemetry data should be weighted to achieve a specific kind of best performance from the network. For example, a latency profile may configure the path finding services 1708 to determine the best paths based primarily on latency performance (ignoring or de-emphasizing loss/jitter), whereas a balanced profile configures the path finding services 1708 to find a best combination of latency, jitter, and packet loss such that the connection has low latency but not at the cost of high jitter or loss.

By identifying a best path per configured profile, the path finding services 1708 enables provisioning of not only a single best path end-to-end between two POPs, but N best paths. Additional constraints may also be imposed on best path determination. For example, geographical restrictions may be applied so that client traffic is routed over a best path that doesn't cross configured (e.g., excluded) geographic boundaries. In one embodiment the graph service 1712 stores the different profiles and publishes them (e.g., to Kafka) for use by the routing daemons distributed on the overlay network POPs. Global paths are updated at regular intervals based on dynamic profiling (see the description supra of first derivative graph generation) of the network via telemetry.

For each of the pathfinding dimensions described above provided by telemetry, the system may maintain a data structure that represents the dimensions along with a weight that is calculated using profile-specific rules. This data structure may be updated as telemetry is received and processed by the graph service 1712.

For each POP pair, and for each dimension/profile combination, the system may maintain a last-seen-weight cache. The values comprised by this structure define a telemetry weight.

The last-seen weights are processed and updated to generate a best-weight cache. The best-weight cache stores the best weight observed across telemetry dimensions for the POP pair. Each profile may comprise a best-weight for the particular set of telemetry dimensions emphasized by the profile.

The best-weight may in one embodiment be calculated according to the following algorithm (see also FIG. 18):
1. If there is no current best weight for a particular combination of dimensions, set the current best weight to the new weight.
2. If the new weight is better than the current best weight, set the current best weight to the new weight and update the current best dimensions.
3. If the new weight is worse than the current best weight, but the dimensions do not match the current best weight, do nothing.
4. If the new weight is worse than the current best weight, and the dimensions match, the best link has degraded. Evaluate a new best link between the POP pair for this profile.

In one embodiment, the path finding services 1708 utilize a modified Bellman-Ford algorithm that tolerates the negative values that may be received from the telemetry system due to clock skew. These values are valid for pathfinding and relative path comparisons. The classic Bellman-Ford algorithm is designed to detect negative cycles encountered during pathfinding and to exit; the modified algorithm utilizes negative cycles rather than exiting.

For each profile, the path finding services 1708 may identify a best path using the modified Bellman-Ford algorithm operating on the best weights for each POP pair combination.

The router daemons executing on the POPs of the overlay network may utilize common aspects, or the same aspects, of the stream of telemetry that the graph service 1712 utilizes. The routing daemon logic may utilize telemetry information to choose the best link to egress a packet from a POP that received the packet. The routing daemons may utilize a weighting algorithm (the graph service 1712 may utilize a similar algorithm during path route selection) to decide which link to use; there is a cost to switching links therefore the router balances swapping from one link to another with the historical perspective of how a link has performed versus a potentially temporary improvement achieved by switching links.

The output of the graph service 1712 may be recorded in a graph database of relationships for POPs of the overlay network, their servers, and their interfaces. These objects may be utilized by the real-time telemetry device 1702 when performing telemetry and other data plane functions. Telemetry, for instance, may utilize the graph service 1712 API to identify target devices or path segments to ping for latency, packet loss, and jitter measurements. These measurements are fed back into the graph service 1712 for utilization in constructing graphs for global paths through the network.

The measurements from the real-time telemetry device 1702 are also provided to the path finding services 1708 to choose the best ingress and egress links to and from the POPs on which the path finding services 1708 are executing. In other words, the telemetry system learns about what targets to measure from the graph service 1712 infrastructure APIs, delivers the telemetry (e.g., via Kafka) back to the graph service 1712, and the graph service 1712 then does global pathfinding for real-time packet streams based on the telemetry.

In the overlay network, a POP may function as an ingress, midgress (intermedial), or egress POP for a particular packet flow. An ingress POP is the POP at which a client's network traffic first enters the overlay network. An egress POP is the POP where a client's network traffic leaves the overlay network. A midgress POP is one that routes the client's network traffic within the overlay network.

When an Accelerator is created, the system identifies an egress POP physically proximate to the destination device IP address. Reducing the physical distance between the egress POP and the final destination IP device (the target endpoint device of the stream) may increase the available control for reducing by way of the overlay network. The system in one embodiment may utilize Maxmind® services for coarse IP device location. Exemplary logic for creating and managing an accelerator is provided in Listing 2.

To obtain improved resolution of IP device locations, the system may utilize three additional components, herein referred to as Prober, ETL pipeline ("tunnel service"), and IP Annotation service (IPA). When a client device requests a network path that doesn't already exist, the system may dynamically allocate an Anycast IP address and port from a dynamically updated pool of ranges reserved for the overlay network. The overlay network may be configured with this information to route the client traffic. Accelerators are published (e.g., to Kafka) for utilization by data plane server devices to route packets across the network.

Prober is a cloud service that pings the entire IPv4 space at a randomized rate. By way of example, it may take approximately a week for Prober to ping all the addresses in the IPv4 space. Responses to the pings provide the overlay network with a map of the distances between an individual POPs and all pingable IPv4 prefixes. This map is uploaded (e.g., to Kafka) and transformed via the ETL pipeline into settings that the IPA service utilizes.

The IPA service may load the Maxmind IP prefix database into memory at initialization. When incorrect or missing prefixes are identified, the IPA service may override the corresponding database entry.

When a client device utilizes the overlay network API to create an Accelerator, the service responsible for creating a client tunnel calls the IPA service to identify a nearest POP to the destination IP address. IPA returns latitude and longitude coordinates for the tunnel destination IP address and the tunnel service executes a distance calculation algorithm (e.g., Haversine) to find the closest POP via the latitude and longitude POP data it receives from the graph service 1712.

Once the Prober dataset is implemented in IPA, the response to the tunnel service may be supplemented with top-N latency data (if available) and the tunnel service may favor use of this information over geolocation distance for egress POP selection. This directly influences the egress POP selected by the path finding service 1708 for an Accelerator as the tunnels service relays this information to the overlay network POPs.

The system may learn end-to-end network latency, or/and loss characteristics by active probing or passive packet monitoring. Network characteristics between two end points may be learned by either active probing based methods or passive monitoring. For example, real-time network characteristics such as latency and loss as experienced by live TCP traffic between two endpoint devices may be learned by the real-time telemetry device 1702 passively examining, in the overlay network, the sequence numbers in the packet headers. This may be carried out for example using TCP flow packet capturing and algorithms to discover latency and loss on the network path between the two endpoints corresponding to the TCP flow.

In one embodiment, passive round-trip time (RTT) and loss estimation for TCP flows comprises two parts. The first is flow-level data collection. The TCP packet flows typically originate and end on devices external to the overlay network. For such flows, data collection may be configured to occur on any or particular ones of the intermediate overlay network hops.

For each packet for a given TCP flow, the following may be utilized for performance or reliability estimation:
1. Data Sequence Number
2. ACK Sequence Number
3. TSval
4. TSecr In one embodiment loss estimation algorithm for TCP flows is performed in accordance with the following algorithm (see also FIG. 19). For device A exchanging packets over TCP with device B using a path between POP X and POP Y in the overlay network, the flow may be represented by A↔X↔Y↔B, where the packets can flow in either direction over the path. Suppose the data is flowing from A to B. Then, TCP acknowledgements (ACK) will flow from B to A. Each data packet and ACK packet comprises four values (see above).
1. Maintain an array for RTT, and maintain a loss count, for the flow.
2. While data packet sequence number (seq_i):
3. If previous sequence number (seq_i−1) is present, then measure RTT[seq_i]=TSval[seq_i]−TSval[seq_i−1]
4. If previous sequence (seq_i−1) is missing, increment loss counter: loss=loss+1

Once the flow ends, the RTT for the entire flow is available in the real-time telemetry array compiled by the real-time telemetry device 1702, and the loss is available in the loss count. This algorithm may be readily adapted for situations where the TCP connection is terminated on a device in the overlay network. In that case, the measured RTT/loss will be between the overlay network device and the other endpoint.

The overlay network may utilize asymmetric fastest path discovery with unsynchronized clocks. Discovering fastest unidirectional paths typically relies on gathering unidirectional measurements with synchronized clocks. Unsynchronized clocks between hosts on the network will result in unknown deviation in latency measurement, from true value, between any host. To address this problem, the system (e.g., the path finding services 1708) may identify the fastest unidirectional paths between a pair of devices on the network without utilizing clock synchronization or knowledge of clock skew between devices and may correctly operate in the presence of negative latencies.

An overlay routing pathfinding network may comprise POPs with GPS clocks and also POPs that are only approximately synchronized using NTP or similar techniques. As such, there is no guarantee that clocks will be sufficiently synchronized (e.g., under 1 millisecond variation) for accurate one-way delay measurement. Internet paths may themselves be asymmetric and a difference of latency as measured by two clocks in two POPs in each direction may be an artifact of the path latencies and not of clock skews.

By way of example, if the latency from POP A to POP B is actually 50 milliseconds, but POP B has a clock that is 10 milliseconds faster than POP A, then a probe's timestamp from POP A to receive time at POP B will indicate a 60 millisecond latency. This offset between the clocks on the two POPs may be ignored for path selection purposes. Any other path taken between A and B may be assumed to have the same 10 milliseconds skew, so the fastest path will be the fastest measured path. It's possible that the clock skew is larger than the actual latency. If POP A is 90 milliseconds faster than POP B, the then measured latency will be −40 milliseconds. This is akin to taking a flight across the international date line whereby using the time of departure from Tokyo at 11 AM, and time of arrival in Los Angeles at 8 AM local time, the measured one-way delay is −3 hours.

For overlay routing, if a POP with a skewed clock is a midgress POP, then its measured latencies will offset one other. For example, suppose POP A and POP C have synchronized clocks but POP B has a clock that is relatively fast by 100 milliseconds. Then POP A to POP B will measure 100 milliseconds slower than it actually is, and POP B to POP C will measure 100 milliseconds faster than it actually is. Ultimately, the path A-B-C will have a proper measurement regardless of the clock offset at POP B. Therefor if separate telemetric information is available about the total packet time-of-flight latencies between POP A and POP C directly or through devices other than POP B (see below), the clock skew of POP B may be determined from the packet time-of-flight latency for the A-B-C path.

Thus in some embodiments global clock synchronization may be carried out with unidirectional telemetry and iterative skew adjustments, for example by a clock skew adjuster 1714 utilizing one or a few devices in the overlay network to collect timestamps from a number of well-known clock sources. For a network of devices, with a small number that are GPS clock synchronized, this method determines which hosts have clock skews, and by how much, and which hosts have asymmetric routes by utilizing one-way latency measurements and an iterative approach to determining clock skew adjustments. The iterative approach calculates the clock adjustments that minimize the path asymmetries, resulting in highly accurate clock adjustments in most cases.

A clock network synchronization simulator ("skew analyzer") may be utilized by the real-time telemetry device 1702 to collect one-way latency telemetry for the overlay network and to estimate clock skews per POP, and to identify asymmetric paths. The skew analyzer may also determine the clock skew adjusted latencies between POPs.

The estimates become more accurate as more network nodes are taken into account, and when there are more GPS enabled nodes in the network. A POP may be recognized as a GPS-enabled POP if there is an entry where the source and destinations names are identical, with the latency at zero.

For example,
>ams01 ams01 0
indicates that ams01 is a GPS POP.

The skew analyzer may examine asymmetric latencies, and based on metrics to other nodes, determine if the discrepancy is a clock skew in one or both POPs or is an asymmetric path, or some combination of the two. For instance, based on this data.
>ams01 par01 5000
>par01 ams01 1000

It's impossible to tell if the asymmetric latencies are due to clock skew or due to asymmetric routes. It's possible that the paths are asymmetric enough that it only takes 1 millisecond to go from Paris to Amsterdam but 5 milliseconds in the reverse direction, or perhaps the clock in Amsterdam is a bit slow, so it appears to take less time to reach ams01, but more time when recording latency from ams01 to par01. For instance, if ams01's clock is 2 milliseconds slow, then a packet sent at true t=10 milliseconds from par01 could arrive at ams01 at true t=13 milliseconds, but ams01's clock only indicates the time is t_a=11 milliseconds, so the one-way delay is 11 milliseconds.

However, if there exist additional data points that corroborate an asymmetry, then the cause of the discrepancy may be clock skew. For instance, with these additional data points:
>ams01 lon01 6000
>lon01 ams01 6000
>par01 lon01 2000
>lon01 par01 6000

It appears that ams01 and lon01 have aligned clocks and symmetric paths. Assuming that par01 clock is 2000 milliseconds slow explains both the par01-ams01 asymmetry and the par01-lon01 asymmetry. The algorithm may apply such an assumption about clock skew when the asymmetry between two network devices exceeds a threshold. The amount of skew assumed for a particular clock may be the skew that negates asymmetries to the greatest extent overall for the largest number of device pairs that are identified as not having synchronized clocks. Clock skew determination then becomes a multivariate optimization analysis, where the number of clock skews to evaluate may be constrained to a given region or route at a time in order to render the optimization practical.

The skew analyzer algorithm in one embodiment comprises four stages (see also FIG. 20 and FIG. 21):
1. GPS validation. Test that the network nodes advertising GPS clocks appear to have synchronized clocks.
2. GPS neighbors. Non-GPS enabled POPs with symmetric latencies, for example reliably stable symmetric latencies, are likely to be synchronized to their GPS neighbor(s).
3. Determine the skew of the remaining POPs against the previously analyzed POPs in steps 1 and 2.
4. Re-evaluate the latencies all POPs to each other in view of 1-3.

The techniques and components described above enable the system to implement "full mesh" telemetry-driven packet routing. The real-time telemetry device 1702 may modify packet headers to generate synthetic traffic probing multiple links and dimensions to "fuzz" the connectivity and performance between hops in a path between a source device and destination device. Multiple link, protocol and packet configuration combinations are generated and analyzed to determine the fastest and/or more reliable path, protocol, and packet configuration between two locations in the network, including intermedial hops in the overlay network.

Peer-to-peer tunnels may be utilized to mask details of actual packet routes from endpoint devices. The peer devices initiate tunnels by contacting an Anycast IP address and they are connected to each other via matching their shared tunnel IP and port. Dynamic routing changes in the overlay network do not necessitate endpoint reconfiguration because communication between the peers can continue via the tunnel. Peer-to-peer tunneling is independent of the specific Layer 7 (OSI model) application, so that it is independent of any specific Layer 7 protocol utilized by the peer-to-peer applications. The use of tunneling embeds the process of relaying peer-to-peer traffic in the overlay network. It mitigates latency and obviates a single point of failure, and benefits from other routing, reliability, and performance techniques described herein.

Dynamic link selection by the path finding services 1708, both egress from a POP and ingress to a next-hop POP, may be facilitated by in-line telemetry over Express Data Path (XDP), bypassing a number of layers of the operating system networking stack. A link selection algorithm based on link performance metrics may be utilized, e.g., see Listing 3.

At each hop, each packet for traffic from a particular endpoint device may be injected by the real-time telemetry device 1702 with telemetry for the latency, loss, and jitter for the hop. The telemetry may be received from the real-time telemetry device 1702 at each hop, e.g., by the agent components, and injected into trailers of the packets prior to egress from the hop. The packets carry the telemetry from the previous hop along for use by the next hop to use for dynamic link selection by the path finding service 1708 executing there. Thus variable-length trailers over XDP may be utilized rather to route traffic over dynamically-determined paths in the overlay network, to predetermined destinations. See FIG. 22.

The use of inline telemetry enables a responsive feedback loop between the real-time telemetry device 1702 and the path finding service 1708 at each hop in a packet's path. The telemetry data for a hop (e.g., a POP) is added and stripped at each hop to measure that hop. At the edges of the overlay network, a variable length trailer is added to packets at ingress and stripped at egress. The length varies based on the layer 3 protocol and path length. The trailer is built by combining information from many components in the system to select, for each packet, the best path to the egress. Each packet encodes its own path through the overlay network in the packet itself.

Although the path from ingress to egress is set on the packet in the XDP program at ingress (source based routing), each XDP instance on the path between source and destination selects the best link using the latest information reported directly from the path finding service 1708. This enables the use of link-state routing in addition to source-based routing.

Source-based routing enables routing via multipath and dissemination graphs over XDP, so that traffic between source and destination devices may, if faster or more reliable, take multiple paths, including different or asymmetric forward and reverse paths between the devices.

Fuzzing may be utilized not only in packet headers, but also in selection of protocol types (e.g., IPX, transit, PNI, and waves) to accelerate packet transmission or make it more reliable. The result is packet routing based on performance-based telemetry to optimize the choice of links to egress packets from each hop in the overlay network, rather than relying on cost metrics or BGP alone.

Packet duplication and de-duplication may be employed to maximize chance of delivery and fast delivery. Within the overlay network, packets may be duplicated (e.g., by the routing daemons) to specific links, or flooded through the overlay network, to improve reliability or performance (e.g., to determine empirically via telemetry which packets perform better). At egress from the overlay network, or at specifically-chosen nodes in the overlay network, packets may be de-duplicated.

Figure 18:
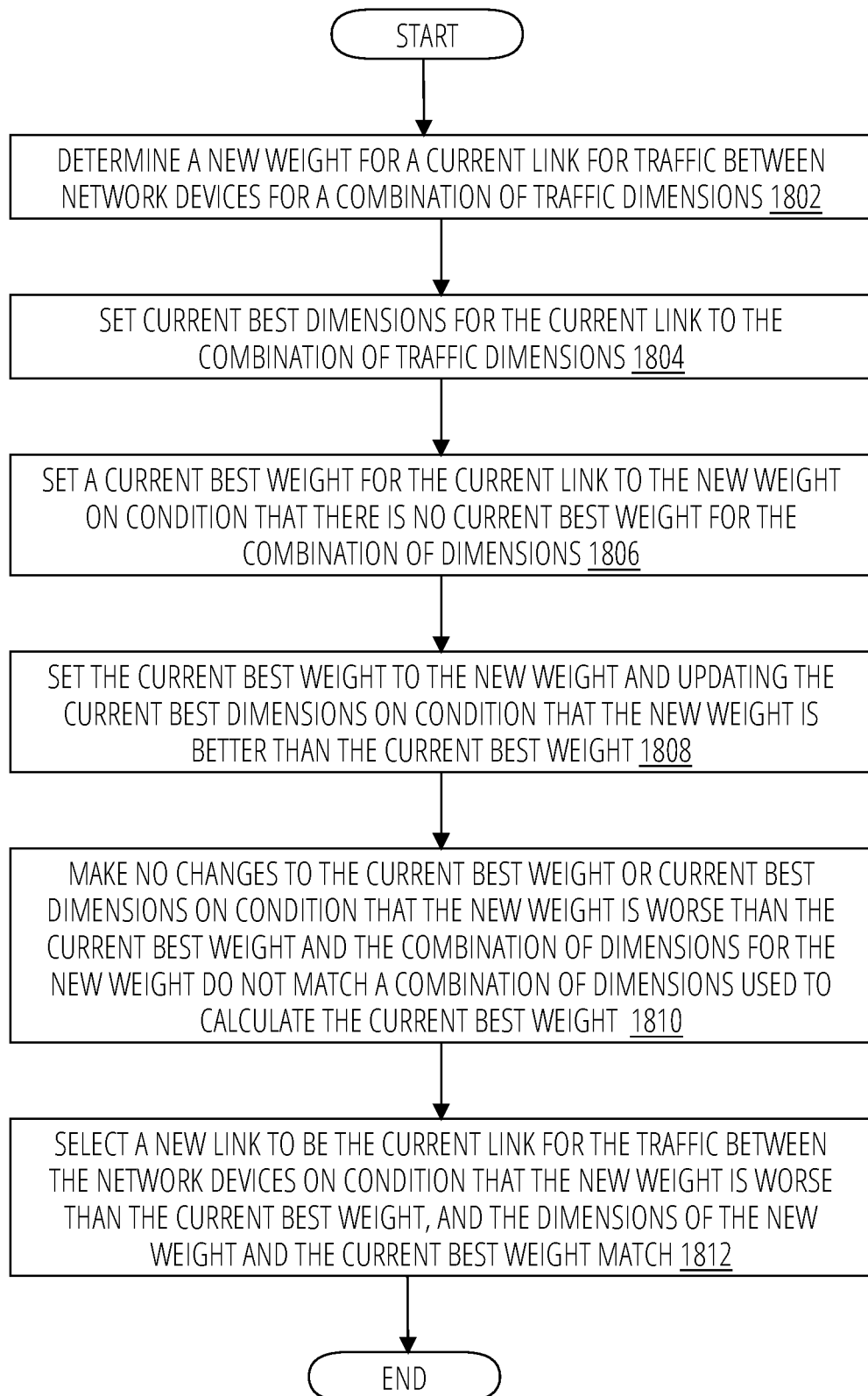
FIG. 18 depicts an algorithm in accordance with one embodiment.

FIG. 18 depicts an algorithm in one embodiment. In block 1802, the algorithm determines a new weight for a current link for traffic between network devices for a combination of traffic dimensions. In block 1804, the algorithm sets current best dimensions for the current link to the combination of traffic dimensions. In block 1806, the algorithm sets a current best weight for the current link to the new weight on condition that there is no current best weight for the combination of dimensions. In block 1808, the algorithm sets the current best weight to the new weight and updating the current best dimensions on condition that the new weight is better than the current best weight. In block 1810, the algorithm makes no changes to the current best weight or current best dimensions on condition that the new weight is worse than the current best weight and the combination of dimensions for the new weight do not match a combination of dimensions used to calculate the current best weight. In block 1812, the algorithm selects a new link to be the current link for the traffic between the network devices on condition that the new weight is worse than the current best weight, and the dimensions of the new weight and the current best weight match.

Figure 19:
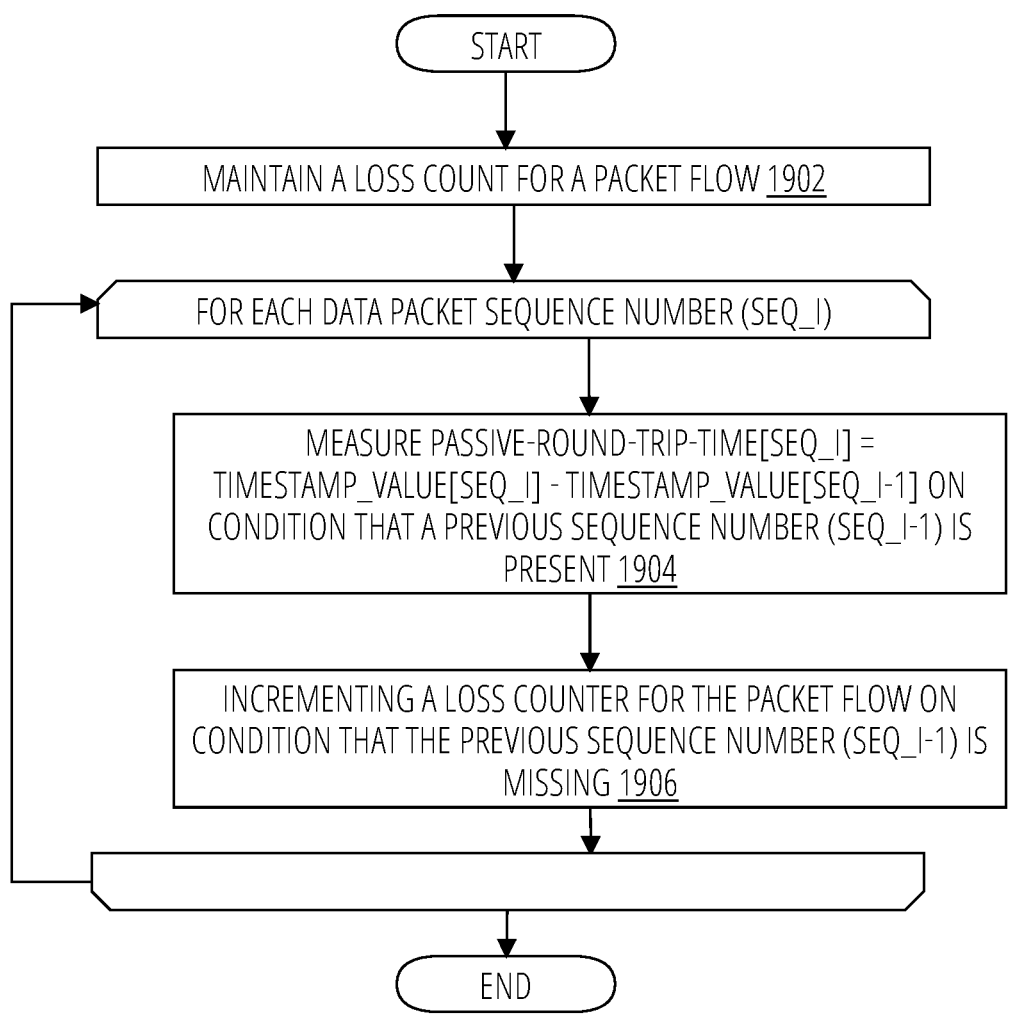
FIG. 19 depicts an algorithm in accordance with one embodiment.

FIG. 19 depicts an algorithm in one embodiment. In block 1902, the algorithm maintains a loss count for a packet flow. For each data packet sequence number (seq_i), in block 1904 the algorithm measures passive-round-trip-time[seq_i] =timestamp_value[seq_i]−timestamp_value[seq_i−1] on condition that a previous sequence number (seq_i−1) is present, and in block 1906 the algorithm increments a loss counter for the packet flow on condition that the previous sequence number (seq_i−1) is missing.

Figure 20:
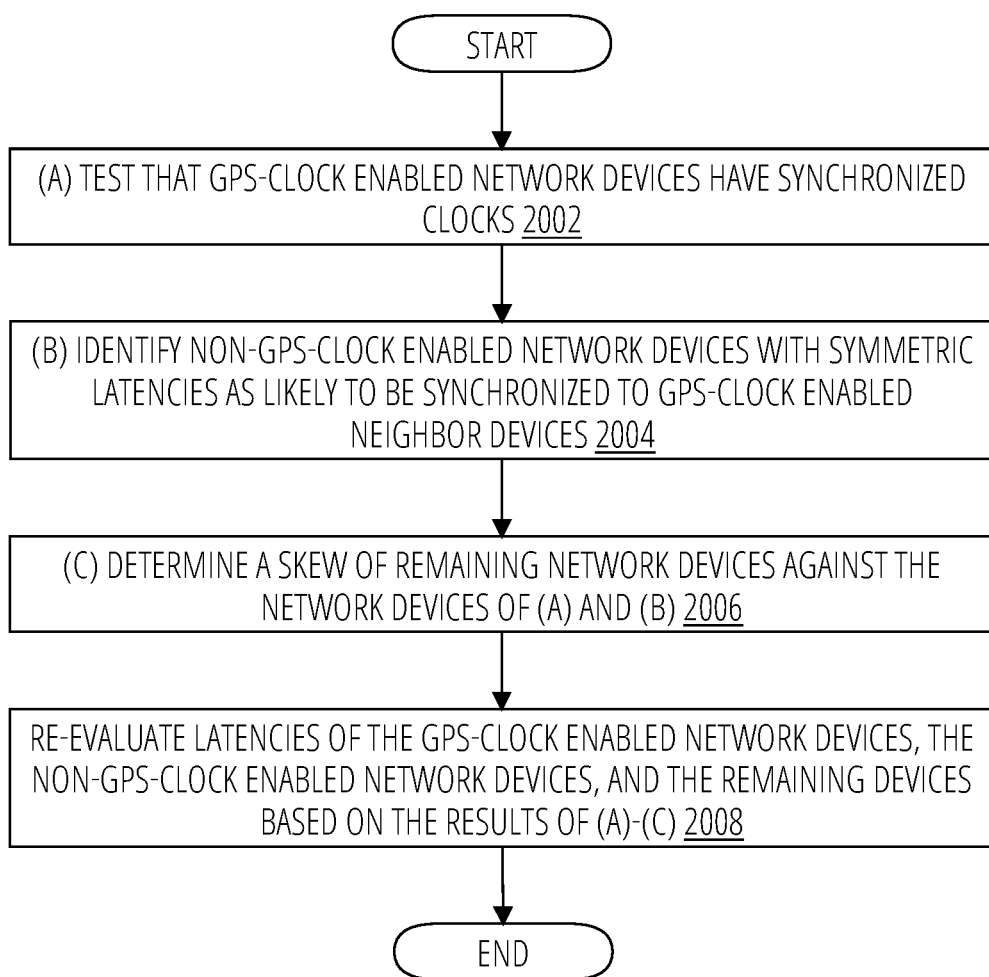
FIG. 20 depicts an algorithm in accordance with one embodiment.

FIG. 20 depicts an algorithm in one embodiment. In block 2002, the algorithm tests that GPS-clock enabled network devices have synchronized clocks. In block 2004, the algorithm identifies non-GPS-clock enabled network devices with symmetric latencies as likely to be synchronized to GPS-clock enabled neighbor devices. In block 2006, the algorithm determines a skew of remaining network devices against the network devices of (a) and (b). And in block 2008, the algorithm re-evaluates latencies of the GPS-clock enabled network devices, the non-GPS-clock enabled network devices, and the remaining devices, based on the results of blocks block 2002-block 2006.

Figure 21:
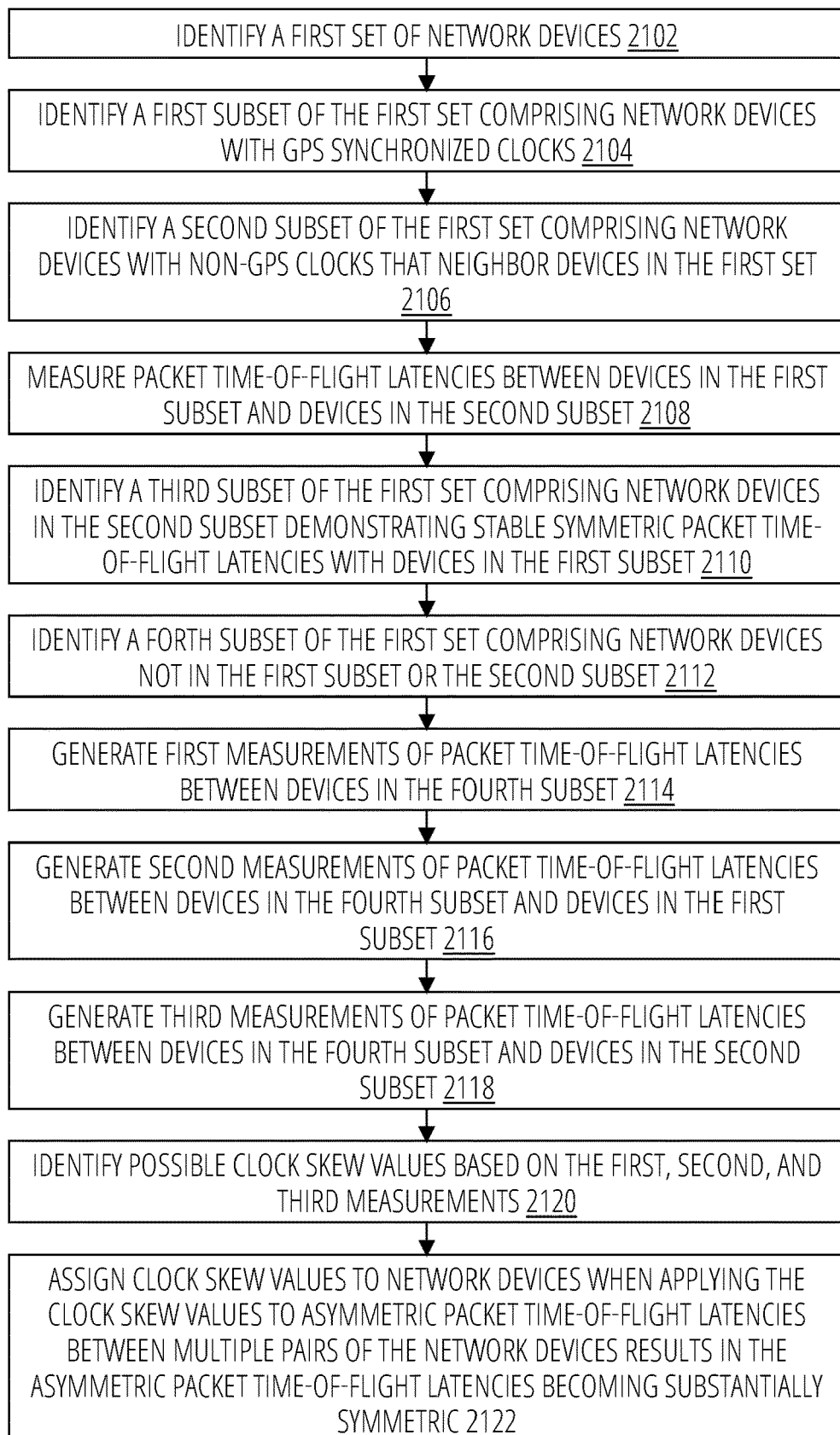
FIG. 21 depicts an algorithm in accordance with one embodiment.

FIG. 21 depicts an algorithm in one embodiment. In block 2102, a first set of network devices is identified. In block 2104, a first subset of the first set is identified, comprising network devices with GPS synchronized clocks. In block 2106, a second subset of the first set is identified, comprising network devices with non-GPS clocks that neighbor devices in the first set. In block 2108, packet time-of-flight latencies between devices in the first subset and devices in the second subset is measured. In block 2110, a third subset of the first set is identified, comprising network devices in the second subset demonstrating stable symmetric packet time-of-flight latencies with devices in the first subset. In block 2112, a forth subset of the first set is identified, comprising network devices not in the first subset or the second subset. In block 2114, first measurements are taken of packet time-of-flight latencies between devices in the fourth subset. In block 2116, second measurements are taken of packet time-of-flight latencies between devices in the fourth subset and devices in the first subset. In block 2118, third measurements are taken of packet time-of-flight latencies between devices in the fourth subset and devices in the second subset. In block 2120, possible clock skew values are identified based on the first, second, and third measurements. In block 2122, clock skew values are assigned to network devices when applying the clock skew values to asymmetric packet time-of-flight latencies between multiple pairs of the network devices results in the asymmetric packet time-of-flight latencies becoming substantially symmetric.

Figure 22:
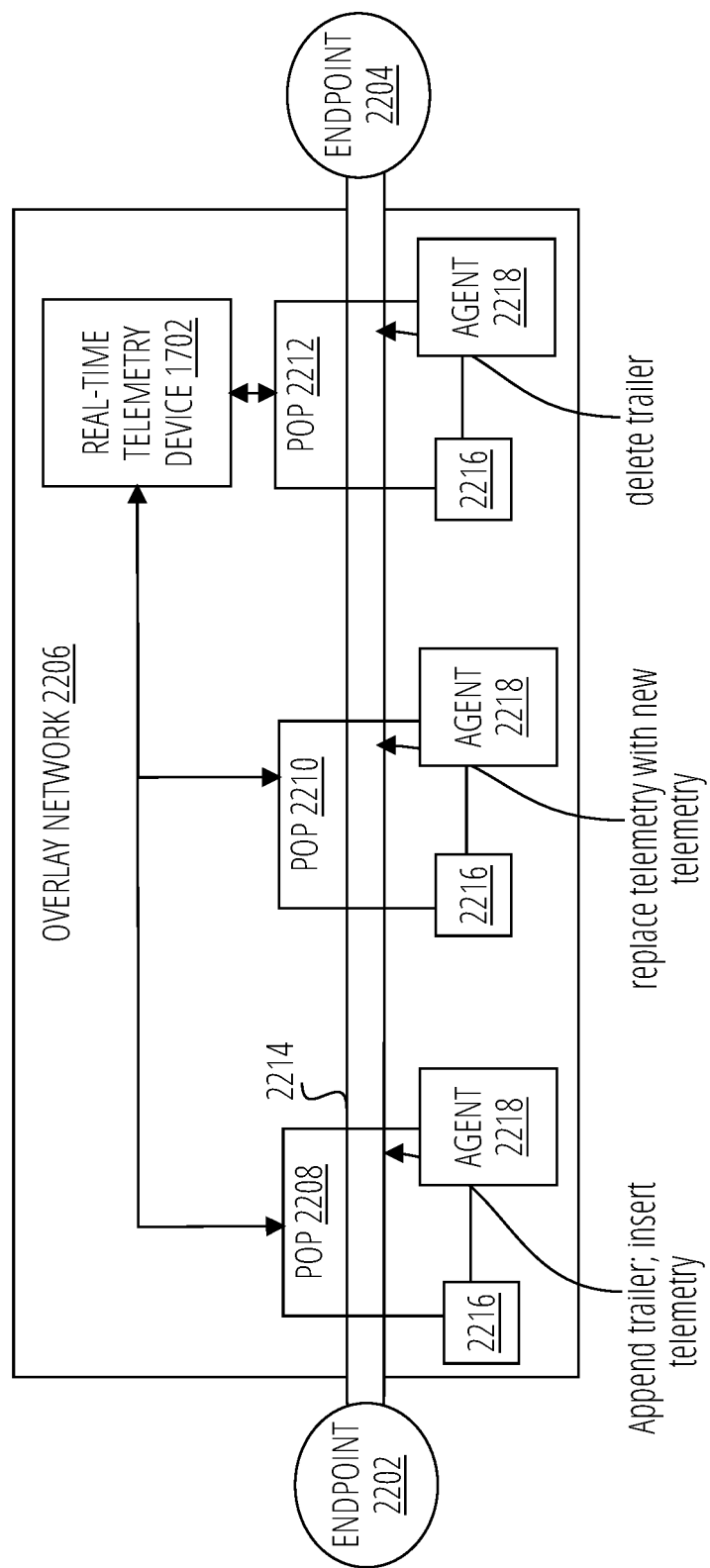
FIG. 22 depicts a system in accordance with one embodiment.

FIG. 22 depicts the use of real-time telemetry in an overlay network in one embodiment. An endpoint device 2202 and another endpoint device 2204 exchange packets over a path that traverses three POPs (point-of-presence 2208, point-of-presence 2210, and point-of-presence 2212) of an overlay network 2206. The endpoints may communicate the packets over an end-to-end tunnel 2214.

The real-time telemetry device 1702 measures various link properties in the overlay network 2206, such as latency, loss, and jitter. As packets are received into the overlay network 2206, the ingress point-of-presence 2208 appends a variable-length trailer to the packets and injects into the packet trailer telemetry information for links of the point-of-presence 2208 (ingress links, egress links, or both).

At the midgress point-of-presence 2210, the telemetry in the packet trailers is utilized by the path finding service 2216 to select one or more of ingress and egress links for the particular stream of packets between the endpoint device 2202 and the endpoint device 2204. After accessing the telemetry information injected by the point-of-presence 2208 for pathfinding, the point-of-presence 2210 replaces the telemetry for point-of-presence 2208 in the packet trailers with telemetry for point-of-presence 2210.

At egress point-of-presence 2212, the real-time telemetry for point-of-presence 2210 in the packet trailers is utilized for pathfinding, and then the trailers are deleted from the packets before they exit the overlay network 2206.

Session Description Protocol (SDP) is an Internet/network protocol that defines the characteristics of a media session. Session Initiation Protocol (SIP) is an Internet/network protocol used to establish and manage calls (audio/video, phone/computer/conference, etc.). Network address translation (NAT) is a method of mapping an IP address space into another by modifying network address information in the IP header of packets while they are in transit across a traffic routing device. A NAT firewall enables internet traffic to pass through a router operating as a gateway device only if a device on the receiving side of the gateway requested the traffic. Any unsolicited requests or data packets are discarded, preventing communication with potentially dangerous or unsolicited devices. If inbound traffic does not have a private IP address to forward to beyond the gateway, the NAT firewall knows the traffic is unsolicited and should be discarded.

Figure 23:
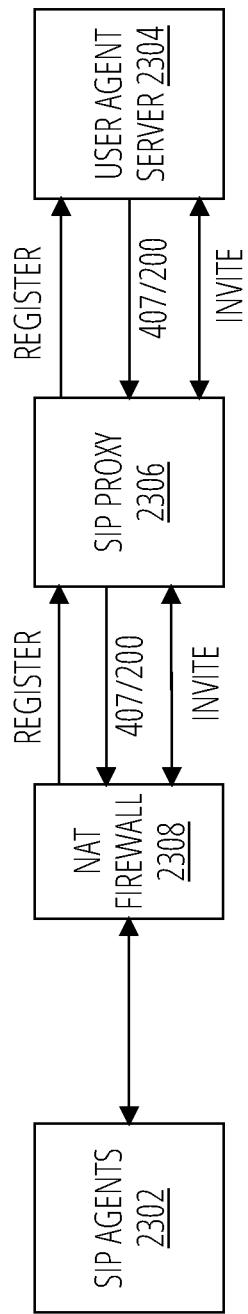
FIG. 23 depicts improved real-time communication in the overlay network using an SIPproxy.

FIG. 23 depicts improved RTC communication in the overlay network using a SIP proxy device. SIP agents 2302 communicate through a NAT firewall 2308 to a SIP proxy 2306, which in turn configures the User Agent Server 2304.

An SIP proxy is a defined service role in the SIP standard. The overlay network may utilize SIP proxies to intercept and make modifications to SIP messages, for example to messages related to the network destination of an audio/video call.

The overlay network may proxy SIP traffic from SIP clients to intercept the SDP offer/answer of a media session (in SIP this may be an audio and/or video call) and place that call over a more optimal network path based on its characteristics: audio, video, codec, location of parties, etc. This arrangement may be depicted as SIP User agent (caller)↔overlay network SIP proxy↔SIP User agent (callee)

When a caller initiates a call (SIP INVITE) the initiation message comprises an SDP that describes the IPs, ports, codecs, etc. of the media session (where it wants to receive media packets for the call). The overlay network intercepts this message at an SIP proxy and modifies it before it reaches its destination (callee). The SIP proxy replaces the IPs and ports with an Anycast IP address so that when a SIP user agent begins sending media based on the properties in the SDP it will instead send traffic to the configured Anycast IP address. This ensures that media packets for a call take a network path chosen by the overlay network.

The systems disclosed herein, or particular components thereof, may in some embodiments be implemented as software comprising instructions executed on one or more programmable device. By way of example, client devices and destination devices utilizing the systems described herein may interface to the overlay network using an application or an app, and components of the overlay network described herein may be implemented drivers, daemons, or services. In one particular embodiment, the system is implemented as a service that executes as one or more processes, modules, subroutines, or tasks on a server device so (e.g., a server of a POP) as to provide the described capabilities to one or more client devices over a network.

Figure 24:
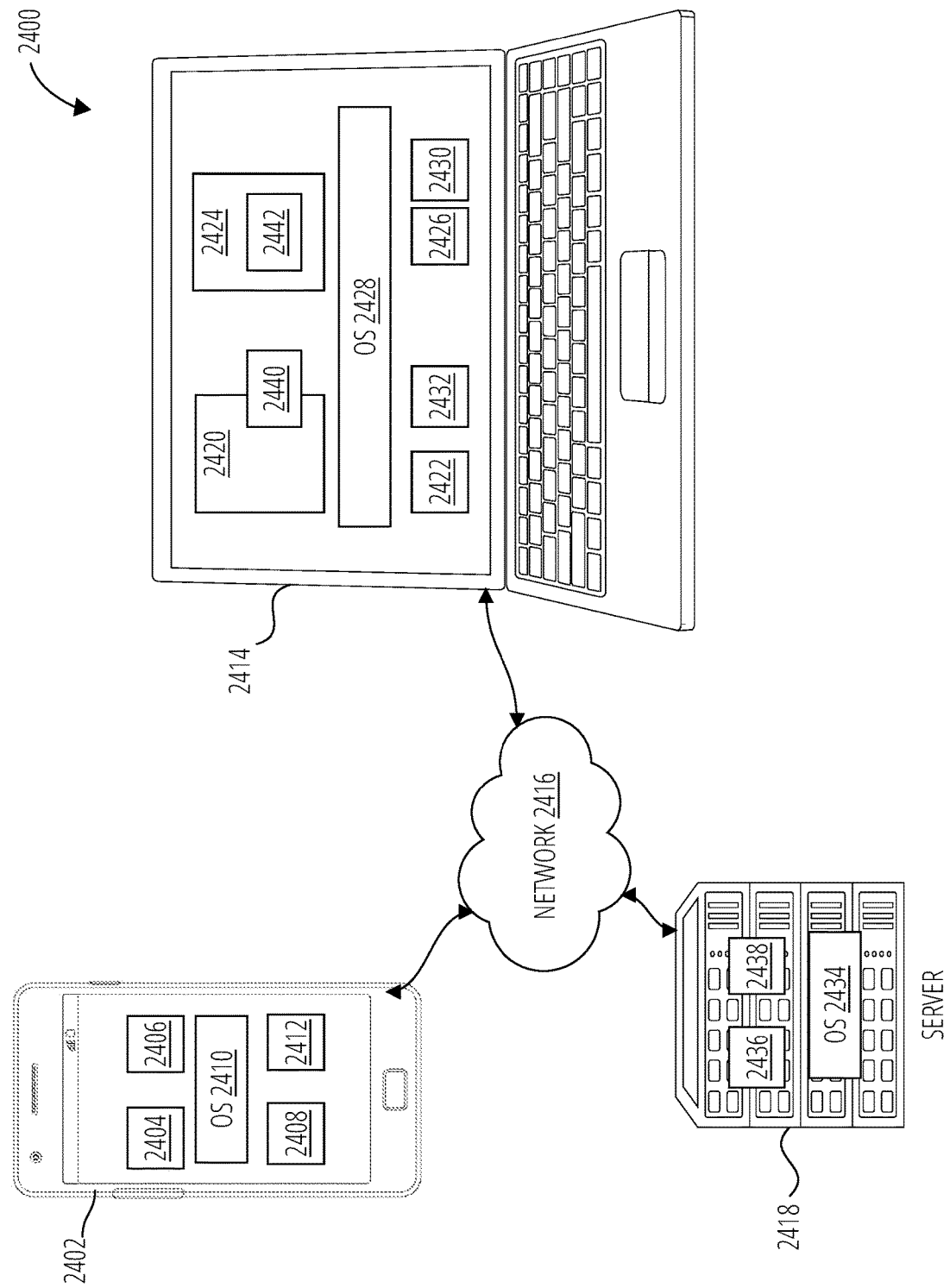
FIG. 24 depicts a client server network configuration 2400 in accordance with one embodiment.

Referring to FIG. 24, a client server network configuration 2400 illustrates various computer hardware devices and software modules coupled by a network 2416 in one embodiment. Each device includes a native operating system, typically pre-installed on its non-volatile RAM, and a variety of software applications or apps for performing various functions.

The mobile programmable device 2402 comprises a native operating system 2410 and various apps (e.g., app 2404 and app 2406). A computer 2414 also includes an operating system 2428 that may include one or more library of native routines to run executable software on that device. The computer 2414 also includes various executable applications (e.g., application 2420 and application 2424). The mobile programmable device 2402 and computer 2414 are configured as clients on the network 2416. A server 2418 is also provided and includes an operating system 2434 with native routines specific to providing a service (e.g., service 2438 and service 2436) available to the networked clients in this configuration.

As is well known in the art, an application, an app, a daemon, or a service may be created by first writing computer code to form a computer program, which typically comprises one or more computer code sections or modules. Computer code may comprise instructions in many forms, including source code, assembly code, object code, executable code, and machine language. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". The distinct file comprising the executable would then be available for use by the computer 2414, mobile programmable device 2402, and/or server 2418. Any of these devices may employ a loader to place the executable and any associated library in memory for execution. The operating system executes the program by passing control to the loaded program code, creating a task or process. An alternate means of executing an application or app involves the use of an interpreter (e.g., interpreter 2442).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 2408 or driver 2412 on the mobile programmable device 2402 or computer 2414 (e.g., driver 2422 and driver 2432) might enable wireless headphones to be used for audio output(s) and a camera to be used for video inputs. Any of the devices may read and write data from and to files (e.g, file 2426 or file 2430) and applications or apps may utilize one or more plug-in (e.g., plug-in 2440) to extend their capabilities (e.g., to encode or decode video files).

The network 2416 in the client server network configuration 2400 can be of a type understood by those skilled in the art, including a Local Area Network (LAN), Wide Area Network (WAN), Transmission Communication Protocol/Internet Protocol (TCP/IP) network, and so forth. These protocols used by the network 2416 dictate the mechanisms by which data is exchanged between devices.

Figure 25:
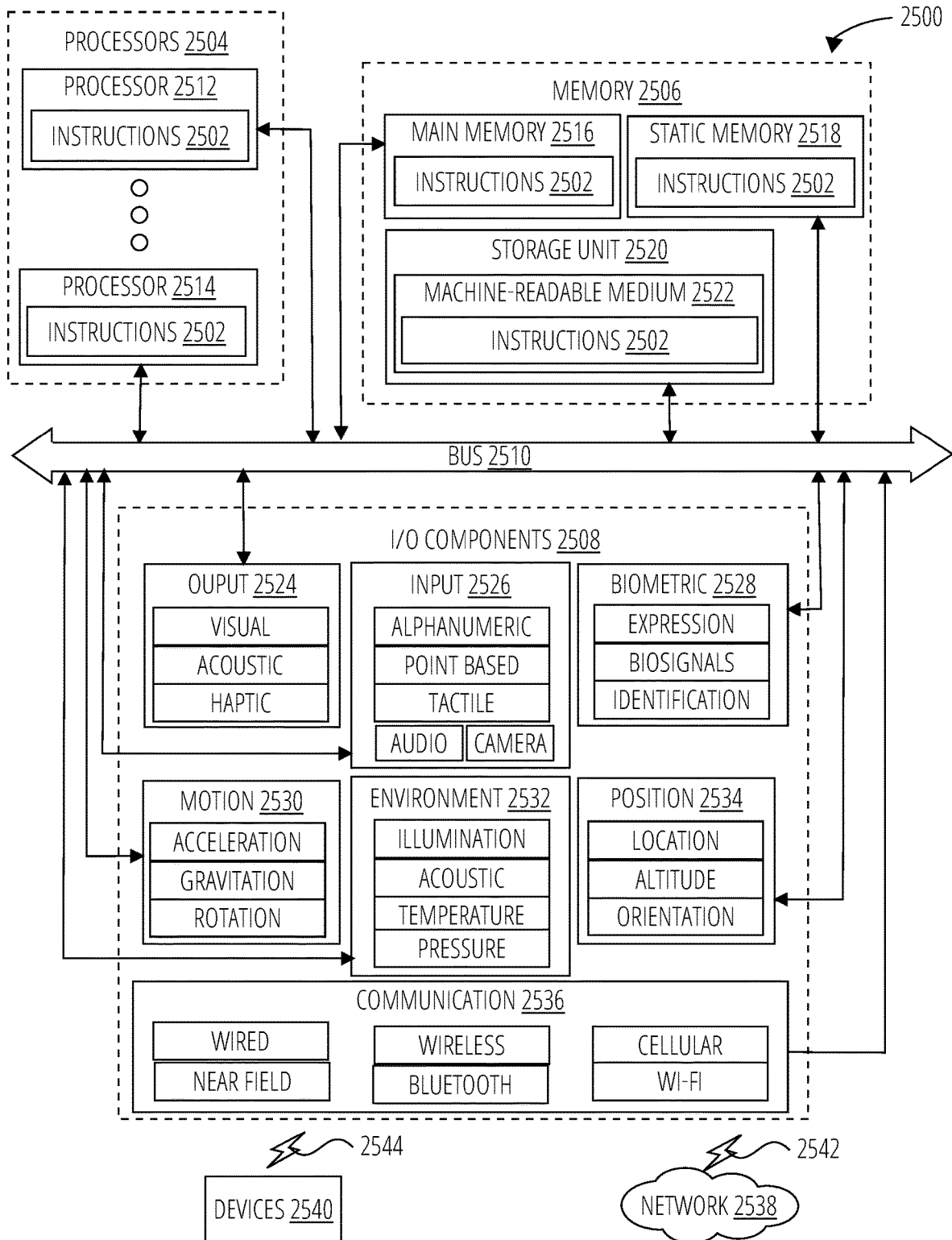
FIG. 25 depicts a machine 2500 in the form of a computer system within which a set of instructions may be executed for causing the machine to perform any one or more of the methodologies discussed herein, according to an example embodiment.

FIG. 25 depicts a diagrammatic representation of a machine 2500 in the form of a computer system within which logic may be implemented to cause the machine to perform any one or more of the functions or methods disclosed herein, according to an example embodiment.

Specifically, FIG. 25 depicts a machine 2500 comprising instructions 2502 (e.g., a program, an application, an applet, an app, or other executable code) for causing the machine 2500 to perform any one or more of the functions or methods discussed herein. For example the instructions 2502 may cause the machine 2500 to perform one or more of the real-time telemetry (real-time telemetry controller 1404), directed acyclic graph generation, first derivative graph generation, and application of the first derivative graphs to routing algorithms, in accordance with the disclosed techniques herein. The instructions 2502 configure a general, non-programmed machine into a particular machine 2500 programmed to carry out said functions and/or methods.

In alternative embodiments, the machine 2500 operates as a standalone device or may be coupled (e.g., networked) to other machines. In a networked deployment, the machine 2500 may operate in the capacity of a server machine or a client machine in a server-client network environment, or as a peer machine in a peer-to-peer (or distributed) network environment. The machine 2500 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2502, sequentially or otherwise, that specify actions to be taken by the machine 2500. Further, while only a single machine 2500 is depicted, the term "machine" shall also be taken to include a collection of machines that individually or jointly execute the instructions 2502 to perform any one or more of the methodologies or subsets thereof discussed herein.

The machine 2500 may include processors 2504, memory 2506, and I/O components 2508, which may be configured to communicate with each other such as via one or more bus 2510. In an example embodiment, the processors 2504 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 2512 and processor 2514) to execute the instructions 2502. The term "processor" is intended to include multi-core processors that may comprise two or more independent processors (sometimes referred to as "cores") that may execute instructions contemporaneously. Although FIG. 25 depicts multiple processors 2504, the machine 2500 may include a single processor with a single core, a single processor with multiple cores (e.g., a multi-core processor), multiple processors with a single core, multiple processors with multiples cores, or any combination thereof.

The memory 2506 may include one or more of a main memory 2516, a static memory 2518, and a storage unit 2520, each accessible to the processors 2504 such as via the bus 2510. The main memory 2516, the static memory 2518, and storage unit 2520 may be utilized, individually or in combination, to store the instructions 2502 embodying any one or more of the functionality described herein. The instructions 2502 may reside, completely or partially, within the main memory 2516, within the static memory 2518, within a machine-readable medium 2522 within the storage unit 2520, within at least one of the processors 2504 (e.g., within the processor's cache memory), or any suitable combination thereof, during execution thereof by the machine 2500.

The I/O components 2508 may include a wide variety of components to receive input, provide output, produce output, transmit information, exchange information, capture measurements, and so on. The specific I/O components 2508 that are included in a particular machine will depend on the type of machine. For example, portable machines such as mobile phones will likely include a touch input device or other such input mechanisms, while a headless server machine will likely not include such a touch input device. It will be appreciated that the I/O components 2508 may include many other components that are not shown in FIG. 25. The I/O components 2508 are grouped according to functionality merely for simplifying the following discussion and the grouping is in no way limiting. In various example embodiments, the I/O components 2508 may include output components 2524 and input components 2526.

The output components 2524 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 2508 may include biometric components 2528, motion components 2530, environmental components 2532, or position components 2534, among a wide array of possibilities. For example, the biometric components 2528 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 2530 may include acceleration sensor components (e.g., accelerometer), gravitation sensor components, rotation sensor components (e.g., gyroscope), and so forth. The environmental components 2532 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2534 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2508 may include communication components 2536 operable to couple the machine 2500 to a network 2538 or devices 2540 via a coupling 2542 and a coupling 2544, respectively. For example, the communication components 2536 may include a network interface component or another suitable device to interface with the network 2538. In further examples, the communication components 2536 may include wired communication components, wireless communication components, cellular communication components, Near Field Communication (NFC) components, Bluetooth© components (e.g., Bluetooth® Low Energy), Wi-Fi© components, and other communication components to provide communication via other modalities. The devices 2540 may be another machine or any of a wide variety of peripheral devices (e.g., a peripheral device coupled via a USB).

Moreover, the communication components 2536 may detect identifiers or include components operable to detect identifiers. For example, the communication components 2536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2536, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 2506, main memory 2516, static memory 2518, and/or memory of the processors 2504) and/or storage unit 2520 may store one or more sets of instructions and data structures (e.g., software) embodying or utilized by any one or more of the methodologies or functions described herein. These instructions (e.g., the instructions 2502), when executed by processors 2504, cause various operations to implement the disclosed embodiments.

As used herein, the terms "machine-storage medium," "device-storage medium," "computer-readable storage medium" and such mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

Communication Network Embodiments

In various example embodiments, one or more portions of the network 2538 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2538 or a portion of the network 2538 may include a wireless or cellular network, and the coupling 2542 may be a Code Division Multiple Access (CDMA) connection, a Global System for Mobile communications (GSM) connection, or another type of cellular or wireless coupling. In this example, the coupling 2542 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2502 and/or data generated by or received and processed by the instructions 2502 may be transmitted or received over the network 2538 using a transmission medium via a network interface device (e.g., a network interface component included in the communication components 2536) and utilizing any one of a number of well-known transfer protocols (e.g., hypertext transfer protocol (HTTP)). Similarly, the instructions 2502 may be transmitted or received using a transmission medium via the coupling 2544 (e.g., a peer-to-peer coupling) to the devices 2540. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2502 for execution by the machine 2500, and/or data generated by execution of the instructions 2502, and/or data to be operated on during execution of the instructions 2502, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS

100 server system
102 IP Anycast network
104 IP address
106 server
108 server
110 server
112 server
114 target media destination
200 server system
202 outer network
204 IP Anycast address
206 server A
208 server B
210 server C
212 inbound packet
214 outbound packet
300 server system
302 server states
304 network state
306 server
308 server
310 server
312 memory storage
314 memory storage
400 point-of-presence system
402 Anycast-over-TCP network
404 target media destination
406 IP Unicast networking
408 point-of-presence
410 point-of-presence
412 routing logic
414 upstream media source
416 TCP SYN
418 TCP SYN-ACK
420 data pipeline
422 misrouted packet alert
424 new route
500 media content rerouting process
502 block
504 block
506 block
508 block
510 block
600 server system
602 IP address
604 triggering event
606 server
608 server
610 server
612 target media destination
614 network routing control
616 request
618 network routing application
620 state model
622 network mapping functionality
700 server system
702 sync
704 point-of-presence
706 server
708 media content
710 network state
712 network
714 unexpected packet
716 request to be an endpoint of record
718 network routing control
800 network mapping functionality
802 network operational history
804 machine learning/artificial intelligence algorithm
806 model
808 network elements
810 real-time packet data set
812 routing tables
814 policies
1100 network architecture
1102 private network
1104 telecom network
1106 user devices
1108 media server
1110 gateway
1200 media content transmission process
1202 upstream media source
1204 voice-over-IP conference
1206 media content
1208 IP Unicast network
1210 network routing application
1212 points-of-presence
1214 IP Anycast network
1216 unicast network
1218 target media destination
1220 conference participant
1300 alert response process
1302 different point-of-presence
1304 data pipeline
1306 network routing application
1308 ACK message 1310 unfamiliar ACK message is received
1312 target media destination
1314 address translation
1316 translated address and notification
1318 translated address and notification
1320 perform an internal reconfiguration
1400 network analyzer system
1402 IP Anycast network
1404 real-time telemetry controller
1406 gaming machine
1408 gaming machine
1410 game server
1412 point-of-presence
1414 point-of-presence
1416 Internet Service Provider
1418 Internet Service Provider
1420 synthetic POP
1422 synthetic server
1424 data processor
1426 router
1428 directed acyclic graphs
1430 first derivative graphs
1500 network traffic routing process
1502 block
1504 block
1506 block
1508 block
1510 block
1602 point-of-presence
1604 billboard cloud service
1606 daemon
1608 agent
1610 daemon
1612 agent
1614 daemon
1616 agent
1702 real-time telemetry device
1704 point-of-presence
1706 point-of-presence
1708 path finding service
1710 network device
1712 graph service
1714 clock skew adjuster
1716 telemetry agent
1802 block
1804 block
1806 block
1808 block
1810 block
1812 block
1902 block
1904 block
1906 block
2002 block
2004 block
2006 block
2008 block
2102 block
2104 block
2106 block
2108 block
2110 block
2112 block
2114 block
2116 block
2118 block
2120 block
2122 block
2202 endpoint device
2204 endpoint device
2206 overlay network
2208 point-of-presence
2210 point-of-presence
2212 point-of-presence
2214 tunnel
2216 path finding service
2218 agent
2302 SIP agents
2304 User Agent Server
2306 SIP proxy
2308 NAT firewall
2400 client server network configuration
2402 mobile programmable device
2404 app
2406 app
2408 driver
2410 operating system
2412 driver
2414 computer
2416 network
2418 server
2420 application
2422 driver
2424 application
2426 file
2428 operating system
2430 file
2432 driver
2434 operating system
2436 service
2438 service
2440 plug-in
2442 interpreter
2500 machine
2502 instructions
2504 processors
2506 memory
2508 I/O components
2510 bus
2512 processor
2514 processor
2516 main memory
2518 static memory
2520 storage unit
2522 machine-readable medium
2524 output components
2526 input components
2528 biometric components
2530 motion components
2532 environmental components
2534 position components
2536 communication components
2538 network
2540 devices
2542 coupling
2544 coupling Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Code Listings

Listing 1: Sample Bird Template to Synchronize Routing Tables to Manage BGP Announcements and Peering

```
router id {{$.KernSrcV4Addr}};
# Configure logging
log syslog {info, remote, warning, error, fatal, bug};
protocol kernel {
persist; # Don't remove routes on bird shutdown
scan time 20; # Scan kernel routing table every 20 seconds
ipv4 {
import none;
export filter {
krt_prefsrc={{$.KernSrcV4Addr}};
accept;
};
};
}
protocol kernel {
   persist;
   scan time 20;
   ipv6 {
   import none;
   export filter {
   krt_prefsrc={{$.KernSrcV6Addr}};
   accept;
   };
   };
}
# This pseudo-protocol watches all interface up/down events.
protocol device {
   scan time 10; # Scan interfaces every 10 seconds
}
define SUBSPACE_ASN=32261;
define SUBSPACE_PREFIXES_V4=[
# Subspace AS 32261
158.247.96.0/19{19,24},
170.52.0.0/21{21,24},
143.131.160.0/19{19,24},
139.177.96.0/20{20,24},
151.106.160.0/19{19,24},
129.203.0.0/16{16,24}
];
define SUBSPACE_PREFIXES_V6=[
# Subspace AS 32261
2600:3700::/28{28,48}
];
define BOGON_PREFIXES_V4=[
0.0.0.0/8{8,32}, #IANA—Local Identification
10.0.0.0/8{8,32}, # RFC 1918—Private Use
127.0.0.0/8{8,32}, #IANA—Loopback
169.254.0.0/16{16,32}, # RFC 3927—Link Local
172.16.0.0/12{12,32}, # RFC 1918—Private Use
192.0.2.0/24{24,32}, # RFC 5737—TEST-NET-1
192.88.99.0/24{24,32}, # RFC 3068-6to4 prefix
192.168.0.0/16{16,32}, # RFC 1918—Private Use
198.18.0.0/15{15,32}, # RFC 2544—Network Interconnect Device Benchmark Testing
198.51.100.0/24{24,32}, # RFC 5737—TEST-NET-2
203.0.113.0/24{24,32}, # RFC 5737—TEST-NET-3
224.0.0.0/3{3,32}, # RFC 5771—Multicast (formerly Class D)
100.64.0.0/10{10,32} # RFC 6598—Shared Address Space
];
define BOGON_PREFIXES_V6=[
::/8{8,128}, # loopback, unspecified, v4-mapped
64:ff9b::/96{96,128}, # RFC 6052—IPv4-IPv6 Translation
100::/8{8,128}, # RFC 6666—reserved for Discard-Only Address Block
200::/7{7,128}, # RFC 4048—Reserved by IETF
1200::/6{6,128}, # RFC 4291—Reserved by IETF
800::/5{5,128}, # RFC 4291—Reserved by IETF
1000::/4{4,128}, # RFC 4291—Reserved by IETF
2001::/33{33,128}, # RFC 4380—Teredo prefix
2001:0:8000::/33{33,128}, # RFC 4380—Teredo prefix
2001:2::/48{48,128}, # RFC 5180—Benchmarking
2001:3::/32{32,128}, # RFC 7450—Automatic Multicast Tunneling
2001:10::/28{28,128}, # RFC 4843—Deprecated ORCHID
2001:20::/28{28,128}, # RFC 7343—ORCHIDv2
2001:db8::/32{32,128}, # RFC 3849—NON-ROUTABLE range to be used for documentation purpose
2002::/16{16,128}, # RFC 3068-6to4 prefix
3ffe::/16{16,128}, # RFC 5156—used for the 6bone but was returned
4000::/3{3,128}, # RFC 4291—Reserved by IETF
5f00::/8{8,128}, # RFC 5156—used for the 6bone but was returned
6000::/3{3,128}, # RFC 4291—Reserved by IETF
8000::/3{3,128}, # RFC 4291—Reserved by IETF
a000::/3{3,128}, # RFC 4291—Reserved by IETF
c000::/3{3,128}, # RFC 4291—Reserved by IETF
e000::/4{4,128}, # RFC 4291—Reserved by IETF
f000::/5{5,128}, # RFC 4291—Reserved by IETF
f800::/6{6,128}, # RFC 4291—Reserved by IETF
fc00::/7{7,128}, # RFC 4193—Unique Local Unicast
fe80::/10{10,128}, # RFC 4291—Link Local Unicast
fec0::/10{10,128}, # RFC 4291—Reserved by IETF
ff00::/8{8,128} # RFC 4291—Multicast
define BOGON_ASNS=[
0, # RFC 7607
23456, # RFC 4893 AS_TRANS
64496 . . . 64511, # RFC 5398 and documentation/example ASNs
64512 . . . 65534, # RFC 6996 Private ASNs
65535, # RFC 7300 Last 16 bit ASN
65536 . . . 65551, # RFC 5398 and documentation/example ASNs
65552 . . . 131071, # RFC IANA reserved ASNs
4200000000 . . . 4294967294, # RFC 6996 Private ASNs
4294967295 # RFC 7300 Last 32 bit ASN
];
function is_subspace_prefix( )
{
   if net.type=NET_IP4 then
   if net~SUBSPACE_PREFIXES_V4 then {
   return true;
   }
   if net.type=NET_IP6 then
   if net~SUBSPACE_PREFIXES_V6 then {
   return true;
   }
```

```
    return false;
}
function is_bogon_prefix( )
{
    if net.type=NET_IP4 then
    if net~BOGON_PREFIXES_V4 then return true;
    if net.type=NET_IP6 then
    if net~BOGON_PREFIXES_V6 then return true;
    return false;
}
function is_bogon_asn( )
{
    if bgp_path~BOGON_ASNS then {
    return true;
    }
    else {
    return false;
    }
}
{{range $peer:=.Peers -}}
START {{$peer.IP}} AS{{$peer.AS}} ###{{if
    $peer.IsIPv4}}ipv4{{else}}ipv6{{end}}    table
    table_{{$peer.Name}}
protocol pipe pipe_{{$peer.Name}} {
    table                                    {{if
        $peer.IsIPv4}}master4{{else}}master6{{end}};
    peer table table_{{$peer.Name}};
    export none;
    import filter {
    if source=RTS_STATIC then {
    reject;
    }
    accept;
    };
}
{{if $peer.Paths -}}
protocol static static_{{$peer.Name}} {
    {{if $peer.IsIPv4}}ipv4{{else}}ipv6{{end}} {table
        table_{{$peer.Name}}; };
{{—range $path:=$peer.Paths}}
route {{$path.Prefix}}/{{$path.PrefixLen}} blackhole {
    {{—range $community:=$path.Communities}}
    bgp_community.add(({{index    $community    0}},
        {{index $community 1}}));
    {{—end}}
    {{—range $prependAS:=$path.PrependAS}}
    bgp_path.prepend({{$prependAS}});
    {{—end}}
    };
    {{-end}}
}
{{—end}}
{{if $peer.FilterAsRegex—}}
function is_filtered_by_asn_{{$peer.Name}}( )
{
    {{range $term $peer.FilterAsRegex -}}
    if bgp_path~[={{$term}}=] then {
    return true;
    }
    {{end—}}
    return false;
}
{{—end}}
filter export_bgp_{{$peer.Name}} {
    bgp_origin=ORIGIN_IGP;
    bgp_med=0;
    bgp_community.add((32261,{{$.BpfId}}));
    accept;
}
filter import_bgp_{{$peer.Name}} {
    # PREFIX FILTER: Invalid Prefixes
    if is_bogon_prefix( ) then
    reject;
    # ASN FILTER: Invalid ASNs
    if is_bogon_asn( ) then
    reject;
    # ASN PATH FILTER: Drop if path had more than 10
        ASNs
    if bgp_path.len>10 then
    reject;
    {{if $peer.FilterAsRegex -}}
    # ASN FILTER: ASN Path filter via Billboard
    if is_filtered_by_asn_{{$peer.Name}}( ) then
    reject;
    {{—end—}}
    # SETTINGS: STANDARDISE ORIGIN
    bgp_origin=ORIGIN_IGP;
    # SETTINGS: LOCAL PREF and MED for {{$peer.Peer-
        Type}}
    bgp_local_pref={{$peer.LocalPref}};
    bgp_med={{$peer.Med}};
    accept;
}
protocol BGP bgp_{{$peer.Name}} {
    {{if $peer.Disabled -}}
    disabled;
    {{—end—}}
    description "{{$peer.Description}}";
    local as {{$.LocalAS}};
    neighbor {{$peer.IP}} as {{$peer.AS}};
    allow local as 4;
    {{if $peer.Password-}}
    password "{{$peer.Password}}";
    {{end -}}
    {{if $peer.IsIPv4}}ipv4{{else}}ipv6{{end}} {
    table table_{{$peer.Name}};
    {{if $peer.MaxPrefix-}}
    import limit {{$peer.MaxPrefix}};
    {{end -}}
    export filter export_bgp_{{$peer.Name}};
    import filter import_bgp_{{$peer.Name}};
    import keep filtered on;
    import table;
    export table;
    };
}
###END {{$peer.IP}} AS{{$peer.AS}} ###
{{end}}
Listing 2: Create and Manage Accelerators
Requests/Responses
message Accelerator {
    string id=1;
    string name=2;
    string destination_ip=3;
    uint32 destination_port=4;
    Protocol protocol=5;
    string subspace_ipv4=6;
    uint32 subspace_port=7;
}
// returns Accelerator
message CreateAcceleratorRequest {
    Protocol protocol=1;
    string name=2;
    string destination_ip=3;
```

```
    uint32 destination_port=4;
    uint32 subspace_port=5;
}
// returns Accelerator
message UpdateAcceleratorRequest {
    string id=1;
    Protocol protocol=2;
    string name=3;
    string destination_ip=4;
    uint32 destination_port=5;
}
message DeleteAcceleratorRequest {
    string id=1;
}
message DeleteAcceleratorResponse{ }
```
Example Request to Create an Accelerator
curl--request POST
--url https://api.subspace.com/vl/accelerators
--header 'Authorization: Bearer $TOKEN'
--header 'Content-Type: application/json'
--data '{"name": "My Accelerator", "destination_ip": "1.1.1.1", "destination_port": 80, "protocol": "udp_tcp", "subspace_port": 8080}'

Listing 3: Performance Calculation Algorithm for a Link
```
func  (t  telemetryData)  balancedWeightBigNumbers
    (lossPenalty time.Duration) edgeWeight {
    if t.lossPercent>=100 && t.jitterNS<0 {
        return  newEdgeWeight(big.NewInt(maxBalanced-
            WeightInt64))
    }
    // this cast is safe, time.Duration is an alias for int64
    latencyNSBigF:=big.NewFloat(0).SetInt64(int64(t.la-
        tency))
    // float32→float64 is safe
    lossPercentBigF:=big.NewFloat(float64(t.lossPer-
        cent))
    jitterNSBigF:=big.NewFloat(float64(t.jitterNS))
    // this cast is safe, time.Duration is an alias for int64
    lossPenaltyNSBigF:=
        big.NewFloat(0).SetInt64(int64(lossPenalty))
    // weight=latency_ns+(loss_percent*loss_penalty_ns)+
    //jitter_ns
    weight:=big.NewFloat(0)
    weight.Add(weight,   latencyNSBigF)    weight.Add
        (weight, jitterNSBigF)
    weight.Add(weight, lossPercentBigF.Mul(lossPercent-
        BigF, lossPenaltyNSBigF))
    // big.Float→big.Int is safe, this rounds fractions of
    // nanoseconds without overflowing
    weightAsBigInt, _:=weight.Int(nil)
    return newEdgeWeight(weightAsBigInt)
}
```

What is claimed is:

1. A method comprising:
(a) testing that GPS-clock enabled network devices have synchronized clocks;
(b) identifying non-GPS-clock enabled network devices with symmetric latencies as likely to be synchronized to GPS-clock enabled neighbor devices;
(c) determining clock skews of remaining network devices not identified in (a) or (b) against the GPS-clock enabled network devices and the non-GPS-clock enabled network devices identified in (a) and (b); and
evaluating latencies among the GPS-clock enabled network devices, the non-GPS-clock enabled network devices, and the remaining network devices, based on application of the clock skews as determined by (a)-(c).

2. The method of claim 1, further comprising:
providing link latencies adjusted to account for the clock skews from a central real-time telemetry device to a plurality of path finding services distributed across network devices comprising the GPS-clock enabled network devices, the non-GPS-clock enabled network devices, and the remaining network devices.

3. The method of claim 2, further comprising, based on the link latencies:
determining a new weight for a current link for traffic between the network devices for a combination of traffic dimensions;
setting current best dimensions for the current link to the combination of traffic dimensions;
setting a current best weight for the current link to the new weight on condition that there is no current best weight for the combination of dimensions;
setting the current best weight to the new weight and updating the current best dimensions on condition that the new weight is better than the current best weight;
making no changes to the current best weight or current best dimensions on condition that the new weight is worse than the current best weight and the combination of dimensions for the new weight do not match a combination of dimensions used to calculate the current best weight; and
selecting a new link to be the current link for the traffic between the network devices on condition that the new weight is worse than the current best weight, and the dimensions of the new weight and the current best weight match.

4. The method of claim 1, further comprising:
providing link latencies adjusted to account for the clock skews from a central real-time telemetry device to a centralized graphing service.

5. The method of claim 1, further comprising:
identifying a first set of network devices;
identifying a first subset of the first set comprising network devices with GPS synchronized clocks;
identifying a second subset of the first set comprising network devices with non-GPS clocks that neighbor devices in the first set;
measuring packet time-of-flight latencies between devices in the first subset and devices in the second subset;
identifying a third subset of the first set comprising network devices in the second subset demonstrating stable symmetric packet time-of-flight latencies with devices in the first subset;
identifying a fourth subset of the first set comprising network devices not in the first subset or the second subset;
generating first measurements of packet time-of-flight latencies between devices in the fourth subset;
generating second measurements of packet time-of-flight latencies between devices in the fourth subset and devices in the first subset;
generating third measurements of packet time-of-flight latencies between devices in the fourth subset and devices in the second subset;
identifying possible clock skew values based on the first, second, and third measurements; and
assigning clock skew values to network devices in the first set when applying the clock skew values to asymmetric packet time-of-flight latencies between multiple pairs of the network devices in the first set results in the asymmetric packet time-of-flight latencies becoming substantially symmetric.

6. The method of claim 5, wherein the clock skew values are values of clock skew that negate asymmetries to the greatest extent for the largest number of device pairs in the fourth subset.

7. The method of claim 5, further comprising:
identifying a pair of devices wherein each device of the pair of devices is in one or both of the first subset and the second subset;
identifying a midgress device between the pair of devices in a packet path, the midgress device in the third subset; and
calculating a clock skew of the midgress device based on a total packet time-of-flight latency between a first device of the pair and a second device of the pair.

8. A network device comprising:
at least one processor; and
a memory comprising instructions that, when executed by the at least one processor, result in the network device:
(a) testing that GPS-clock enabled network devices have synchronized clocks;
(b) identifying non-GPS-clock enabled network devices with symmetric latencies as likely to be synchronized to GPS-clock enabled neighbor devices;
(c) determining clock skews of remaining network devices not identified in (a) or (b) against the GPS-clock enabled network devices and the non-GPS-clock enabled network devices identified in (a) and (b); and
evaluating latencies among the GPS-clock enabled network devices, the non-GPS-clock enabled network devices, and the remaining network devices, based on application of the clock skews as determined by (a)-(c).

9. The network device of claim 8, wherein the instructions, when executed by the at least one processor, further result in the network device:
providing link latencies adjusted to account for the clock skews from a central real-time telemetry device to a plurality of path finding services distributed across network devices comprising the GPS-clock enabled network devices, the non-GPS-clock enabled network devices, and the remaining network devices.

10. The network device of claim 9, wherein the instructions, when executed by the at least one processor, further result in the network device utilizing the link latencies to:
determine a new weight for a current link for traffic between the network devices for a combination of traffic dimensions;
set current best dimensions for the current link to the combination of traffic dimensions;
set a current best weight for the current link to the new weight on condition that there is no current best weight for the combination of dimensions;
set the current best weight to the new weight and updating the current best dimensions on condition that the new weight is better than the current best weight;
make no changes to the current best weight or current best dimensions on condition that the new weight is worse than the current best weight and the combination of dimensions for the new weight do not match a combination of dimensions used to calculate the current best weight; and
select a new link to be the current link for the traffic between the network devices on condition that the new weight is worse than the current best weight, and the dimensions of the new weight and the current best weight match.

11. The network device of claim 8, wherein the instructions, when executed by the at least one processor, further result in the network device:
providing link latencies adjusted to account for the clock skews from a central real-time telemetry device to a centralized graphing service.

12. The network device of claim 8, wherein the instructions, when executed by the at least one processor, further result in the network device:
identifying a first set of network devices;
identifying a first subset of the first set comprising network devices with GPS synchronized clocks;
identifying a second subset of the first set comprising network devices with non-GPS clocks that neighbor devices in the first set;
measuring packet time-of-flight latencies between devices in the first subset and devices in the second subset;
identifying a third subset of the first set comprising network devices in the second subset demonstrating stable symmetric packet time-of-flight latencies with devices in the first subset;
identifying a fourth subset of the first set comprising network devices not in the first subset or the second subset;
generating first measurements of packet time-of-flight latencies between devices in the fourth subset;
generating second measurements of packet time-of-flight latencies between devices in the fourth subset and devices in the first subset;
generating third measurements of packet time-of-flight latencies between devices in the fourth subset and devices in the second subset;
identifying possible clock skew values based on the first, second, and third measurements; and
assigning clock skew values to network devices in the first set when applying the clock skew values to asymmetric packet time-of-flight latencies between multiple pairs of the network devices in the first set results in the asymmetric packet time-of-flight latencies becoming substantially symmetric.

13. The network device of claim 12, wherein the clock skew values are values of clock skew that negate asymmetries to the greatest extent for the largest number of device pairs in the fourth subset.

14. The network device of claim 12, wherein the instructions, when executed by the at least one processor, further result in the network device:
identifying a pair of devices wherein each device of the pair of devices is in one or both of the first subset and the second subset;
identifying a midgress device between the pair of devices in a packet path, the midgress device in the third subset; and
calculating a clock skew of the midgress device based on a total packet time-of-flight latency between a first device of the pair and a second device of the pair.

15. A non-volatile computer-readable medium comprising instructions that, when applied to one or more processors of a computing system, configure the computing system to:
(a) test that GPS-clock enabled network devices have synchronized clocks;
(b) identify non-GPS-clock enabled network devices with symmetric latencies as likely to be synchronized to GPS-clock enabled neighbor devices;
(c) determine clock skews of remaining network devices not identified in (a) or (b) against the GPS-clock enabled network devices and the non-GPS-clock enabled network devices identified in (a) and (b); and evaluating latencies among the GPS-clock enabled network devices, the non-GPS-clock enabled network devices, and the remaining network devices, based on application of the clock skews as determined by (a)-(c).

16. The non-volatile computer-readable medium of claim 15, further comprising instructions that, when applied to the one or more processors of the computing system, configure the computing system to:

provide link latencies adjusted to account for the clock skews from a central real-time telemetry device to a plurality of path finding services distributed across network devices comprising the GPS-clock enabled network devices, the non-GPS-clock enabled network devices, and the remaining network devices.

17. The non-volatile computer-readable medium of claim 16, further comprising instructions that, when applied to the one or more processors of the computing system, configure the computing system to apply the link latencies to:

determine a new weight for a current link for traffic between the network devices for a combination of traffic dimensions;

set current best dimensions for the current link to the combination of traffic dimensions;

set a current best weight for the current link to the new weight on condition that there is no current best weight for the combination of dimensions;

set the current best weight to the new weight and updating the current best dimensions on condition that the new weight is better than the current best weight;

make no changes to the current best weight or current best dimensions on condition that the new weight is worse than the current best weight and the combination of dimensions for the new weight do not match a combination of dimensions used to calculate the current best weight; and select a new link to be the current link for the traffic between the network devices on condition that the new weight is worse than the current best weight, and the dimensions of the new weight and the current best weight match.

18. The non-volatile computer-readable medium of claim 15, further comprising instructions that, when applied to the one or more processors of the computing system, configure the computing system to:

provide link latencies adjusted to account for the clock skews from a central real-time telemetry device to a centralized graphing service.

19. The non-volatile computer-readable medium of claim 15, further comprising instructions that, when applied to the one or more processors of the computing system, configure the computing system to:

identify a first set of network devices;

identify a first subset of the first set comprising network devices with GPS synchronized clocks;

identify a second subset of the first set comprising network devices with non-GPS clocks that neighbor devices in the first set;

measure packet time-of-flight latencies between devices in the first subset and devices in the second subset;

identify a third subset of the first set comprising network devices in the second subset demonstrating stable symmetric packet time-of-flight latencies with devices in the first subset;

identify a fourth subset of the first set comprising network devices not in the first subset or the second subset;

generate first measurements of packet time-of-flight latencies between devices in the fourth subset;

generate second measurements of packet time-of-flight latencies between devices in the fourth subset and devices in the first subset;

generate third measurements of packet time-of-flight latencies between devices in the fourth subset and devices in the second subset;

identify possible clock skew values based on the first, second, and third measurements;

and assign clock skew values to network devices in the first set when applying the clock skew values to asymmetric packet time-of-flight latencies between multiple pairs of the network devices in the first set results in the asymmetric packet time-of-flight latencies becoming substantially symmetric.

20. The non-volatile computer-readable medium of claim 19, wherein the clock skew values are values of clock skew that negate asymmetries to the greatest extent for the largest number of device pairs in the fourth subset.

21. The non-volatile computer-readable medium of claim 19, further comprising instructions that, when applied to the one or more processors of the computing system, configure the computing system to:

identify a pair of devices wherein each device of the pair of devices is in one or both of the first subset and the second subset;

identify a midgress device between the pair of devices in a packet path, the midgress device in the third subset; and calculate a clock skew of the midgress device based on a total packet time-of-flight latency between a first device of the pair and a second device of the pair.

* * * * *